(12) United States Patent
Spreadbury et al.

(10) Patent No.: US 11,355,331 B2
(45) Date of Patent: Jun. 7, 2022

(54) MASS SPECTROMETER

(71) Applicant: Micromass UK Limited, Wilmslow (GB)

(72) Inventors: Peter G. Spreadbury, Liverpool (GB); Paul Doorbar, Sale (GB); Richard Barrington Moulds, Stockport (GB); Andrew Packwood, Urmston (GB); Paul McIver, Sale (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 17/057,195

(22) PCT Filed: May 31, 2019

(86) PCT No.: PCT/GB2019/051507
§ 371 (c)(1),
(2) Date: Nov. 20, 2020

(87) PCT Pub. No.: WO2019/229466
PCT Pub. Date: Dec. 5, 2019

(65) Prior Publication Data
US 2021/0313162 A1    Oct. 7, 2021

(30) Foreign Application Priority Data

May 31, 2018 (GB) .................................... 1808892

(51) Int. Cl.
*H01J 49/02* (2006.01)
*G01N 30/72* (2006.01)
(Continued)

(52) U.S. Cl.
CPC ........ *H01J 49/022* (2013.01); *G01N 30/7233* (2013.01); *H01J 49/0013* (2013.01);
(Continued)

(58) Field of Classification Search
CPC .. H01J 49/022; H01J 49/0013; H01J 49/0027; H01J 49/40; G01N 30/7233; G01N 2030/027
See application file for complete search history.

(56) References Cited

U.S. PATENT DOCUMENTS 2,901,622 A    8/1959   Baldwin
4,314,156 A    2/1982   Kuppermann et al.
(Continued)

FOREIGN PATENT DOCUMENTS

CN    103684817 A    3/2014
CN    205705229 U    11/2016
(Continued)

OTHER PUBLICATIONS

Combined Search and Examination Report under Sections 17 and 18(3), for Application No. GB1907724.7, dated Sep. 25, 2019, 7 pages.
(Continued)

*Primary Examiner* — Nicole M Ippolito
*Assistant Examiner* — Hanway Chang

(57) ABSTRACT

A mass spectrometer is disclosed comprising a system control module (1715) for controlling the operation of the mass spectrometer. The system control module (1715) comprises one or more functional modules, each functional module being operable to perform a predetermined function of the mass spectrometer. The system control module (1715) and/or one or more functional modules are operable to communicate non-time information with each other using a time code of a communications protocol.

16 Claims, 46 Drawing Sheets

(51) Int. Cl.
  *H01J 49/00* (2006.01)
  *H01J 49/40* (2006.01)
  *G01N 30/02* (2006.01)

(52) U.S. Cl.
  CPC .......... *H01J 49/0027* (2013.01); *H01J 49/40* (2013.01); *G01N 2030/027* (2013.01)

(56) References Cited

U.S. PATENT DOCUMENTS

| | | |
|---|---|---|
| 4,458,149 A | 7/1984 | Muga |
| 5,025,391 A | 6/1991 | Filby et al. |
| 5,593,123 A | 1/1997 | Crawford |
| 5,756,994 A | 5/1998 | Bajic |
| 5,776,216 A | 7/1998 | Yang |
| 5,825,025 A | 10/1998 | Kerley |
| 5,933,335 A | 8/1999 | Hitchcock et al. |
| 6,013,913 A | 1/2000 | Hanson |
| 6,049,077 A | 4/2000 | Franzen |
| 6,248,998 B1 | 6/2001 | Okumoto et al. |
| 6,316,768 B1 | 11/2001 | Rockwood et al. |
| 6,502,999 B1 | 1/2003 | Cohen et al. |
| 6,527,458 B2 | 3/2003 | Kim |
| 6,566,653 B1 | 5/2003 | Gerber et al. |
| 6,643,075 B2 | 11/2003 | Wang et al. |
| 6,663,294 B2 | 12/2003 | Crane, Jr. et al. |
| 6,712,528 B2 | 3/2004 | Galeotti et al. |
| 6,772,649 B2 | 8/2004 | Zimmermann et al. |
| 6,792,171 B2 | 9/2004 | Hargis et al. |
| 6,824,314 B2 | 11/2004 | Bendelli et al. |
| 6,835,928 B2 | 12/2004 | Bateman |
| 6,847,036 B1 | 1/2005 | Darling et al. |
| 6,862,378 B2 | 3/2005 | Kamacewicz et al. |
| 6,869,231 B2 | 3/2005 | Chiu et al. |
| 6,877,912 B2 | 4/2005 | Cho et al. |
| 6,888,129 B2 | 5/2005 | Bowdler et al. |
| 6,888,860 B2 | 5/2005 | Shaw |
| 6,903,332 B2 | 6/2005 | Weiss et al. |
| 6,956,205 B2 | 10/2005 | Park |
| 6,977,369 B2 | 12/2005 | Yamaguchi et al. |
| 7,019,285 B2 | 3/2006 | Dresch et al. |
| 7,129,163 B2 | 10/2006 | Sherrer et al. |
| 7,149,389 B2 | 12/2006 | Yoon et al. |
| 7,211,794 B2 | 5/2007 | Malek et al. |
| 7,247,847 B2 | 7/2007 | Webb et al. |
| 7,309,861 B2 | 12/2007 | Brown et al. |
| 7,322,754 B2 | 1/2008 | Wolf et al. |
| 7,359,642 B2 | 4/2008 | Richardson et al. |
| 7,372,021 B2 | 5/2008 | Cotter et al. |
| 7,375,318 B2 | 5/2008 | Kikuma et al. |
| 7,550,722 B2 | 6/2009 | Scheidemann et al. |
| 7,597,488 B2 | 10/2009 | Fisher |
| 7,622,711 B2 | 11/2009 | Wildgoose et al. |
| 7,645,986 B2 | 1/2010 | Kikuma et al. |
| 7,786,435 B2 | 8/2010 | Whitehouse et al. |
| 7,812,309 B2 | 10/2010 | Guevremont et al. |
| 7,820,980 B2 | 10/2010 | Balogh |
| 7,825,374 B2 | 11/2010 | Cotter et al. |
| 7,829,841 B2 | 11/2010 | Bateman et al. |
| 7,888,630 B2 | 2/2011 | Wong |
| 7,893,401 B2 | 2/2011 | Ding |
| 7,919,747 B2 | 4/2011 | Green et al. |
| 7,960,694 B2 | 6/2011 | Hoyes |
| 8,138,119 B2 | 3/2012 | Fischer et al. |
| 8,153,960 B2 | 4/2012 | Giles et al. |
| 8,183,524 B2 | 5/2012 | Kenny et al. |
| 8,227,749 B2 | 7/2012 | Alonso |
| 8,253,096 B2 | 8/2012 | Numata |
| 8,357,892 B2 | 1/2013 | Suyama et al. |
| 8,426,802 B2 | 4/2013 | Giles et al. |
| 8,507,849 B2 | 8/2013 | Brown |
| 8,513,597 B2 | 8/2013 | Panayi |
| 8,552,367 B2 | 10/2013 | Danel et al. |
| 8,637,810 B2 | 1/2014 | Mukaibatake et al. |
| 8,653,452 B2 | 2/2014 | Albeanu et al. |
| 8,704,172 B2 | 4/2014 | Baykut |
| 8,716,660 B2 | 5/2014 | Green et al. |
| 8,742,339 B2 | 6/2014 | Hoyes |
| 8,822,915 B2 | 9/2014 | Mukaibatake et al. |
| 8,927,928 B2 | 1/2015 | Decker et al. |
| 8,975,578 B2 | 3/2015 | Green et al. |
| 9,012,840 B2 | 4/2015 | Bateman et al. |
| 9,048,075 B1 | 6/2015 | Kodera |
| 9,058,968 B2 | 6/2015 | Danel et al. |
| 9,105,456 B2 | 8/2015 | Jiang et al. |
| 9,184,039 B2 | 11/2015 | Pringle et al. |
| 9,196,469 B2 | 11/2015 | Makarov |
| 9,281,171 B2 | 3/2016 | Bateman et al. |
| 9,287,100 B2 | 3/2016 | Szalay et al. |
| 9,318,309 B2 | 4/2016 | Brown et al. |
| 9,355,832 B2 | 5/2016 | Chiappetta et al. |
| 9,466,472 B2 | 10/2016 | Bateman et al. |
| 9,536,721 B2 | 1/2017 | Berdnikov et al. |
| 9,536,727 B2 | 1/2017 | Satoh |
| 9,552,975 B2 | 1/2017 | Brown et al. |
| 9,564,307 B2 | 2/2017 | Makarov |
| 9,601,323 B2 | 3/2017 | Nishiguchi et al. |
| 9,607,820 B2 | 3/2017 | Bateman et al. |
| 9,754,773 B1 | 9/2017 | Gonzalez et al. |
| 9,768,008 B2 | 9/2017 | Verenchikov |
| 9,812,308 B2 | 11/2017 | Berdnikov et al. |
| 9,859,106 B2 | 1/2018 | Chiappetta et al. |
| 9,865,444 B2 | 1/2018 | Okumura |
| 9,870,904 B2 | 1/2018 | Covey et al. |
| 9,870,906 B1 | 1/2018 | Quarmby et al. |
| 9,880,129 B2 | 1/2018 | Bateman |
| 9,939,407 B2 | 4/2018 | Giles et al. |
| 9,978,572 B2 | 5/2018 | Giles et al. |
| 9,984,861 B2 | 5/2018 | Giles et al. |
| 9,984,863 B2 | 5/2018 | Verenchikov |
| 10,014,167 B2 | 7/2018 | Zhang et al. |
| 10,020,181 B2 | 7/2018 | Okumura |
| 2001/0017351 A1 | 8/2001 | Terakura |
| 2001/0030284 A1 | 10/2001 | Dresch et al. |
| 2002/0100870 A1 | 8/2002 | Whitehouse et al. |
| 2002/0131724 A1 | 9/2002 | Bailey et al. |
| 2003/0003595 A1 | 1/2003 | Amirav |
| 2003/0027354 A1 | 2/2003 | Geli |
| 2003/0193019 A1 | 10/2003 | Nagano et al. |
| 2004/0089803 A1 | 5/2004 | Foley |
| 2005/0213353 A1 | 9/2005 | Lys |
| 2006/0076483 A1 | 4/2006 | Scheidemann et al. |
| 2006/0219891 A1 | 10/2006 | Balogh |
| 2006/0237663 A1 | 10/2006 | Balogh |
| 2007/0164209 A1 | 7/2007 | Balogh |
| 2008/0087841 A1 | 4/2008 | Verbeck et al. |
| 2008/0149825 A1 | 6/2008 | Kozlovski et al. |
| 2009/0101814 A1 | 4/2009 | Amirav |
| 2009/0179148 A1 | 7/2009 | Yasuda et al. |
| 2010/0243887 A1 | 9/2010 | Suyama et al. |
| 2011/0127416 A1 | 6/2011 | Campuzano et al. |
| 2011/0174969 A1 | 7/2011 | Seyfarth |
| 2011/0220786 A1 | 9/2011 | Satoh |
| 2012/0068064 A1 | 3/2012 | Numata |
| 2012/0085901 A1 | 4/2012 | Gilbert et al. |
| 2012/0205534 A1 | 8/2012 | Hunter et al. |
| 2013/0183355 A1 | 7/2013 | Jain et al. |
| 2014/0183355 A1 | 7/2014 | Bartfay-Szabo et al. |
| 2014/0346345 A1 | 11/2014 | Makarov |
| 2014/0367563 A1 | 12/2014 | Zhong et al. |
| 2015/0076338 A1 | 3/2015 | Young et al. |
| 2015/0123354 A1 | 5/2015 | Laser et al. |
| 2015/0263642 A1 | 9/2015 | Lin et al. |
| 2015/0323500 A1 | 11/2015 | Davis et al. |
| 2016/0148796 A1 | 5/2016 | Makarov |
| 2016/0155620 A1 | 6/2016 | Makarov |
| 2016/0172179 A1 | 6/2016 | Deerberg et al. |
| 2016/0203967 A1 | 7/2016 | Atkinson et al. |
| 2016/0247668 A1 | 8/2016 | Szalay et al. |
| 2016/0284526 A1 | 9/2016 | Kenny et al. |
| 2016/0293395 A1 | 10/2016 | O'Brien et al. |
| 2016/0322960 A1 | 11/2016 | Taylor et al. |
| 2016/0336158 A1 | 11/2016 | Kovarik |
| 2017/0074283 A1 | 3/2017 | Manabe |
| 2017/0082585 A1 | 3/2017 | DeWitte et al. |

(56) References Cited

U.S. PATENT DOCUMENTS

| | | |
|---|---|---|
| 2017/0092477 A1 | 3/2017 | Giles et al. |
| 2017/0115383 A1 | 4/2017 | Fukuo et al. |
| 2017/0168031 A1 | 6/2017 | Verenchikov |
| 2017/0169633 A1 | 6/2017 | Leung et al. |
| 2017/0190566 A1 | 7/2017 | Cramm et al. |
| 2017/0236699 A1 | 8/2017 | Ueda et al. |
| 2017/0287692 A1 | 10/2017 | Bateman et al. |
| 2017/0309465 A1 | 10/2017 | Jarrell |
| 2017/0372881 A1 | 12/2017 | Hoyes |
| 2018/0053640 A1 | 2/2018 | Kurulugama et al. |
| 2018/0102241 A1 | 4/2018 | Gordon et al. |

FOREIGN PATENT DOCUMENTS

| | | |
|---|---|---|
| CN | 206955673 U | 2/2018 |
| DE | 2817665 A1 | 10/1979 |
| DE | 102018105603 A1 | 5/2018 |
| EP | 0233784 A2 | 8/1987 |
| EP | 0317060 A2 | 5/1989 |
| EP | 0792091 A1 | 8/1997 |
| EP | 0919726 A1 | 6/1999 |
| EP | 1137044 A2 | 9/2001 |
| EP | 1393059 A1 | 3/2004 |
| EP | 1530229 A1 | 5/2005 |
| EP | 1597749 A2 | 11/2005 |
| EP | 1820203 A2 | 8/2007 |
| EP | 1830386 A2 | 9/2007 |
| EP | 1933365 A1 | 6/2008 |
| EP | 1933366 A1 | 6/2008 |
| EP | 1964153 A2 | 9/2008 |
| EP | 1166328 B1 | 11/2008 |
| EP | 1397822 B1 | 3/2010 |
| EP | 1884980 B1 | 6/2011 |
| EP | 1817789 B1 | 11/2011 |
| EP | 2431997 A2 | 3/2012 |
| EP | 2450941 A1 | 5/2012 |
| EP | 1825496 B1 | 6/2012 |
| EP | 2533042 A1 | 12/2012 |
| EP | 2567397 A2 | 3/2013 |
| EP | 2587521 A1 | 5/2013 |
| EP | 2092549 B1 | 8/2013 |
| EP | 2660850 A1 | 11/2013 |
| EP | 2633299 B1 | 9/2014 |
| EP | 2774172 A2 | 9/2014 |
| EP | 2797105 A1 | 10/2014 |
| EP | 2798657 A2 | 11/2014 |
| EP | 2806553 A2 | 11/2014 |
| EP | 1810314 B1 | 4/2015 |
| EP | 2866247 A1 | 4/2015 |
| EP | 1738398 B1 | 6/2015 |
| EP | 2038913 B1 | 7/2015 |
| EP | 2913914 A1 | 9/2015 |
| EP | 3005403 A2 | 4/2016 |
| EP | 3073509 A1 | 9/2016 |
| EP | 3084422 A1 | 10/2016 |
| EP | 3211781 A1 | 8/2017 |
| EP | 2033208 B1 | 11/2017 |
| EP | 3244439 A1 | 11/2017 |
| EP | 1789989 B1 | 12/2017 |
| EP | 2485243 B1 | 3/2018 |
| EP | 3404695 A1 | 11/2018 |
| EP | 1880406 B1 | 7/2019 |
| GB | 1593998 A | 7/1981 |
| GB | 2219432 A | 12/1989 |
| GB | 2329066 A | 3/1999 |
| GB | 2435712 A | 9/2007 |
| GB | 2440970 A | 2/2008 |
| GB | 2455171 A | 6/2009 |
| GB | 2473839 A | 3/2011 |
| GB | 2486584 A | 6/2012 |
| GB | 2489975 A | 10/2012 |
| GB | 2493072 A | 1/2013 |
| GB | 2515284 A | 12/2014 |
| GB | 2519853 A | 5/2015 |
| GB | 2533168 A | 6/2016 |
| GB | 2541808 A | 3/2017 |
| GB | 2552965 A | 2/2018 |
| JP | S60180322 A | 9/1985 |
| JP | H01121747 A | 5/1989 |
| JP | H03233850 A | 10/1991 |
| JP | H10233187 A | 9/1998 |
| JP | H1125903 A | 1/1999 |
| JP | H11230087 A | 8/1999 |
| JP | 2001050944 A | 2/2001 |
| JP | 2004226313 A | 8/2004 |
| JP | 2005285543 A | 10/2005 |
| JP | 2012043672 A | 3/2012 |
| JP | 2014022075 A | 2/2014 |
| JP | 2015121406 A | 7/2015 |
| WO | 9921212 A1 | 4/1999 |
| WO | 0185312 A1 | 11/2001 |
| WO | 02101382 A1 | 12/2002 |
| WO | 2004077488 A2 | 9/2004 |
| WO | 2006061625 A1 | 6/2006 |
| WO | 2006129083 A2 | 12/2006 |
| WO | 2007071991 A2 | 6/2007 |
| WO | 2007131146 A2 | 11/2007 |
| WO | 2008071923 A2 | 6/2008 |
| WO | 2009037483 A2 | 3/2009 |
| WO | 2010064321 A1 | 6/2010 |
| WO | 2011138669 A2 | 11/2011 |
| WO | 2012058632 A1 | 5/2012 |
| WO | 2013039772 A1 | 3/2013 |
| WO | 2013064842 A2 | 5/2013 |
| WO | 2013066881 A2 | 5/2013 |
| WO | 2013098642 A2 | 7/2013 |
| WO | 2014074822 A1 | 5/2014 |
| WO | 2014191750 A1 | 12/2014 |
| WO | 2014194023 A2 | 12/2014 |
| WO | 2014194172 A2 | 12/2014 |
| WO | 2015009478 A1 | 1/2015 |
| WO | 2015040386 A1 | 3/2015 |
| WO | 2015092501 A1 | 6/2015 |
| WO | 2017122276 A1 | 7/2017 |
| WO | 2018138814 A1 | 8/2018 |

OTHER PUBLICATIONS

Invitation to Pay Additional Fees and, Where Applicable, Protest Fee for International application No. PCT/GB2019/051494, dated Sep. 19, 2019.

Combined Search and Examination Report under Sections 17 and 18(3), dated Sep. 27, 2019, for Application No. GB1907736.1, 6 pages.

Invitation to Pay Additional Fees and, Where Applicable, Protest Fees, for International application No. PCT/GB2019/051499, dated Sep. 4, 2019.

Invitation to Pay Additional Fees and, Where Applicable, Protest Fee, for International Application No. PCT/GB2019/051496, dated Aug. 29, 2019.

Anonymous, "Time-of-flight mass spectrometry", Wikipedia, Apr. 28, 2018 (Apr. 28, 2018), XP055614063, Retrieved from the Internet:URL:https://en.wikipedia.org/w/index.php title=Time-of-flight_mass_spectrometry oldid=838663844 [retrieved on Aug. 20, 2019].

Invitation to Pay Additional Fees and, Where Applicable, Protest Fees for International application No. PCT/GB2019/051497, dated Sep. 2, 2019.

Combined Search and Examination Report under Sections 17 and 18(3) for Application No. GB1907745 2, dated Aug. 13, 2019, 7 pages.

Invitation to Pay Additional Fees and, Where Applicable, Protest Fee, for International application No. PCT/GB2019/051501, dated Jul. 29, 2019, 14 pages.

International Search Report and Written Opinion for International application No. PCT/GB2019/051497, dated Nov. 5, 2019, 19 pages.

International Search Report and Written Opinion for International application No. PCT/GB2019/051503, dated Sep. 25, 2019, 17 pages.

(56) References Cited

OTHER PUBLICATIONS

International Search Report and Written Opinion for International application No. PCT/GB2019/051496, dated Oct. 23, 2019, 29 pages.
International Search Report and Written Opinion for International application No. PCT/GB2019/051506, dated Sep. 25, 2019, 14 pages.
International Search Report and Written Opinion for International application No. PCT/GB2019/051494, dated Nov. 18, 2019, 20 pages.
International Search Report and Written Opinion for International application No. PCT/GB2019/051507, dated Oct. 15, 2019, 17 pages.
International Search Report and Written Opinion for International application No. PCT/GB2019/051508, dated Oct. 23, 2019, 16 pages.
International Search Report and Written Opinion for International application No. PCT/GB2019/051499, dated Nov. 5, 2019, 19 pages.
Examination Report under Section 18(3) for Application No. GB1907719.7, dated Jul. 28, 2021, 9 pages.
Parkes, S. SpaceWire User Guide, STAR-Dundee [online] 2012 [retrieved on Aug. 13, 2021]. Retrieved from Internet URL: https://www.star-dundee.com/wp-content/star_uploads/general/SpaceWire-Users-Guide.pdf, 117 pages.
SCIEX, "3200 Series of Instruments System User Guide" [online], published Apr. 2018, available from: https://sciex.com/content/dam/SCIEX/pdf/customer-docs/user-guide/3200-system-user-guide-en.pdf, 241 pages.
Combined Search and Examination Report under Sections 17 and 18(3), for Application No. GB2100898.2, dated Jun. 21, 2021, 7 pages.
Combined Search and Examination Report under Sections 17 and 18(3), for Application No. GB2001530.1, dated Aug. 5, 2020, 7 pages.
Thermo Fisher Scientific, Inc, Feb. 2015, Orbitrap Fusion Hardware Manual [online]. Retrieved from Internet URL: http://www.unitylabservices.eu/content/dam/tfs/ATG/CMD/cmddocuments/oper/oper/ms/lc-ms/sys/Man-80000-97016-Orbitrap-Fusion-Hardware-Man8000097016-A-EN.pdf, 122 pages.
Shion, H., et al., "Meeting the Challenges of Implementing Accurate-Mass Mass Spectrometry for Biotherapeutic Development in Regulated/non-Regulated Environments", 2019 BioPharma Analytical Summit BioAccord Abstract. ASMS MS-in-QC, PowerPoint 24 pages.
International Preliminary Report on Patentability for International application No. PCT/GB2019/051510, dated Dec. 1, 2020, 7 pages.
Examination Report under Section 18(3) for Application No. GB1907739.5, dated Nov. 3, 2020, 5 pages.
Combined Search and Examination Report under Sections 17 and 18(3) for Application No. GB1808932.6, dated Nov. 21, 2018, 4 pages.
Combined Search and Examination Report under Sections 17 and 18(3) for Application No. GB1808890.6, dated Nov. 28, 2018, 7 pages.
Combined Search and Examination Report under Sections 17 and 18(3) for Application No. GB1808912.8, dated Nov. 30, 2018, 10 pages.
Combined Search and Examination Report under Sections 17 and 18(3) for Application No. GB1808942.5, dated Dec. 3, 2018, 7 pages.
Chernushevich, I. V., et al., "An introduction to quadrupole-time-of-flight mass spectrometry", Journal of Mass Spectrometry, 36(8):849-65 (2001) Abstract only.
Chernushevich, I.V., et al., "Charge state separation for protein applications using a quadrupole time-of-flight mass spectrometer", Rapid Communications in Mass Spectrometry 17(13):1416-1424 (2003). Abstract only.
Makarov, A. et al., "Performance evaluation of a hybrid linear ion trap/orbitrap mass spectrometer," Analytical Chemistry, 78(7):2113-20 (2006). Abstract only.

Combined Search and Examination Report under Sections 117 and 18(3) for Application No. GB1808948.2 dated Nov. 21, 2018, 7 pages.
Combined Search and Examination Report under Sections 17 and 18(3) for Application No. GB1808893.0 dated Nov. 27, 2018, 8 pages.
Combined Search and Examination Report under Sections 17 and 18(3) for Application No. GB1808936.7 dated Nov. 20, 2018, 10 pages.
Combined Search and Examination Report under Sections 17 and 18(3) for Application No. GB1808892.2, dated Dec. 3, 2018, 6 pages.
Combined Search and Examination Report under Sections 17 and 18(3) for Applicaton No. GB1808894.8 dated Dec. 3, 2018, 7 pages.
Combined Search and Examination Report under Sections 17 and 18(3) for Application No. GB1808949.0 dated Oct. 31, 2018, 8 pages.
Combined Search and Examination Report under Sections 17 and 18(3) for Application No. GB1907722.1 dated Jun. 28, 2019, 8 pages.
Combined Search and Examination Report under Sections 17 and 18(3) for Application No. GB1808889.8 dated Nov. 30, 2018, 7 pages.
International Search Report and Written Opinion for International application No. PCT/GB2019/051504, dated Jul. 23, 2019, 11 pages.
Combined Search and Examination Report under Sections 17 and 18(3) for Application No. GB1818003.4, dated May 2, 2019, 6 pages.
Invitation to pay additional fees and, where applicable, protest fee for PCT/GB2019/051508, dated Aug. 28, 2019.
Author unknown, "Operating Manual and Programming Reference, Models RGA100, RGA200, and RGA300 Residual Gas Analyzer," Stanford Research Systems Revision 1.8 (May 2009).
Jungmann, J. H., et al., "An in-vacuum, pixelated detection system for mass spectrometric analysis and imaging of macromolecules," International Journal of Mass Spectrometry, 341-342:34-44 (2013).
Invitation to pay additional fees and, where applicable, protest fee for International application No. PCT/GB2019/051507, dated Aug. 20, 2019, 16 pages.
Yang, C., and Hanley, L., "ChiMS: Open-source instrument control software platform on LabVIEW for imaging/depth profiling mass spectrometers," Review of Scientific Instruments, 86:065106-1 through 065016-7 (2015).
Invitation to pay additional fees and, where applicable, protest fee for International application No. PCT/GB2019/051506, dated Jul. 22, 2019, 13 pages.
Invitation to pay addition al fees and, where applicable, protest fee for PCT/GB2019/051503, dated Jul. 25, 2019, 17 pages.
International Search Report and Written Opinion for International application No. PCT/GB2019/051500, dated Aug. 5, 2019, 9 pages.
Kozlov, B., et al., "Time-of-flight mass spectrometer for investigations of laser ablation," ASMS Conference paper, Dallas, TX (May 1999). [Retrieved from the Internet URL: https//www.researchgate.net/publication/330202298_Time-of-flight_mass_spectrometer_for_investigations_of_laser_ablation]. Abstract.
Shion, H., et al., "Towards Overcoming the Challenges of Implementing Accurate Mass MS for Routine Biotherapeutic Analysis" 2018 ASMS Prototype oa-TOF Abstract HYS Final.
Shion, S., et al., "Towards Overcoming the Challenges of Implementing Accurate Mass MS for Routine Biotherapeutic Analysis" 2018 ASMS Prototype oa-TOF WP699 HYS Final Poster.
Shion, H., et al., "A Fit-for-purpose Accurate Mass MS for Routine Biotherapeutic Analysis", 2018 CASSS Mass Spec HYS Final Poster.
Shion, H., et al., "A Fit-for-purpose Accurate Mass MS for Routine Biotherapeutic Analysis", 2018 CASSS Mass Spec BioTof HYS Final, Abstract.
Shion, H., et al., "Progress Towards Implementing Simple Time-of-flight Accurate Mass MS for Routine Biotherapeutic Analysis", XXII (IMSC) International Mass Spectrometry Conference Florence, Italy (2018) Abstract.

(56) References Cited

OTHER PUBLICATIONS

Shion, H., et al., "Progress Towards Implementing Simple Time-of-flight Accurate Mass MS for Routine Biotherapeutic Analysis", XXII International Mass Spectrometry Conference Florence, Italy (2018) poster.
Shion, H., et al., "Meeting the Challenges of Implementing Accurate-Mass Mass Spectrometry for Biotherapeutic Development in Regulated/non-Regulated Environments", 2019 ASMS BioAccord Oral Session PowerPoint.
Shion, H., et al., "Meeting the Challenges of Implementing Accurate-Mass Mass Spectrometry for Biotherapeutic Development in Regulated/non-Regulated Environments", 2019 ASMS BioAccord Abstract.
Shion, H., et al., "Meeting the Challenges of Implementing Accurate-Mass Mass Spectrometry for Biotherapeutic Development in Regulated/non-Regulated Environments" 2019 ATEurope BioAccord, Abstract.
Shion, H., et al., "Meeting the Challenges of Implementing Accurate-Mass Mass Spectrometry for Biotherapeutic Development in Regulated/non-Regulated Environments" 2019 ATEurope BioAccord, Poster.
Shion, H., et al., "Meeting the Challenges of Implementing Accurate-Mass Mass Spectrometry for biotherapeutic Development in Regulated/non-Regulated Environments", 2019 BioPharma Analytical Summit BioAccord, abstract.
Shion, H., et al., "Meeting the Challenges of Implementing Accurate-Mass Mass Spectrometry for Biotherapeutic Development in Regulated/non-Regulated Environments", 2019 Bio Pharma Summit BioAccord, Poster.
Shion, H., "Enabling Routine and Reproducible Biotherapeutic Analysis when Data Integrity Matters", 2019 15th Annual PEGs Boston Waters BioAccord, PowerPoint 29 pages.
Shion, H., "Enabling Routine and Reproducible Biotherapeutic Analysis when Data Integrity Matters", 2019 15th Annual PEGs Boston Waters BioAccord, Abstract.
Shion, H., et al., "Meeting the Challenges of Implementing Accurate-Mass Mass Spectrometry for Biotherapeutic Development in Regulated/non-Regulated Environments", 2019 Pitt Con Bio Accord, Poster.
Shion, H., et al., "Meeting the Challenges of Implementing Accurate-Mass Mass Spectrometry for Biotherapeutic Development in Regulated/non-Regulated Environments", 2019 Pitt Con Bio Accord, Abstract.
Combined Search and Exam Report from IPO for GB Application No. 1907739.5, dated Nov. 27, 2019, 8 pages.
International Search Report and Written Opinion for International application No. PCT/GB2019/051510, dated Aug. 29, 2019, 13 pages.
Combined Search and Exam Report from IPO for GB Application No. 1907735.3, dated Nov. 25, 2019, 7 pages.
Combined S and E Report under Sections 17 and 18(3) for Application No. GB1907734.6, dated Oct. 31, 2019, 7 pages.
International Search Report and Written Opinion for International Application No. PCT/GB2019/051498, dated Nov. 6, 2019, 21 pages.
Combined Search and Examination Report under Sections 17 and 18(3) for Application No. GB1907719.7, dated Nov. 15, 2019, 11 pages.
Author unknown, "Waters Xevo G2-S QTof Operators Overview and Maintenance Guide", Feb. 11, 2013 (Feb. 11, 2013), XP55606374, Retrieved from the Internet: URL:https://www.waters.eom/webassets/cms/support/docs/xevo_g2-s_qtof_715003596rb.pdf [retrieved on Jul. 17, 2019].
International Search Report and Written Opinion for International application No. PCT/GB2019/051501, dated Sep. 25, 2019, 17 pages.
Examination Report under Section 18(3) for Application No. GB2020743.7, dated Jan. 28, 2022, 6 pages.

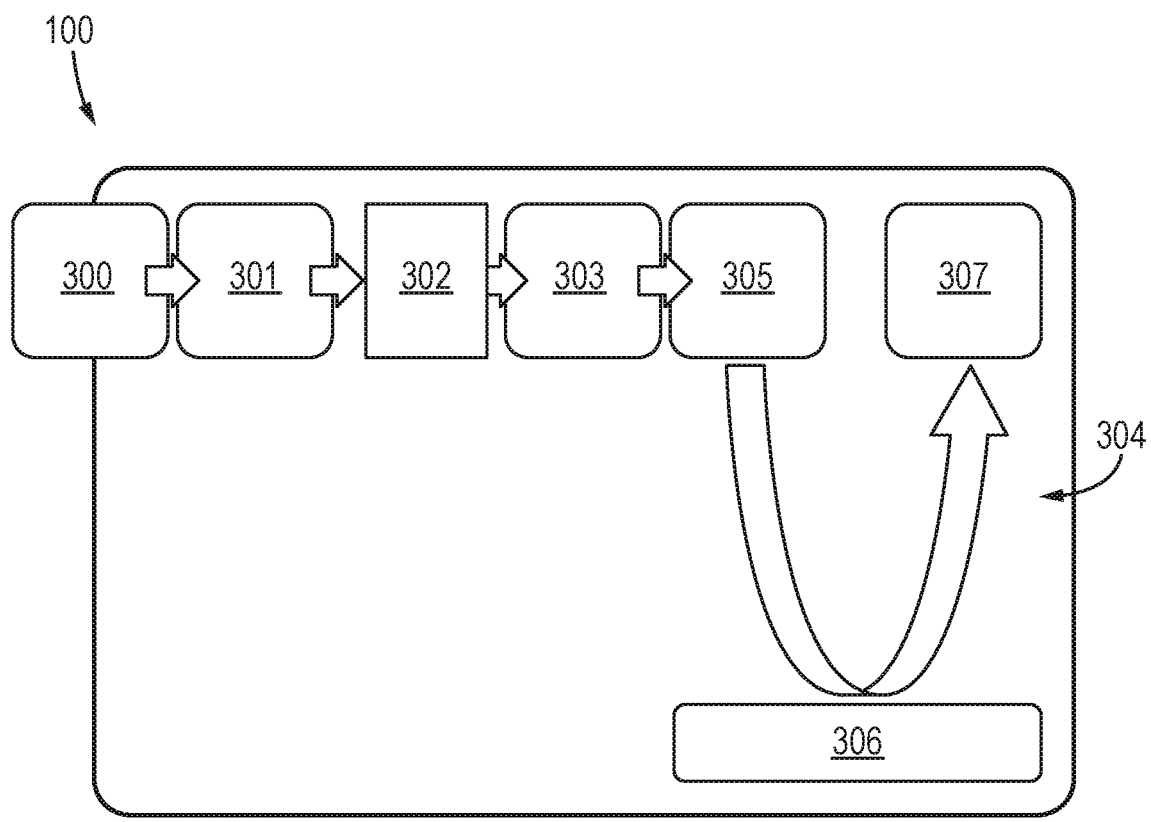

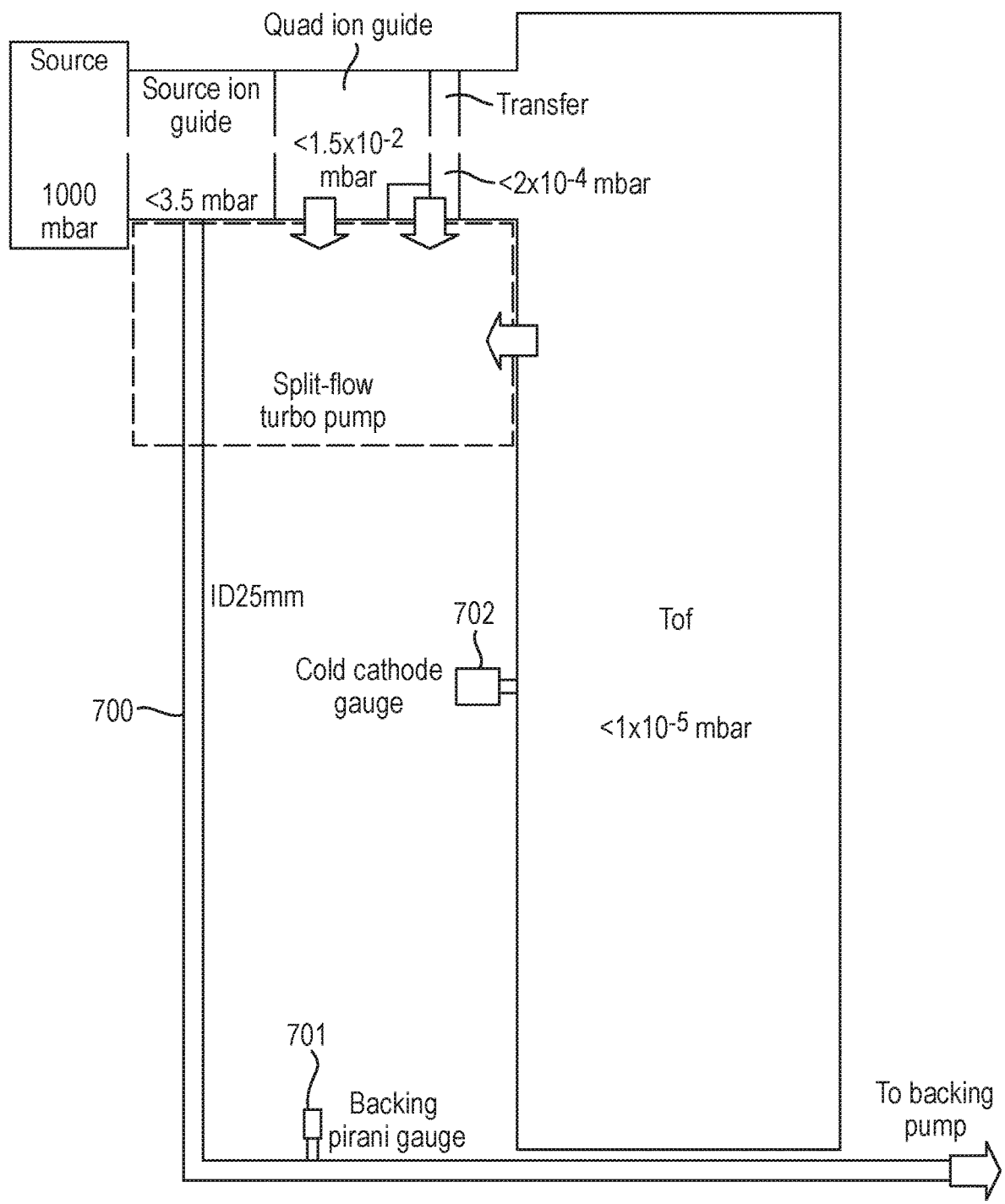

Fig. 15C
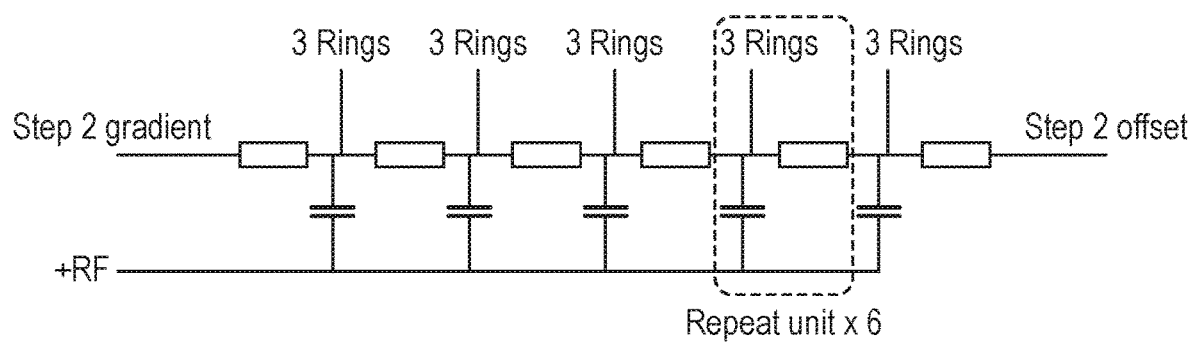
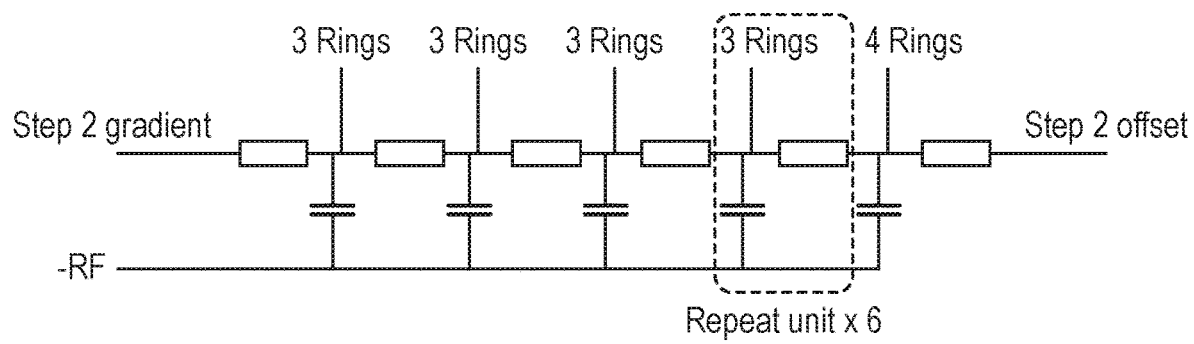

Fig. 16F

| Control Name | Relative voltage | | | Absolute volatge range (V) | Polarity* |
|---|---|---|---|---|---|
| | Range from (V) | Range (V) | w.r.t. | | |
| Capillary | 0 | 1500 | Ground | 1500 | Same |
| Source offset | 0 | 30 | Step 1 gradient | 400 | Same |
| Step 1 gradient | 0 | 30 | Step 1 offset | 370 | Same |
| Step 1 offset | 0 | 40 | Step 2 offset (cone) | 340 | Same |
| Step 2 gradient | 0 | 40 | Step 2 offset (cone) | 340 | Same |
| Step 2 offset (cone) | 0 | 200 | Aperture 1 | 300 | Same |
| Aperture 1 | 0 | 10 | Ion guide gradient | 100 | Same |
| Ion guide gradient | 0 | 5 | Ion guide offset A | 90 | Same |
| Ion guide offset A | 0 | 5 | Ion guide offset B (entrance) | 85 | Same |
| Ion guide offset B (entrance) | 0 | 80 | Ground | 80 | Same |
| Aperture 2 | 0 | 10 | Ion guide offset (entrance) | 80 | Opposite |
| Aperture 2 trap | 0 | 10 | Ion guide offset (entrance) | 90 | Same |
| Acceleration 1 | 0 | 100 | Ion guide offset (entrance) | 80 | Opposite |
| Acceleration 2 | 0 | 100 | Ion guide offset (entrance) | 80 | Opposite |
| Aperture 3 | 0 | 0 | Ground | 0 | n/a |
| Transport 1 | 0 | 100 | Ion guide offset (entrance) | 80 | Opposite |
| Transport 2 | 0 | 100 | Ion guide offset (entrance) | 85 | Opposite |
| Steering | -5 | 5 | Transport 2 | 85 | Opposite |
| Tube lens | 0 | 0 | Ground | 0 | n/a |
| Entrance plate | 0 | 0 | Ground | 0 | n/a |
| Pusher | 0 | 1100 | Ground | 1000 | Same |
| Pusher offset | -5 | 5 | Ground | 10 | Same |
| Third grid | 0 | 0 | Ground | 0 | n/a |
| Second grid | 0 | 0 | Ground | 0 | n/a |
| Flight tube | 0 | 4500 | Ground | 4500 | Opposite |
| Reflectron grid | 0 | 0 | Ground | 0 | n/a |
| Reflectron | 0 | 1725 | Ground | 1725 | Same |
| Detector | 0 | 4000 | Flight tube | 8500 | Positive |

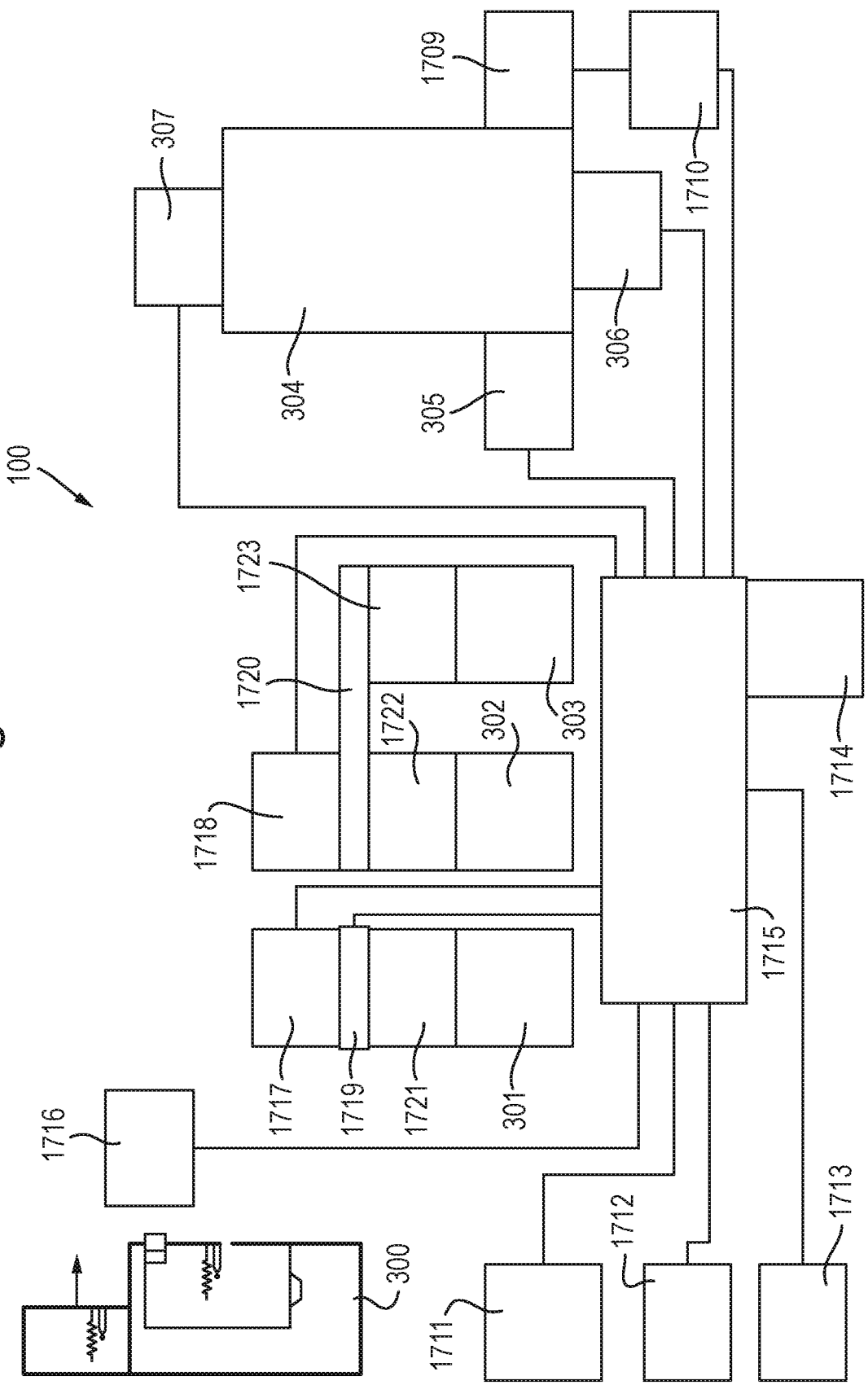

section X-X

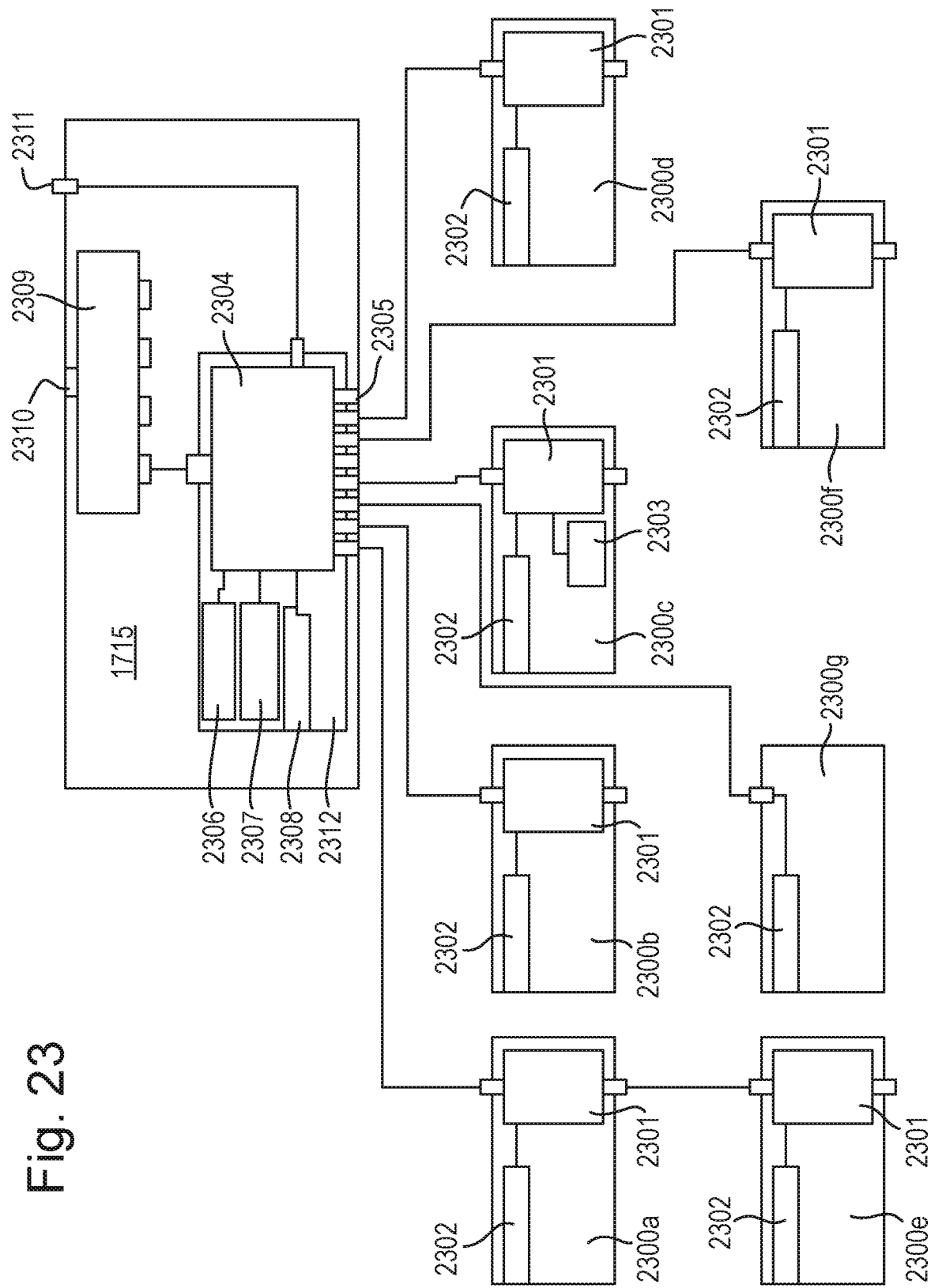

MASS SPECTROMETER

CROSS-REFERENCE TO RELATED APPLICATIONS

This application is a U.S. national phase filing claiming the benefit of and priority to International Patent Application No. PCT/GB2019/051507, filed on May 31, 2019, which claims priority from and the benefit of United Kingdom patent application No. 1808892.2 filed on May 31, 2018. The entire contents of these applications are incorporated herein by reference.

FIELD OF THE INVENTION

The present invention relates generally to mass spectrometry and in particular to the control and/or configuration of mass spectrometers. Various embodiments may relate to a small footprint or bench-top Time of Flight ("TOF") mass spectrometer which has particular application in the biopharmaceutical industry.

BACKGROUND

Conventional mass spectrometers which may be used, for example, in the biopharmaceutical industry tend to be relatively complex and have a relatively large footprint.

Scientists in the biopharmaceutical industry need to collect high resolution accurate mass data for their samples in order to provide more comprehensive information than can be obtained using LCUV analysis. Conventionally, this is typically achieved either by running relatively complex mass spectrometry equipment or by outsourcing the analysis to a specialist service.

It is desired to provide improvements in the control and/or configuration of mass spectrometers. In various embodiments it may be desired to provide a reduced footprint Time of Flight ("TOF") mass spectrometer which may have particular application in the biopharmaceutical industry.

SUMMARY

According to an aspect and various embodiments there is provided a mass spectrometer comprising:

an ion optics device housing having one or more external electrical connectors provided thereon;

an ion optics device arranged inside the ion optics device housing, the ion optics device comprising one or more electrodes for manipulating ions, the one or more electrodes being electrically connected to the one or more external electrical connectors provided on the ion optics device housing;

a voltage supply housing having one or more external electrical connectors provided thereon; and one or more voltage supplies arranged inside the voltage supply housing, the one or more voltage supplies being in electrical communication with the one or more external electrical connectors provided on the voltage supply housing;

wherein the one or more external electrical connectors provided on the voltage supply housing are directly physically and electrically connected to the one or more external electrical connectors provided on the ion optics device housing.

According to another aspect and various embodiments there is provided a method of assembling a mass spectrometer, the method comprising:

providing an ion optics device housing having one or more external electrical connectors provided thereon;

providing an ion optics device arranged inside the ion optics device housing, the ion optics device comprising one or more electrodes for manipulating ions, the one or more electrodes being electrically connected to the one or more external electrical connectors provided on the ion optics device housing;

providing a voltage supply housing having one or more external electrical connectors provided thereon; and providing one or more voltage supplies arranged inside the voltage supply housing, the one or more voltage supplies being in electrical communication with the one or more external electrical connectors provided on the voltage supply housing;

wherein the one or more external electrical connectors provided on the voltage supply housing are directly physically and electrically connected to the one or more external electrical connectors provided on the ion optics device housing.

The above aspects and embodiments can provide a mass spectrometer in which an ion optics device housing and voltage supply housing can be provided separately. This can substantially isolate the respective components of those housings to reduce or avoid undesirable interference and/or allow the mass spectrometer to be readily configured and/or reconfigured. Furthermore, the above aspects and embodiments can provide a mass spectrometer in which the voltage propagation distance between the one or more voltage supplies and the one or more electrodes of the ion optics device can still be reduced, and this can help to reduce or avoid undesirable variability in the various voltages required by the ion optics device which might otherwise be introduced by a long cable between the one or more voltage supplies in the voltage supply housing and the one or more electrodes of the ion optics device in the ion optics device housing.

The above aspects and embodiments can be provided in any of the other aspects and embodiments described herein, unless the context requires otherwise.

In any of the aspects or embodiments described herein, the one or more external electrical connectors provided on the voltage supply housing may be repeatedly removably connectable to the one or more external electrical connectors provided on the ion optics device housing.

The one or more external electrical connectors provided on the ion optics device housing may be provided on one or more interface PCBs, such as one or more vacuum interface PCBs, provided on the ion optics device housing. The one or more interface PCBs may comprise one or more substantially rigid PCBs.

The ion optics device housing may comprise a vacuum housing. The ion optics device housing may comprise one or more vacuum chambers. The one or more interface PCBs may cover one or more apertures leading to one or more vacuum chambers in the ion optics device housing. The one or more interface PCBs may substantially seal the one or more vacuum chambers. One or more seals may be provided between the ion optics device housing and the one or more interface PCBs. The one or more seals may be provided in one or more channels in the ion optics device housing and the one or more interface PCBs.

The ion optics device may comprise one or more ion guides and/or one or more ion transfer lenses. The ion optics device housing may comprise an ion guide and/or ion transfer lens housing.

The one or more electrodes may comprise: one or more ring and/or ring segment electrodes having one or more apertures through which ions are transmitted in use; one or more planar or plate electrodes; and/or one or more rod set electrodes, such as one or more segmented rod set electrodes; or combinations thereof.

The one or more electrodes may comprise a first set of one or more electrodes and a second set of one or more electrodes. Ion may be transferable between a first ion path formed by the first set of one or more electrodes and a second ion path formed by the second set of one or more electrodes. The first ion path may be substantially parallel to the second ion path. The first ion path may extend alongside some or all of the second ion path. The cross-sectional area of the first ion path may be larger than the cross-sectional area of the second ion path.

The one or more electrodes may be placed in electrical communication with one or more external electrical connectors provided on the ion optics device housing via one or more internal PCBs arranged inside the ion optics device housing. The one or more internal PCBs may comprise one or more substantially rigid PCBs or PCB portions and/or one or more substantially flexible PCBs or PCB portions. The one or more substantially flexible PCBs or PCB portions may have a curved and/or stepped profile. These embodiments can facilitate connection to the one or more electrodes within a relatively confined space within the ion optics housing.

The one or more voltage supplies may comprise one or more AC or RF and/or DC voltage supplies.

According to another aspect and various embodiments there is provided a method of mass spectrometry, the method comprising providing a mass spectrometer as described herein in any aspect or embodiment, and providing one or more voltages to the one or more electrodes in order to manipulate ions, e.g. in a manner as described herein in any aspect or embodiment.

According to another aspect and various embodiments there is provided an ion optics device comprising:
one or more electrodes for manipulating ions; and
first and second ion optics printed circuit boards (PCBs), wherein the one or more electrodes are provided between and mounted to the first and second ion optics PCBs.

According to another aspect and various embodiments there is provided a method of assembling an ion optics device, the method comprising:
providing one or more electrodes for manipulating ions; and
providing first and second ion optics printed circuit boards (PCBs), wherein the one or more electrodes are provided between and mounted to the first and second ion optics PCBs.

The above aspects and embodiments can provide a compact and robust ion optics device that can be readily electrically connected to one or more voltage supplies for applying one or more voltages to the one or more electrodes.

The above aspects and embodiments can be provided in any of the other aspects and embodiments described herein, unless the context requires otherwise.

In any of the aspects or embodiments described herein, the one or more electrodes may be directly mounted to the first and second ion optics PCBs. The one or more electrodes may be (directly) soldered to the first and second ion optics PCBs. The first and second ion optics PCBs may comprise substantially rigid PCBs. The first and second ion optics PCBs may be substantially parallel to each other. The first and second ion optics PCBs may comprise one or more connectors for electrically connecting the one or more electrodes to one or more voltage supplies.

According to another aspect and various embodiments there is provided an ion optics device housing comprising one or more ion optics devices as described herein in any aspect or embodiment.

According to another aspect and various embodiments there is provided a method of assembling an ion optics device housing, the method comprising providing one or more ion optics devices as described herein in any aspect or embodiment within the ion optics device housing.

In any of the aspects and embodiments described herein, the first and second ion optics PCBs may be electrically connectable or connected to one or more voltage supplies via one or more internal printed circuit boards (PCBs) arranged inside the ion optics device housing, for example as described above.

The first and second ion optics PCBs may be electrically connectable or connected to one or more voltage supplies via one or more interface printed circuit boards (PCBs) provided on a surface of an ion optics device housing, e.g. via the one or more internal PCBs, for example as described above.

The planes of the first and second ion optics PCBs may be substantially orthogonal to one or more interface PCBs provided on a surface of the ion optics housing. Providing ion optics PCBs that are substantially orthogonal to the one or more interface PCBs, e.g. rather than ion optics PCBs that are substantially parallel to the one or more interface PCBs, can again help to reduce the voltage propagation distance between the various voltage sources and the electrodes of the ion optics device.

According to another aspect and various embodiments there is provided a mass spectrometer comprising one or more ion optics devices and/or ion optics device housings as described herein in any aspect or embodiment.

According to another aspect and various embodiments there is provided a method of assembling a mass spectrometer, the method comprising providing one or more ion optics devices and/or ion optics device housings as described herein in any aspect or embodiment as part of the mass spectrometer.

According to another aspect and various embodiments there is provided a method of mass spectrometry, the method comprising providing a mass spectrometer comprising one or more ion optics devices and/or ion optics device housings as described herein in any aspect or embodiment, and providing one or more voltages to the one or more electrodes of the one or more ion optics devices in order to manipulate ions, e.g. in a manner as described herein in any aspect or embodiment.

According to another aspect there is provided an analogue interface for a functional module that is operable to perform a predetermined function of a mass spectrometer, the analogue interface comprising:
a transceiver for digital communication with a system control module of the mass spectrometer;
a DAC for generating one or more analogue signals to be used by the functional module and/or an ADC for sampling one or more analogue signals generated by the functional module; and
controller circuitry operable to communicate with the system control module using the transceiver, the controller circuitry being operable to control the DAC to generate one or more analogue signals to be used by the functional module and/or being operable to control the ADC to sample one or more analogue signals generated by the functional module.

According to another aspect there is provided a method of controlling a functional module that is operable to perform a predetermined function of a mass spectrometer, the method comprising:

providing an analogue interface for the functional module, the analogue interface comprising:
- a transceiver for digital communication with a system control module of a mass spectrometer;
- a DAC for generating one or more analogue signals to be used by the functional module and/or an ADC for sampling one or more analogue signals generated by the functional module; and
- controller circuitry operable to communicate with the system control module using the transceiver; and operating the controller circuitry to control the DAC to generate one or more analogue signals to be used by the functional module and/or to control the ADC to sample one or more analogue signals generated by the functional module.

The above aspects and embodiments can provide a convenient way to communicate digitally with one or more functional modules of a mass spectrometer that comprises one or more analogue components. For example, substantially the same "universal" analogue interface may be provided for each one of plural (analogue) functional modules of a mass spectrometer.

The above aspects and embodiments can be provided in any of the other aspects and embodiments described herein, unless the context requires otherwise.

In any of the aspects or embodiments described herein the analogue interface may comprise one or more printed circuit boards (PCBs), such as a single PCB. The transceiver and/or DAC and/or ADC and/or controller circuitry may be provided on one or more PCBs, such as on a single PCB. The analogue interface (PCB) may form part of a cable for the functional module that connects the functional module to a system control module of the mass spectrometer. The analogue interface (PCB) may be encapsulated within the cable. These embodiments can allow the analogue interface (PCB) to be provided outside of the operational parts of the functional module. The analogue interface (PCB) may instead form part of the control circuitry of the functional module.

The analogue interface (PCB) may comprise an output amplifier, such as a differential amplifier, for amplifying the one or more analogue signals to be used by the functional module. The analogue interface (PCB) may comprise an input amplifier, such as a differential amplifier, for amplifying the one or more analogue signals generated by the functional module.

The analogue interface (PCB) may comprise one or more state detectors (e.g. optocouplers) for detecting states on one or more transducers and/or sensors that form part of the functional module. The analogue interface (PCB) may comprise one or more state switches (e.g. open collectors (FETs)) for switching power to one or more transducers/sensors that form part of the functional module. The controller circuitry may be operable to control the one or more state switches.

The analogue interface (PCB) may comprise electronic storage for storing an identifier that can be used to identify the functional module to a system control module of the mass spectrometer.

The functional module may comprise one or more analogue components, such as one or more analogue sensors and/or analogue transducers and/or analogue gauges and/or analogue actuators. The functional module may comprise one or more state switches.

According to another aspect and various embodiments there is provided a mass spectrometer comprising a system control module for controlling the operation of the mass spectrometer, one or more functional modules that are operable to perform a predetermined function of the mass spectrometer, and one or more analogue interfaces for the one or more functional modules as described herein in any aspect or embodiment.

According to another aspect and various embodiments there is provided a method of mass spectrometry, the method comprising providing a mass spectrometer comprising a system control module for controlling the operation of the mass spectrometer, one or more functional modules that are operable to perform a predetermined function of a mass spectrometer, and one or more analogue interfaces for the one or more functional modules as described herein in any aspect or embodiment, the method further comprising operating the system control module to communicate with the one or more functional modules via the one or more analogue interfaces for the one or more functional modules, e.g. in a manner as described herein in any aspect or embodiment.

According to another aspect and various embodiments there is provided a functional module operable to perform a predetermined function of a mass spectrometer, the functional module comprising:

electronic storage for storing an identifier that can be used to identify the functional module to a system control module of the mass spectrometer;

wherein the functional module is operable to, when interrogated by the system control module, provide the identifier stored in the electronic storage to the system control module.

According to another aspect and various embodiments there is provided a method of identifying a functional module that is operable to perform a predetermined function of a mass spectrometer, the method comprising:

providing electronic storage for the functional module, the electronic storage storing an identifier that can be used to identify the functional module to a system control module of the mass spectrometer; and operating the functional module to, when interrogated by the system control module, provide the identifier stored in the electronic storage to the system control module.

The above aspects and embodiments can provide a convenient way for a system control module of a mass spectrometer to identify the one or more functional modules of the mass spectrometer, and therefore can allow the mass spectrometer to configure itself appropriately for operation. Furthermore, since a functional module is able to identify itself to the system control module using the identifier, the above aspects and embodiments can allow the one or functional modules to be connected to substantially any port of plural ports of the system control module. This in turn can allow the mass spectrometer to be straightforwardly and reliably configured and/or reconfigured using various different functional modules connected to the system control module in a variety of different ways.

The above aspects and embodiments can be provided in any of the other aspects and embodiments described herein, unless the context requires otherwise.

In any of the aspects or embodiments described herein, the electronic storage may comprise an (e.g. electronically) erasable and/or programmable and/or read-only memory, such as EEPROM.

The identifier for a functional module may identify a type and/or a variant and/or a use for the functional module.

A functional module may comprise electrical, mechanical, electromechanical, or software components; or a combination thereof. The components may be configured so as to carry out, on demand, the predetermined function.

For example, a functional module may comprise: one or more ion source components; one or more ion guide components; one or more transfer lens components; one or more mass analyser components, such as a pusher electrode, a reflectron, an ion detector, a pre-amplifier, an ion signal ADC, etc.; one or more fluidics components; one or more front display panel components; one or more gauges; one or more sensors; one or more pumps; one or more valves; and/or one or more actuators; etc. The functional module may also or instead comprise one or more local control modules and/or (e.g. analogue) interfaces for such components.

One or more such functional modules may be the functional blocks which together form some or all of the mass spectrometer according to various embodiments. Two or more functional modules may be physically discrete from one another, each being embodied in a separate unit and/or housing and/or having separate components. Two or more functional modules may also or instead be provided within a single physical unit and/or housing and/or may share one or more components. A functional module may be contained within a single physical unit and/or housing. A functional module may also or instead be distributed across plural physical units and/or housings. A functional module may also or instead be defined in software.

The functional module may comprise a connector for connecting plural pins and/or wires to the system control module. The identifier may be provided to the system control module serially and/or digitally via a single pin and/or wire of the connector. This can avoid the communication of the identifier from interfering with other communication provided by the connector.

According to another aspect and various embodiments there is provided a mass spectrometer comprising a system control module for controlling the operation of the mass spectrometer and one or more functional modules as described herein in any aspect or embodiment.

The system control module may comprise processing circuitry operable and/or operated to determine a configuration of the mass spectrometer.

In any of the aspects or embodiments described herein, determining a configuration of the mass spectrometer may comprise obtaining, from the electronic storage for the one or more functional modules, the one or more identifiers for the one or more functional module and determining the identity of the one or more functional modules from the obtained one or more identifiers.

Determining a configuration of the mass spectrometer may comprise obtaining operating parameters for the functional module. The operating parameters may be obtained from electronic storage. The electronic storage may comprise electronic storage of the system control module or other controller of the mass spectrometer and/or electronic storage of an external server for the mass spectrometer.

Determining a configuration of the mass spectrometer may be performed manually and/or automatically. Determining a configuration of the mass spectrometer may be automatically performed: at start-up; upon detecting that a connector has been removed from a connector port; upon detecting that a connector has been connected to a connector port; when switching from or to a mode of operation, such as a power save, standby, maintenance and/or failure mode of operation; and/or periodically.

According to another aspect and various embodiments there is provided a method of mass spectrometry, the method comprising providing a mass spectrometer comprising a system control module for controlling the operation of the mass spectrometer and one or more functional modules as described herein in any aspect or embodiment, the method further comprising operating the system control module to determine a configuration of the mass spectrometer, e.g. in a manner as described herein in any aspect or embodiment.

According to another aspect there is provided a mass spectrometer comprising:

a system control module for controlling the operation of the mass spectrometer; and one or more functional modules, each functional module being operable to perform a predetermined function of the mass spectrometer;

wherein the system control module and/or one or more functional modules are operable to communicate non-time information with each other using a time code of a communications protocol.

According to another aspect there is provided a method of mass spectrometry, the method comprising:

providing a system control module for controlling the operation of the mass spectrometer;

providing one or more functional modules, each functional module being operable to perform a predetermined function of the mass spectrometer; and operating the system control module and/or one or more functional modules to communicate non-time information with each other using a time code of a communications protocol.

The above aspects and embodiments can provide a way for the system control module and/or one or more functional modules to communicate non-time information with each other with lower jitter and/or latency, which is generally a property of time codes in communications protocols.

The above aspects and embodiments can be provided in any of the other aspects and embodiments described herein, unless the context requires otherwise.

In any of the aspects or embodiments described here, the communications protocol may comprise a data packet based communications protocol. The communications protocol may comprise a SpaceWire communications protocol.

The time code may comprise one or more flag bits. The one or more flag bits may be used to indicate the type of information being communicated. The indicated type of information may comprise critical, non-critical or control state information. The time code may comprise one or more system time bits. The one or more system time bits may convey the payload information being communicated. The one or more flag bits may be used to indicate the type of payload information being conveyed in the one or more system time bits. The payload information being conveyed may comprise critical, non-critical and/or control state information.

As discussed above, a functional module may comprise electrical, mechanical, electromechanical, or software components; or a combination thereof. The components may be configured so as to carry out, on demand, the predetermined function.

For example, a functional module may comprise: one or more ion source components; one or more ion guide components; one or more transfer lens components; one or more mass analyser components, such as a pusher electrode, a reflectron, an ion detector, a pre-amplifier, an ion signal ADC, etc.; one or more fluidics components; one or more front display panel components; one or more gauges; one or more sensors; one or more pumps; one or more valves; and/or one or more actuators; etc. The functional module may also or instead comprise one or more local control modules and/or (e.g. analogue) interfaces for such components.

One or more such functional modules may be the functional blocks which together form some or all of the mass spectrometer according to various embodiments. Two or more functional modules may be physically discrete from one another, each being embodied in a separate unit and/or housing and/or having separate components. Two or more functional modules may also or instead be provided within a single physical unit and/or housing and/or may share one or more components. A functional module may be contained within a single physical unit and/or housing. A functional module may also or instead be distributed across plural physical units and/or housings. A functional module may also or instead be defined in software.

The one or more functional modules may be operable and/or operated to communicate information with each other using the time code of the communications protocol in order to operate in one or more modes of operation, for example as described herein in any aspect or embodiment.

According to another aspect there is provided a mass spectrometer comprising:

a system control module for controlling the operation of the mass spectrometer; and one or more functional modules, each functional module being operable to perform a predetermined function of the mass spectrometer;

wherein the system control module and/or one or more functional modules are operable to communicate information with each other in order to configure and/or reconfigure the mass spectrometer to operate in one or more modes of operation.

According to another aspect there is provided a method of mass spectrometry, the method comprising:

providing a system control module for controlling the operation of the mass spectrometer;

providing one or more functional modules, each functional module being operable to perform a predetermined function of the mass spectrometer; and operating the system control module and/or one or more functional modules to communicate information with each other in order to configure and/or reconfigure the mass spectrometer to operate in one or more modes of operation.

The above aspects and embodiments can allow the mass spectrometer to be configured and/or reconfigured to operate in a variety of advantageous modes of operation.

The above aspects and embodiments can be provided in any of the other aspects and embodiments described herein, unless the context requires otherwise.

In any of the aspects or embodiments described herein, the one or more modes of operation may comprise a power save mode of operation. The power save mode of operation may include partially and/or fully powering down some or all of the one or more functional modules, e.g. whilst still allowing the mass spectrometer to return to a normal operational state when desired without the need for a complete restart of the mass spectrometer. The power save mode of operation may be selected manually, e.g. by an operator of the mass spectrometer pressing (e.g. tapping) a button. The power save mode of operation may also or instead be selected automatically.

The one or more modes of operation may comprise a standby mode of operation. The standby mode of operation may include partially and/or fully powering down some or all of the one or more functional modules, e.g. whilst still allowing the mass spectrometer to return to a normal operational state when desired without the need for a complete restart of the mass spectrometer. The standby mode of operation may be selected manually, e.g. by an operator of the mass spectrometer pressing (e.g. and holding) a button. The standby mode of operation may also or instead be selected automatically.

The one or more modes of operation may comprise a maintenance mode of operation. The maintenance mode of operation may include partially and/or fully powering down some or all of the functional modules, e.g. into a substantially safe state so that those functional modules can be safely tested and/or repaired and/or removed from the mass spectrometer. The maintenance mode of operation may be selected manually, e.g. by a service engineer. The standby mode of operation may also or instead be selected automatically.

The one or more modes of operation may comprise one or more failure modes of operation. A failure mode of operation may comprise an over pressure mode of operation. A failure mode of operation may comprise a gas fail mode of operation. The failure mode of operation may include partially or fully powering down some or all of the functional modules into a substantially safe state. The failure mode of operation may be automatically entered upon detection of one or more failure conditions, such as over pressure (vacuum failure) or gas failure. The one or more failure conditions may be indicated by one or more functional modules, such as one or more (pressure) gauges, one or more (pressure) sensors, etc.

The one or more modes of operation may comprise a lock mass mode of operation. The mode of operation may comprise an $MS^E$ mode of operation. This may include instructing one or more functional modules that are operable to and/or operated to perform ion collisions to alternate, e.g. rapidly, between a lower collision energy mode (for little or no fragmentation) and higher collision energy mode (for fragmentation).

The instructions for a mode of operation may be indicated using a time code of a particular communications (e.g. SpaceWire) protocol as described above and may comprise indicating that the instructions are "critical", "non-critical" and/or "control state" instructions. For example, the instructions for switching between the lower and higher collision energy modes may be indicated using a time code of a particular communications (e.g. SpaceWire) protocol as described above.

According to various embodiments a relatively small footprint or compact Time of Flight ("TOF") mass spectrometer ("MS") or analytical instrument is provided which has a relatively high resolution. The mass spectrometer may have particular application in the biopharmaceutical industry and in the field of general analytical Electrospray Ionisation ("ESI") and subsequent mass analysis. The mass spectrometer according to various embodiments is a high performance instrument wherein manufacturing costs have been reduced without compromising performance.

The instrument according to various embodiments is particularly user friendly compared with the majority of other conventional instruments. The instrument may have single button which can be activated by a user in order to turn the instrument ON and at the same time initiate an instrument self-setup routine. The instrument may, in particular, have a health diagnostics system which is both helpful for users whilst providing improved diagnosis and fault resolution.

According to various embodiments the instrument may have a health diagnostics or health check which is arranged to bring the overall instrument, and in particular the mass spectrometer and mass analyser, into a state of readiness after a period of inactivity or power saving. The same health diagnostic system may also be utilised to bring the instrument into a state of readiness after maintenance or after the instrument switches from a maintenance mode of operation into an operational state. Furthermore, the health diagnostics system may also be used to monitor the instrument, mass spectrometer or mass analyser on a periodic basis in order to ensure that the instrument in operating within defined operational parameters and hence the integrity of mass spectral or other data obtained is not compromised.

The health check system may determine various actions which either should automatically be performed or which are presented to a user to decide whether or not to proceed with. For example, the health check system may determine that no corrective action or other measure is required i.e. that the instrument is operating as expected within defined operational limits. The health check system may also determine that an automatic operation should be performed in order, for example, to correct or adjust the instrument in response to a detected error warning, error status or anomaly. The health check system may also inform the user that the user should either take a certain course of action or to give approval for the control system to take a certain course of action. Various embodiments are also contemplated wherein the health check system make seek negative approval i.e. the health check system may inform a user that a certain course of action will be taken, optionally after a defined time delay, unless the user instructs otherwise or cancels the proposed action suggested by the control system.

Embodiments are also contemplated wherein the level of detail provided to a user may vary dependent upon the level of experience of the user. For example, the health check system may provide either very detailed instructions or simplified instructions to a relatively unskilled user.

The health check system may provide a different level of detail to a highly skilled user such as a service engineer. In particular, additional data and/or instructions may be provided to a service engineer which may not be provided to a regular user. It is also contemplated that instructions given to a regular user may include icons and/or moving graphical images. For example, a user may be guided by the health check system in order to correct a fault and once it is determined that a user has completed a step then the control system may change the icon and/or moving graphical images which are displayed to the user in order to continue to guide the user through the process.

The instrument according to various embodiments has been designed to be as small as possible whilst also being generally compatible with existing UPLC systems. The instrument is easy to operate and has been designed to have a high level of reliability. Furthermore, the instrument has been designed so as to simplify diagnostic and servicing thereby minimising instrument downtime and operational costs.

According to various embodiments the instrument has particular utility in the health services market and may be integrated with Desorption Electrospray Ionisation ("DESI") and Rapid Evaporative Ionisation Mass Spectrometry ("REIMS") ion sources in order to deliver commercially available In Vitro Diagnostic Medical Device ("IVD")/Medical Device ("MD") solutions for targeted applications.

The mass spectrometer may, for example, be used for microbe identification purposes, histopathology, tissue imaging and surgical (theatre) applications.

The mass spectrometer has a significantly enhanced user experience compared with conventional mass spectrometers and has a high degree of robustness. The instrument is particularly easy to use (especially for non-expert users) and has a high level of accessibility.

The mass spectrometer has been designed to integrate easily with liquid chromatography ("LC") separation systems so that a LC-TOF MS instrument may be provided. The instrument is particularly suited for routine characterisation and monitoring applications in the biopharmaceutical industry. The instrument enables non-expert users to collect high resolution accurate mass data and to derive meaningful information from the data quickly and easily. This results in improved understanding of products and processes with the potential to shorten time to market and reduce costs.

The instrument may be used in biopharmaceutical last stage development and quality control ("QC") applications. The instrument also has particular application in small molecule pharmaceutical, food and environmental ("F&E") and chemical materials analyses.

The instrument has enhanced mass detection capabilities i.e. high mass resolution, accurate mass and an extended mass range. The instrument also has the ability to fragment parent ions into daughter or fragment ions so that MS/MS type experiments may be performed.

For the avoidance of doubt, any feature described in relation to one aspect or embodiment described herein may be incorporated in any other aspect or embodiment, to the extent they are not mutually exclusive. Any method step described herein may be performed by a mass spectrometer, a control system thereof and/or one or more control modules thereof, unless the context demands otherwise. Where the mass spectrometer is stated to be arranged to perform a step, this may be implemented by a control system thereof and/or one or more control modules thereof, unless the context demands otherwise. A reference to a control system and/or one or more control modules of a mass spectrometer may refer to any subsystem or systems of the mass spectrometer which are arranged to carry out the described function(s). The control system and/or one or more control modules may be arranged to perform the steps described automatically, i.e. without intervention by the user, unless the context demands otherwise. A control system and/or one or more control modules may be implemented using hardware (e.g. circuitry, electronic storage, etc.), software, firmware, and combinations thereof.

BRIEF DESCRIPTION OF THE DRAWINGS

Various embodiments together with other arrangements given for illustrative purposes only will now be described, by way of example only, and with reference to the accompanying drawings in which:

FIG. 3 shows a schematic representation of mass spectrometer according to various embodiments, wherein the instrument comprises an Electrospray Ionisation ("ESI") or other ion source, a conjoined ring ion guide, a segmented quadrupole rod set ion guide, one or more transfer lenses and a Time of Flight mass analyser comprising a pusher electrode, a reflectron and an ion detector;

FIG. 15B shows a resistor chain which may be used to produce a linear axial DC electric field along the length of a first portion of the first ion guide and FIG. 15C shows a resistor chain which may be used to produce a linear axial DC electric field along the length of a second portion of the first ion guide;

FIG. 16F illustrates the relative voltages and absolute voltage ranges at which the various ion optical components such as the Electrospray capillary probe, differential pumping apertures, transfer lens electrodes, pusher electrodes, reflectron electrodes and the detector are maintained according to various embodiments.

FIG. 17 shows a more detailed schematic representation of a mass spectrometer according to various embodiments;

FIG. 23 shows details of a "Typhoon" control system for a mass spectrometer according to various embodiments;

DETAILED DESCRIPTION

Various aspects of a newly developed mass spectrometer are disclosed. The mass spectrometer comprises a modified and improved ion inlet assembly, a modified first ion guide, a modified quadrupole rod set ion guide, improved transfer optics, a novel cantilevered time of flight arrangement, a modified reflectron arrangement together with advanced electronics and an improved user interface.

The mass spectrometer has been designed to have a high level of performance, to be highly reliable, to offer a significantly improved user experience compared with the majority of conventional mass spectrometers, to have a very high level of EMC compliance and to have advanced safety features.

The instrument comprises a highly accurate mass analyser and overall the instrument is small and compact with a high degree of robustness. The instrument has been designed to reduce manufacturing cost without compromising performance at the same time making the instrument more reliable and easier to service. The instrument is particularly easy to use, easy to maintain and easy to service. The instrument constitutes a next-generation bench-top Time of Flight mass spectrometer.

Figure 1:
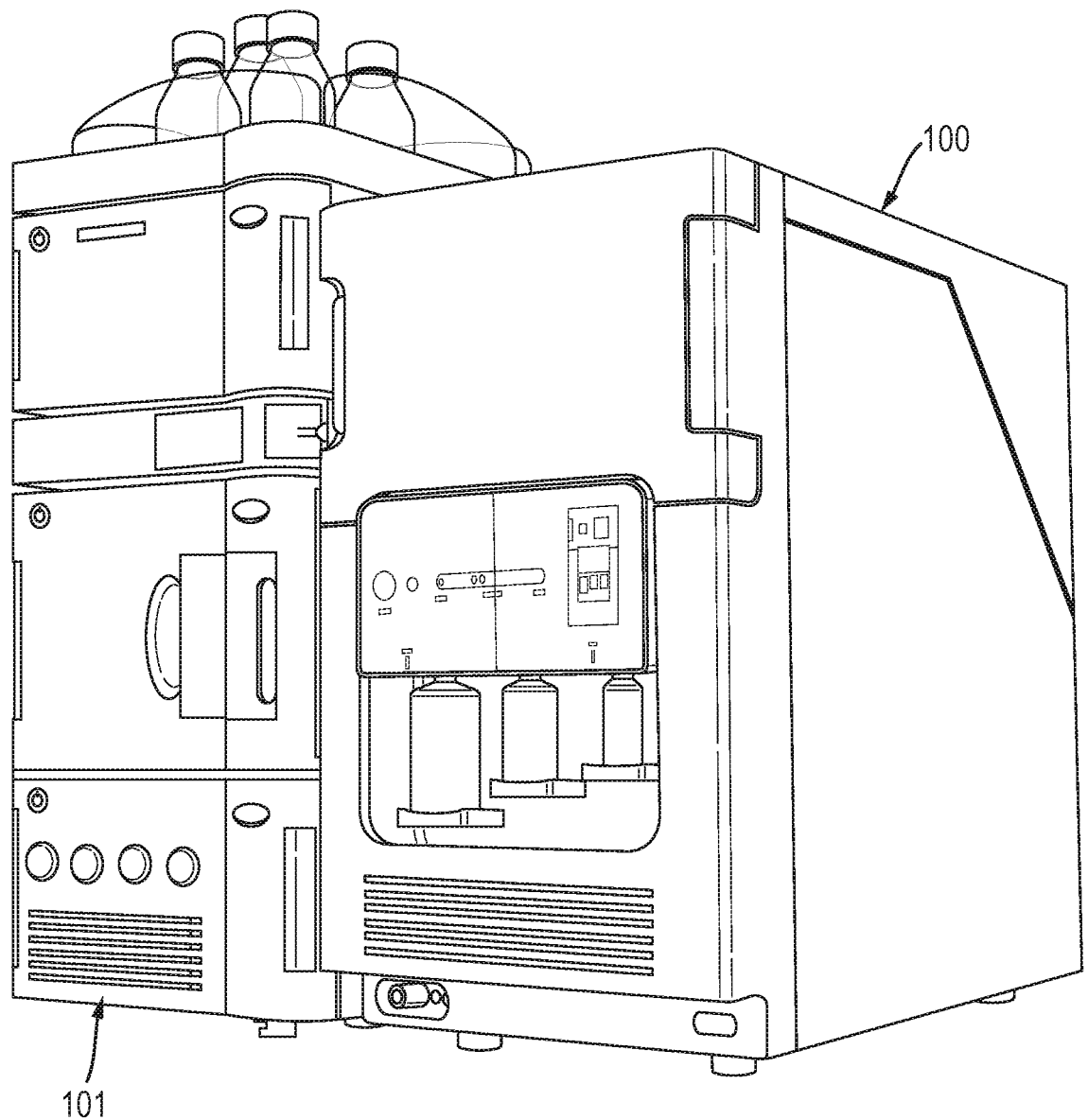
FIG. 1 shows a perspective view of a bench-top Time of Flight mass spectrometer according to various embodiments coupled to a conventional bench-top liquid chromatography ("LC") separation system.

FIG. 1 shows a bench-top mass spectrometer 100 according to various embodiments which is shown coupled to a conventional bench-top liquid chromatography separation device 101. The mass spectrometer 100 has been designed with ease of use in mind. In particular, a simplified user interface and front display is provided and instrument serviceability has been significantly improved and optimised relative to conventional instruments. The mass spectrometer 100 has an improved mechanical design with a reduced part count and benefits from a simplified manufacturing process thereby leading to a reduced cost design, improved reliability and simplified service procedures. The mass spectrometer has been designed to be highly electromagnetic compatible ("EMC") and exhibits very low electromagnetic interference ("EMI").

Figure 2A:
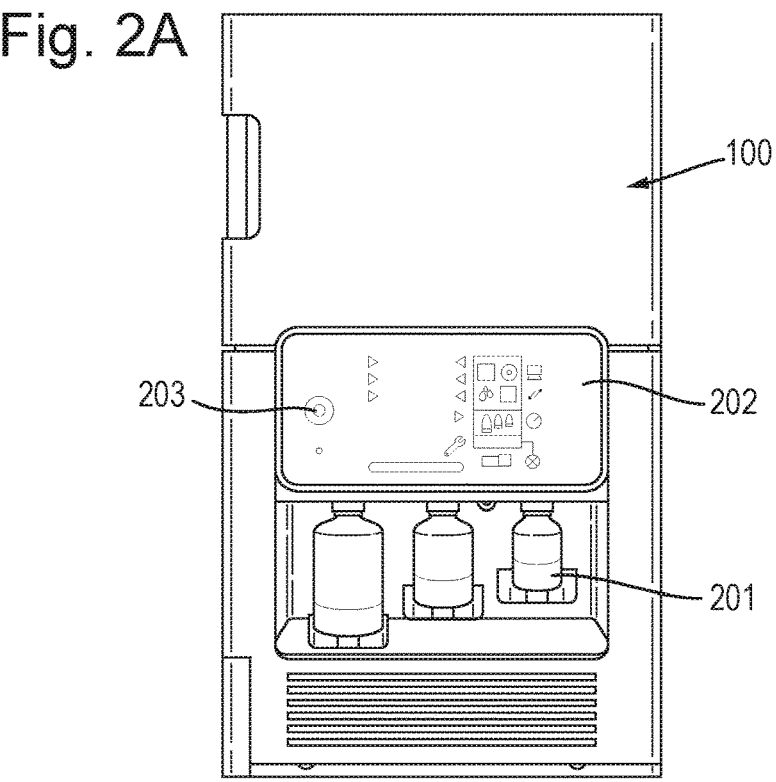
FIG. 2A shows a front view of a bench-top mass spectrometer according to various embodiments showing three solvent bottles loaded into the instrument and a front display panel.
Figure 2B:
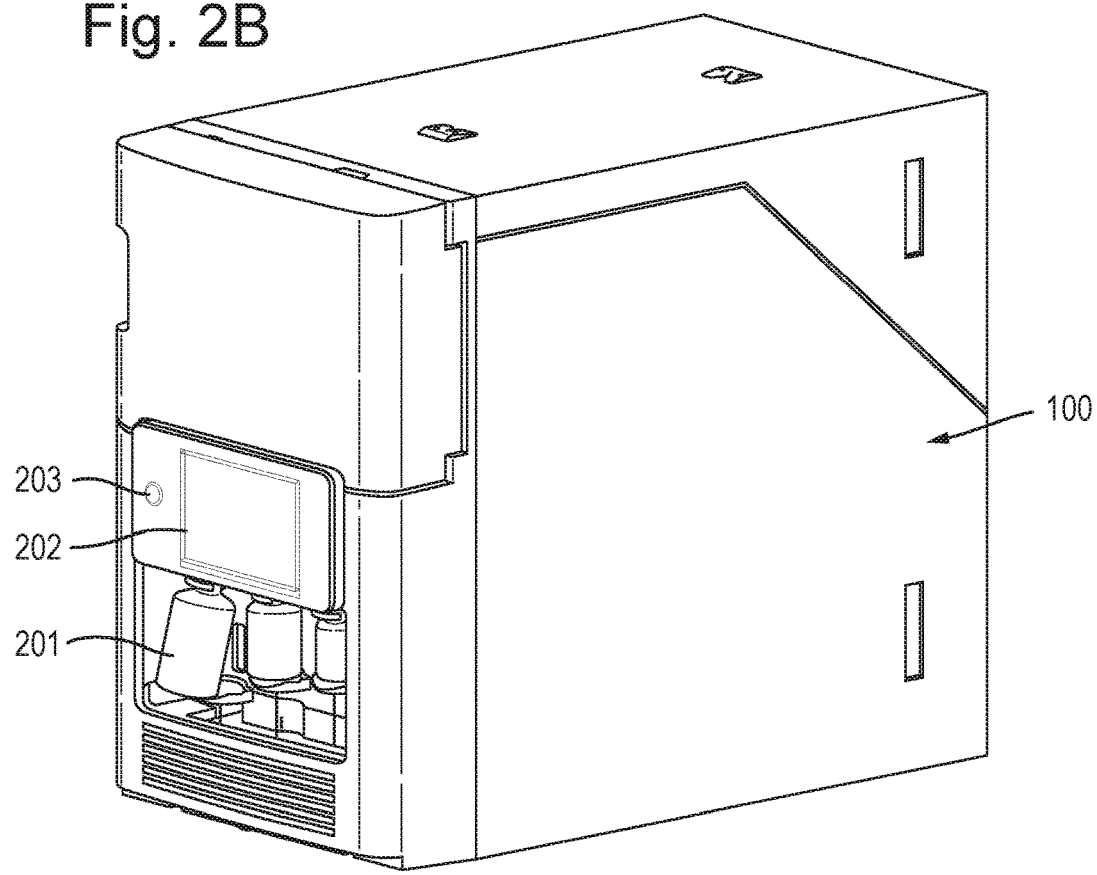
FIG. 2B shows a perspective view of a mass spectrometer according to various embodiments and FIG. 2C illustrates in more detail various icons which may be displayed on the front display panel in order to highlight the status of the instrument to a user and to indicate if a potential fault has been detected.

FIG. 2A shows a front view of the mass spectrometer 100 according to various embodiments and FIG. 2B shows a perspective view of the mass spectrometer according to various embodiments. Three solvent bottles 201 may be coupled, plugged in or otherwise connected or inserted into the mass spectrometer 100. The solvent bottles 201 may be back lit in order to highlight the fill status of the solvent bottles 201 to a user.

One problem with a known mass spectrometer having a plurality of solvent bottles is that a user may connect a solvent bottle in a wrong location or position. Furthermore, a user may mount a solvent bottle but conventional mounting mechanisms will not ensure that a label on the front of the solvent bottle will be positioned so that it can be viewed by a user i.e. conventional instruments may allow a solvent bottle to be connected where a front facing label ends up facing away from the user. Accordingly, one problem with conventional instruments is that a user may not be able to read a label on a solvent bottle due to the fact that the solvent bottle ends up being positioned with the label of the solvent bottle facing away from the user. According to various embodiments conventional screw mounts which are conventionally used to mount solvent bottles have been replaced with a resilient spring mounting mechanism which allows the solvent bottles 201 to be connected without rotation.

According to various embodiments the solvent bottles 201 may be illuminated by a LED light tile in order to indicate the fill level of the solvent bottles 201 to a user. It will be understood that a single LED illuminating a bottle will be insufficient since the fluid in a solvent bottle 201 can attenuate the light from the LED. Furthermore, there is no good single position for locating a single LED.

The mass spectrometer 100 may have a display panel 202 upon which various icons may be displayed when illuminated by the instrument control system.

A start button 203 may be positioned on or adjacent the front display panel 202. A user may press the start button 203 which will then initiate a power-up sequence or routine. The power-up sequence or routine may comprise powering-up all instrument modules and initiating instrument pump-down i.e. generating a low pressure in each of the vacuum chambers within the body of the mass spectrometer 100.

According to various embodiments the power-up sequence or routine may or may not include running a source pressure test and switching the instrument into an Operate mode of operation.

According to various embodiments a user may hold the start button 203 for a period of time, e.g. 5 seconds, in order to initiate a power-down sequence.

If the instrument is in a maintenance mode of operation then pressing the start button 203 on the front panel of the instrument may initiate a power-up sequence. Furthermore, when the instrument is in a maintenance mode of operation then holding the start button 203 on the front panel of the instrument for a period of time, e.g. 5 seconds, may initiate a power-down sequence.

Figure 2C:
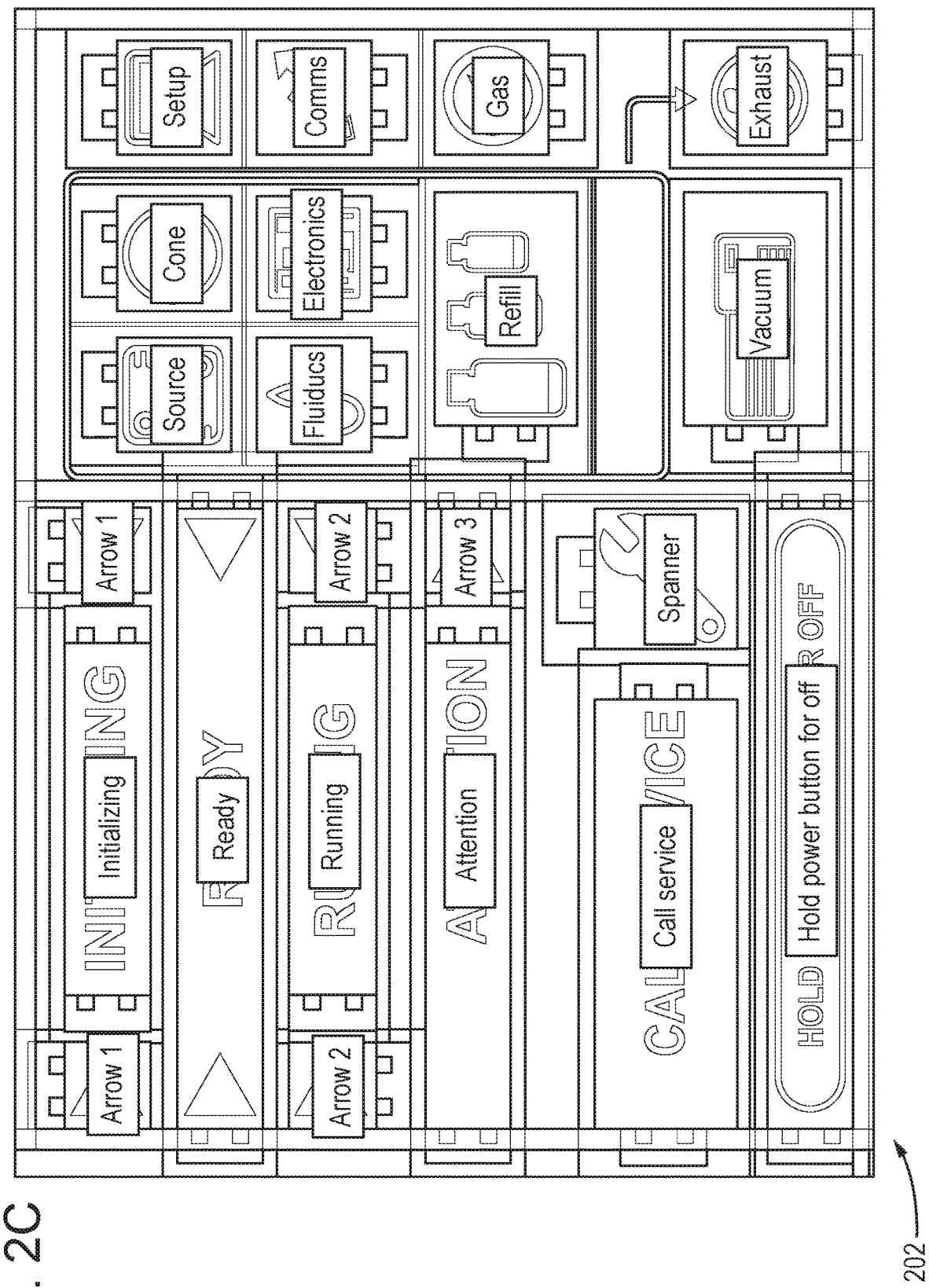

FIG. 2C illustrates in greater detail various icons which may be displayed on the display panel 202 and which may illuminated under the control of instrument hardware and/or software. According to various embodiments one side of the display panel 202 (e.g. the left-hand side) may have various icons which generally relate to the status of the instrument or mass spectrometer 100. For example, icons may be displayed in the colour green to indicate that the instrument is in an initialisation mode of operation, a ready mode of operation or a running mode of operation.

In the event of a detected error which may require user interaction or user input a yellow or amber warning message may be displayed. A yellow or amber warning message or icon may be displayed on the display panel 202 and may convey only relatively general information to a user e.g. indicating that there is a potential fault and a general indication of what component or aspect of the instrument may be at fault.

According to various embodiments it may be necessary for a user to refer to an associated computer display or monitor in order to get fuller details or gain a fuller appreciation of the nature of the fault and to receive details of potential corrective action which is recommended to perform in order to correct the fault or to place the instrument in a desired operational state.

A user may be invited to confirm that a corrective action should be performed and/or a user may be informed that a certain corrective action is being performed.

In the event of a detected error which cannot be readily corrected by a user and which instead requires the services of a skilled service engineer then a warning message may be displayed indicating that a service engineer needs to be called. A warning message indicating the need for a service engineer may be displayed in the colour red and a spanner or other icon may also be displayed or illuminated to indicate to a user that an engineer is required.

The display panel 202 may also display a message that the power button 203 should be pressed in order to turn the instrument OFF.

According to an embodiment one side of the display panel 202 (e.g. the right-hand side) may have various icons which indicate different components or modules of the instrument where an error or fault has been detected. For example, a yellow or amber icon may be displayed or illuminated in order to indicate an error or fault with the ion source, a fault in the inlet cone region, a fault with the fluidic systems, an electronics fault, a fault with one or more of the solvent or other bottles 201 (i.e. indicating that one or more solvent bottles 201 needing to be refilled or emptied), a vacuum pressure fault associated with one or more of the vacuum chambers, an instrument setup error, a communication error, a problem with a gas supply or a problem with an exhaust.

It will be understood that the display panel 202 may merely indicate the general status of the instrument and/or the general nature of a fault. In order to be able to resolve the fault or to understand the exact nature of an error or fault a user may need to refer to the display screen of an associated computer or other device. For example, as will be understood by those skilled in the art an associated computer or other device may be arranged to receive and process mass spectral and other data output from the instrument or mass spectrometer 100 and may display mass spectral data or images on a computer display screen for the benefit of a user.

According to various embodiments the status display may indicate whether the instrument is in one of the following states namely Running, Ready, Getting Ready, Ready Blocked or Error.

The status display may display health check indicators such as Service Required, Cone, Source, Set-up, Vacuum, Communications, Fluidics, Gas, Exhaust, Electronics, Lockmass, Calibrant and Wash.

A "Hold power button for OFF" LED tile is shown in FIG. 2C and may remain illuminated when the power button 203 is pressed and may remain illuminated until the power button 203 is released or until a period of time (e.g. 5 seconds) has elapsed whichever is sooner. If the power button 203 is released before the set period of time (e.g. less than 5 seconds after it is pressed) then the "Hold power button for OFF" LED tile may fade out over a time period of e.g. 2 s.

The initialising LED tile may be illuminated when the instrument is started via the power button 203 and may remain ON until software assumes control of the status panel or until a power-up sequence or routine times out.

According to various embodiments an instrument health check may be performed and printer style error correction instructions may be provided to a user via a display screen of a computer monitor (which may be separate to the front display panel 202) in order to help guide a user through any steps that the user may need to perform.

The instrument may attempt to self-diagnose any error messages or warning status alert(s) and may attempt to rectify any problem(s) either with or without notifying the user.

Depending upon the severity of any problem the instrument control system may either attempt to correct the problem(s) itself, request the user to carry out some form of intervention in order to attempt to correct the issue or problem(s) or may inform the user that the instrument requires a service engineer.

In the event where corrective action may be taken by a user then the instrument may display instructions for the user to follow and may provide details of methods or steps that should be performed which may allow the user to fix or otherwise resolve the problem or error. A resolve button may be provided on a display screen which may be pressed by a user having followed the suggested resolution instructions. The instrument may then run a test again and/or may check if the issue has indeed been corrected. For example, if a user were to trigger an interlock then once the interlock is closed a pressure test routine may be initialised as detailed below.

FIG. 3 shows a high level schematic of the mass spectrometer 100 according to various embodiments wherein the instrument may comprise an ion source 300, such as an Electrospray Ionisation ("ESI") ion source. However, it should be understood that the use of an Electrospray Ionisation ion source 300 is not essential and that according to other embodiments a different type of ion source may be used. For example, according to various embodiments a Desorption Electrospray Ionisation ("DESI") ion source may be used. According to yet further embodiments a Rapid Evaporative Ionisation Mass Spectrometry ("REIMS") ion source may be used.

If an Electrospray ion source 300 is provided then the ion source 300 may comprise an Electrospray probe and associated power supply.

Figure 6A:
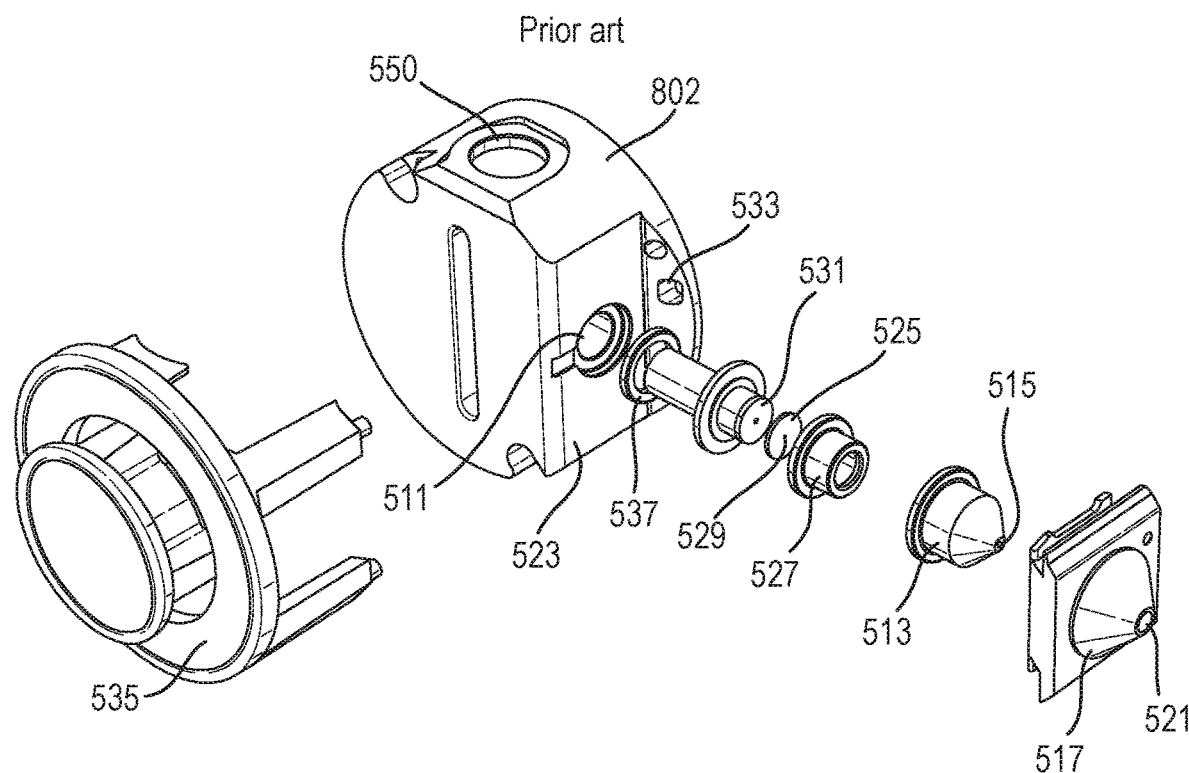
FIG. 6A shows an exploded view of the first known ion inlet assembly.
Figure 6B:
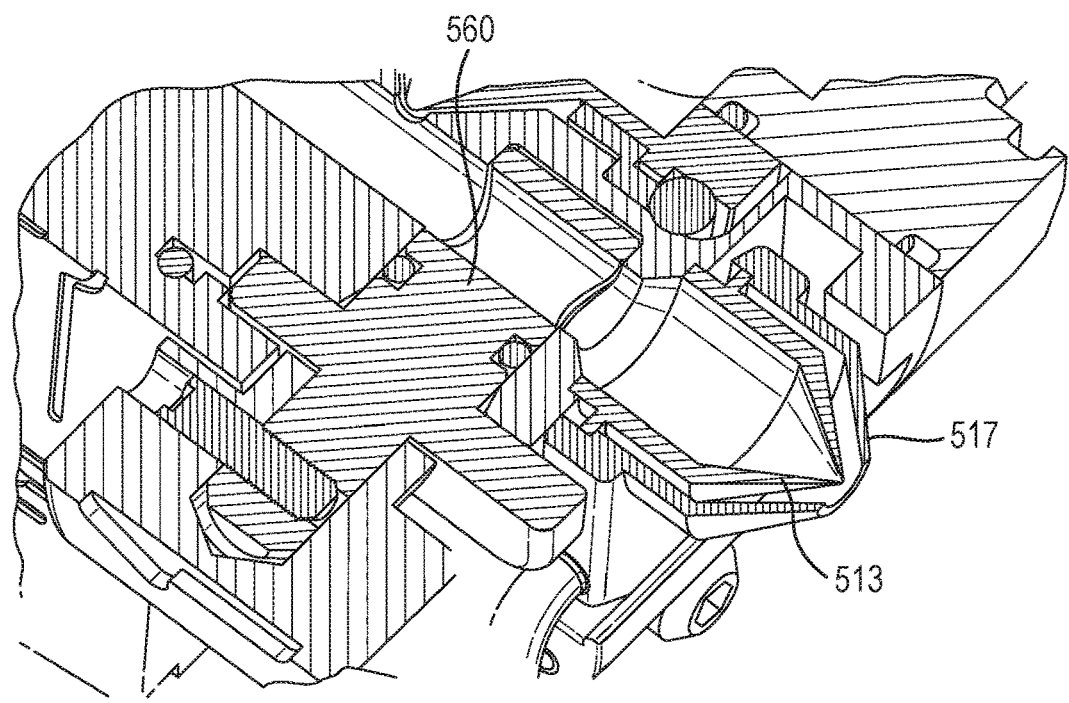
FIG. 6B shows a second different known ion inlet assembly having an isolation valve.
Figure 6C:
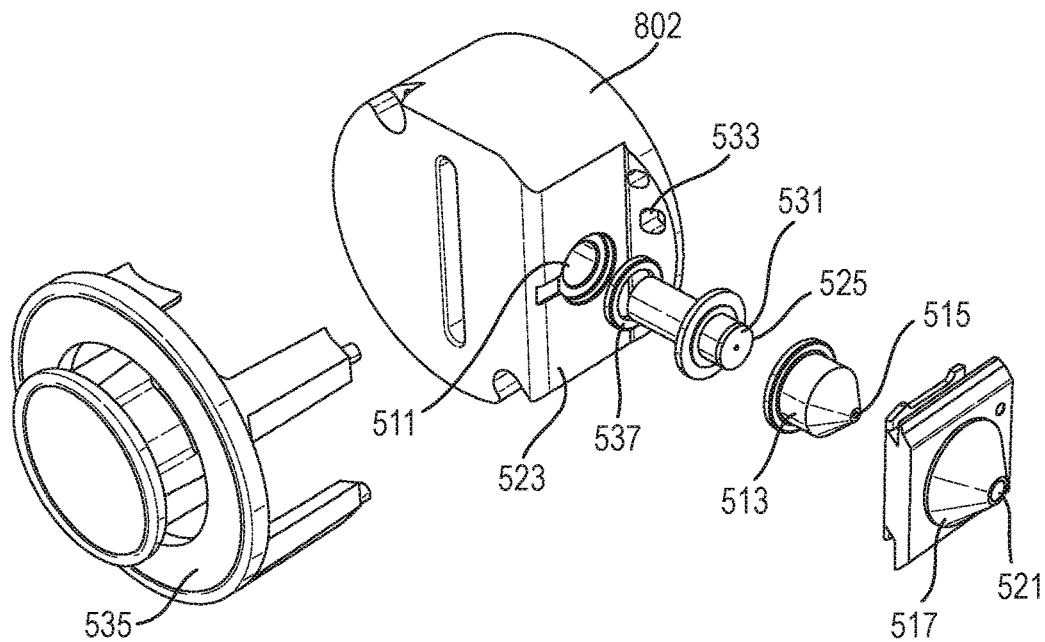
FIG. 6C shows an exploded view of an ion inlet assembly according to various embodiments.

The initial stage of the associated mass spectrometer 100 comprises an ion block 802 (as shown in FIG. 6C) and a source enclosure may be provided if an Electrospray Ionisation ion source 300 is provided.

If a Desorption Electrospray Ionisation ("DESI") ion source is provided then the ion source may comprise a DESI source, a DESI sprayer and an associated DESI power supply. The initial stage of the associated mass spectrometer may comprise an ion block 802 as shown in more detail in FIG. 6C. However, according to various embodiments if a DESI source is provided then the ion block 802 may not be enclosed by a source enclosure.

It will be understood that a REIMS source involves the transfer of analyte, smoke, fumes, liquid, gas, surgical smoke, aerosol or vapour produced from a sample which may comprise a tissue sample. In some embodiments, the REIMS source may be arranged and adapted to aspirate the analyte, smoke, fumes, liquid, gas, surgical smoke, aerosol or vapour in a substantially pulsed manner. The REIMS source may be arranged and adapted to aspirate the analyte, smoke, fumes, liquid, gas, surgical smoke, aerosol or vapour substantially only when an electrosurgical cutting applied voltage or potential is supplied to one or more electrodes, one or more electrosurgical tips or one or more laser or other cutting devices.

The mass spectrometer 100 may be arranged so as to be capable of obtaining ion images of a sample. For example, according to various embodiments mass spectral and/or other physico-chemical data may be obtained as a function of position across a portion of a sample. Accordingly, a determination can be made as to how the nature of the sample may vary as a function of position along, across or within the sample.

The mass spectrometer 100 may comprise a first ion guide 301 such as a StepWave® ion guide 301 having a plurality of ring and conjoined ring electrodes. The mass spectrometer 100 may further comprise a segmented quadrupole rod set ion guide 302, one or more transfer lenses 303 and a Time of Flight mass analyser 304. The quadrupole rod set ion guide 302 may be operated in an ion guiding mode of operation and/or in a mass filtering mode of operation. The Time of Flight mass analyser 304 may comprise a linear acceleration Time of Flight region or an orthogonal acceleration Time of Flight mass analyser.

If the Time of Flight mass analyser comprises an orthogonal acceleration Time of Flight mass analyser 304 then the mass analyser 304 may comprise a pusher electrode 305, a reflectron 306 and an ion detector 307. The ion detector 307 may be arranged to detect ions which have been reflected by the reflectron 306. It should be understood, however, that the provision of a reflectron 306 though desirable is not essential.

According to various embodiments the first ion guide 301 may be provided downstream of an atmospheric pressure interface. The atmospheric pressure interface may comprise an ion inlet assembly.

The first ion guide 301 may be located in a first vacuum chamber or first differential pumping region.

The first ion guide 301 may comprise a part ring, part conjoined ring ion guide assembly wherein ions may be transferred in a generally radial direction from a first ion path formed within a first plurality of ring or conjoined ring electrodes into a second ion path formed by a second plurality of ring or conjoined ring electrodes. The first and second plurality of ring electrodes may be conjoined along at least a portion of their length. Ions may be radially confined within the first and second plurality of ring electrodes.

The second ion path may be aligned with a differential pumping aperture which may lead into a second vacuum chamber or second differential pumping region.

The first ion guide 301 may be utilised to separate charged analyte ions from unwanted neutral particles. The unwanted neutral particles may be arranged to flow towards an exhaust port whereas analyte ions are directed on to a different flow path and are arranged to be optimally transmitted through a differential pumping aperture into an adjacent downstream vacuum chamber.

It is also contemplated that according to various embodiments ions may in a mode of operation be fragmented within the first ion guide 301. In particular, the mass spectrometer 100 may be operated in a mode of operation wherein the gas pressure in the vacuum chamber housing the first ion guide 301 is maintained such that when a voltage supply causes ions to be accelerated into or along the first ion guide 301 then the ions may be arranged to collide with background gas in the vacuum chamber and to fragment to form fragment, daughter or product ions. According to various embodiments a static DC voltage gradient may be maintained along at least a portion of the first ion guide 301 in order to urge ions along and through the first ion guide 301 and optionally to cause ions in a mode of operation to fragment.

However, it should be understood that it is not essential that the mass spectrometer 100 is arranged so as to be capable of performing ion fragmentation in the first ion guide 301 in a mode of operation.

The mass spectrometer 100 may comprise a second ion guide 302 downstream of the first ion guide 302 and the second ion guide 302 may be located in the second vacuum chamber or second differential pumping region.

The second ion guide 302 may comprise a segmented quadrupole rod set ion guide or mass filter 302. However, other embodiments are contemplated wherein the second ion guide 302 may comprise a quadrupole ion guide, a hexapole ion guide, an octopole ion guide, a multipole ion guide, a segmented multipole ion guide, an ion funnel ion guide, an ion tunnel ion guide (e.g. comprising a plurality of ring electrodes each having an aperture through which ions may pass or otherwise forming an ion guiding region) or a conjoined ring ion guide.

The mass spectrometer 100 may comprise one or more transfer lenses 303 located downstream of the second ion guide 302. One of more of the transfer lenses 303 may be located in a third vacuum chamber or third differential pumping region. Ions may be passed through a further differential pumping aperture into a fourth vacuum chamber or fourth differential pumping region. One or more transfer lenses 303 may also be located in the fourth vacuum chamber or fourth differential pumping region.

The mass spectrometer 100 may comprise a mass analyser 304 located downstream of the one or more transfer lenses 303 and may be located, for example, in the fourth or further vacuum chamber or fourth or further differential pumping region. The mass analyser 304 may comprise a Time of Flight ("TOF") mass analyser. The Time of Flight mass analyser 304 may comprise a linear or an orthogonal acceleration Time of Flight mass analyser.

According to various embodiments an orthogonal acceleration Time of Flight mass analyser 304 may be provided comprising one or more orthogonal acceleration pusher electrode(s) 305 (or alternatively and/or additionally one or more puller electrode(s)) and an ion detector 307 separated by a field free drift region. The Time of Flight mass analyser 304 may optionally comprise one or more reflectrons 306 intermediate the pusher electrode 305 and the ion detector 307.

Although highly desirable, it should be recognised that the mass analyser does not have to comprise a Time of Flight mass analyser 304. More generally, the mass analyser 304 may comprise either: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; or (xiv) a linear acceleration Time of Flight mass analyser.

Although not shown in FIG. 3, the mass spectrometer 100 may also comprise one or more optional further devices or stages. For example, according to various embodiments the mass spectrometer 100 may additionally comprise one or more ion mobility separation devices and/or one or more Field Asymmetric Ion Mobility Spectrometer ("FAIMS") devices and/or one or more devices for separating ions temporally and/or spatially according to one or more physico-chemical properties. For example, the mass spectrometer 100 according to various embodiments may comprise one or more separation stages for temporally or otherwise separating ions according to their mass, collision cross section, conformation, ion mobility, differential ion mobility or another physico-chemical parameter.

The mass spectrometer 100 may comprise one or more discrete ion traps or one or more ion trapping regions. However, as will be described in more detail below, an axial trapping voltage may be applied to one or more sections or one or more electrodes of either the first ion guide 301 and/or the second ion guide 302 in order to confine ions axially for a short period of time. For example, ions may be trapped or confined axially for a period of time and then released. The ions may be released in a synchronised manner with a downstream ion optical component. For example, in order to enhance the duty cycle of analyte ions of interest, an axial trapping voltage may be applied to the last electrode or stage of the second ion guide 302. The axial trapping voltage may then be removed and the application of a voltage pulse to the pusher electrode 305 of the Time of Flight mass analyser 304 may be synchronised with the pulsed release of ions so as to increase the duty cycle of analyte ions of interest which are then subsequently mass analysed by the mass analyser 304. This approach may be referred to as an Enhanced Duty Cycle ("EDC") mode of operation.

Furthermore, the mass spectrometer 100 may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The mass spectrometer 100 may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The fourth or further vacuum chamber or fourth or further differential pumping region may be maintained at a lower pressure than the third vacuum chamber or third differential pumping region. The third vacuum chamber or third differential pumping region may be maintained at a lower pressure than the second vacuum chamber or second differential pumping region and the second vacuum chamber or second differential pumping region may be maintained at a lower pressure than the first vacuum chamber or first differential pumping region. The first vacuum chamber or first differential pumping region may be maintained at lower pressure than ambient. Ambient pressure may be considered to be approx. 1013 mbar at sea level.

The mass spectrometer 100 may comprise an ion source configured to generate analyte ions. In various particular embodiments, the ion source may comprise an Atmospheric Pressure Ionisation ("API") ion source such as an Electrospray Ionisation ("ESI") ion source or an Atmospheric Pressure Chemical Ionisation ("APCI") ion source.

Figure 4:
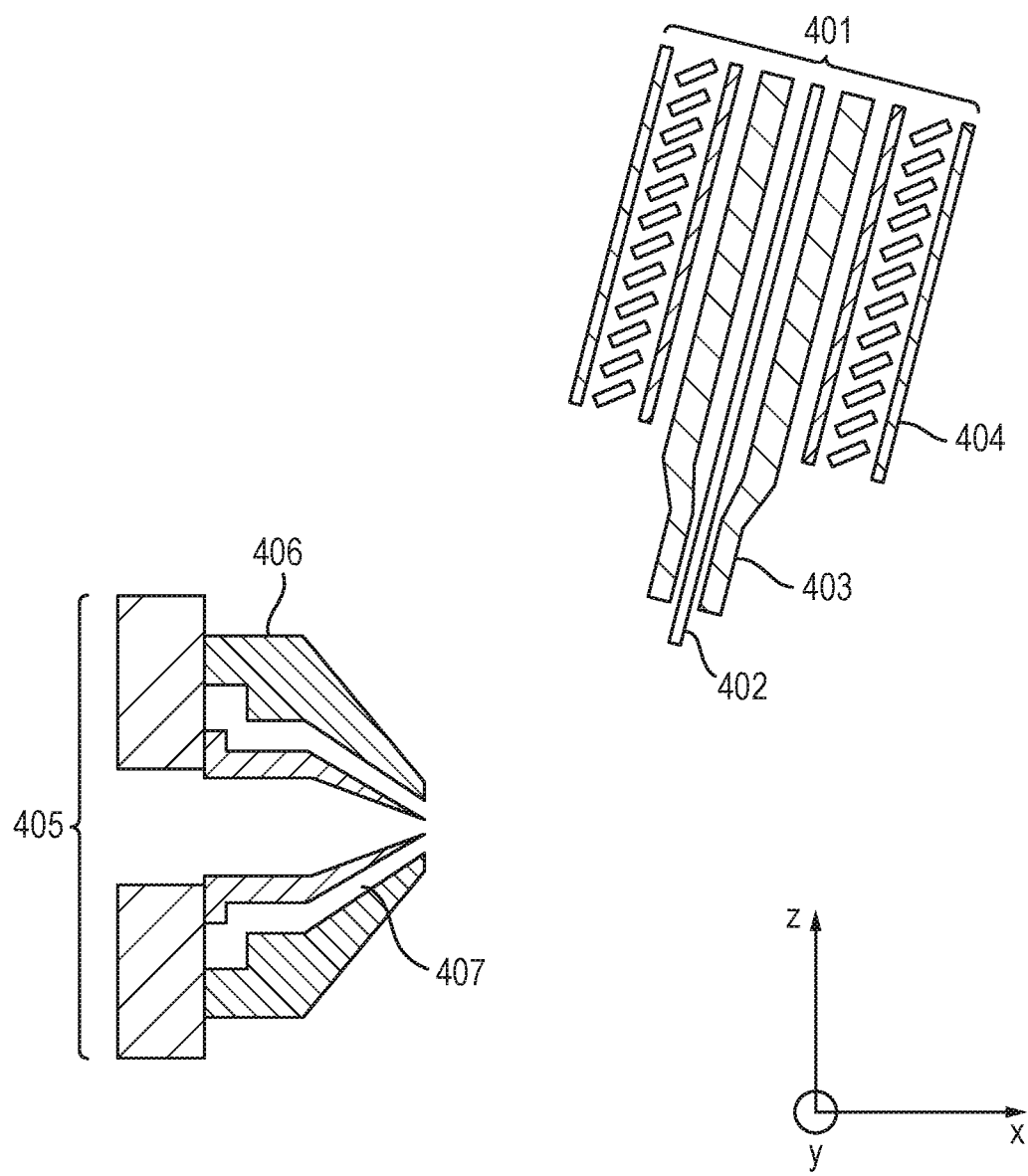
FIG. 4 shows a known Atmospheric Pressure Ionisation ("API") ion source which may be used with the mass spectrometer according to various embodiments.

FIG. 4 shows in general form a known Atmospheric Pressure Ionisation ("API") ion source such as an Electrospray Ionisation ("ESI") ion source or an Atmospheric Pressure Chemical Ionisation ("APCI") ion source. The ion source may comprise, for example, an Electrospray Ionisation probe 401 which may comprise an inner capillary tube 402 through which an analyte liquid may be supplied. The analyte liquid may comprise mobile phase from a LC column or an infusion pump. The analyte liquid enters via the inner capillary tube 402 or probe and is pneumatically converted to an electrostatically charged aerosol spray. Solvent is evaporated from the spray by means of heated desolvation gas. Desolvation gas may be provided through an annulus which surrounds both the inner capillary tube 402 and an intermediate surrounding nebuliser tube 403 through which a nebuliser gas emerges. The desolvation gas may be heated by an annular electrical desolvation heater 404. The resulting analyte and solvent ions are then directed towards a sample or sampling cone aperture mounted into an ion block 405 forming an initial stage of the mass spectrometer 100.

The inner capillary tube 402 is preferably surrounded by a nebuliser tube 403. The emitting end of the inner capillary tube 402 may protrude beyond the nebuliser tube 403. The inner capillary tube 402 and the nebuliser tube 403 may be surrounded by a desolvation heater arrangement 404 as shown in FIG. 4 wherein the desolvation heater 404 may be arranged to heat a desolvation gas. The desolvation heater 404 may be arranged to heat a desolvation gas from ambient temperature up to a temperature of around 600° C. According to various embodiments the desolvation heater 404 is always OFF when the API gas is OFF.

The desolvation gas and the nebuliser gas may comprise nitrogen, air or another gas or mixture of gases. The same gas (e.g. nitrogen, air or another gas or mixture of gases) may be used as both a desolvation gas, nebuliser gas and cone gas. The function of the cone gas will be described in more detail below.

The inner probe capillary 402 may be readily replaced by an unskilled user without needing to use any tools. The Electrospray probe 402 may support LC flow rates in the range of 0.3 to 1.0 mL/min.

According to various embodiments an optical detector may be used in series with the mass spectrometer 100. It will be understood that an optical detector may have a maximum pressure capability of approx. 1000 psi. Accordingly, the Electrospray Ionisation probe 401 may be arranged so as not to cause a back pressure of greater than around 500 psi, allowing for back pressure caused by other system components. The instrument may be arranged so that a flow of 50:50 methanol/water at 1.0 mL/min does not create a backpressure greater than 500 psi.

According to various embodiments a nebuliser flow rate of between 106 to 159 L/hour may be utilised.

The ESI probe 401 may be powered by a power supply which may have an operating range of 0.3 to 1.5 kV.

It should, however, be understood that various other different types of ion source may instead be coupled to the mass spectrometer 100. For example, according to various embodiments, the ion source may more generally comprise either: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; or (xxx) a Low Temperature Plasma ("LTP") ion source.

A chromatography or other separation device may be provided upstream of the ion source 300 and may be coupled so as to provide an effluent to the ion source 300. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The mass spectrometer 100 may comprise an atmospheric pressure interface or ion inlet assembly downstream of the ion source 300. According to various embodiments the atmospheric pressure interface may comprise a sample or sampling cone 406,407 which is located downstream of the ion source 401. Analyte ions generated by the ion source 401 may pass via the sample or sampling cone 406,407 into or onwards towards a first vacuum chamber or first differential pumping region of the mass spectrometer 100. However, according to other embodiments the atmospheric pressure interface may comprise a capillary interface.

As shown in FIG. 4, ions generated by the ion source 401 may be directed towards an atmospheric pressure interface which may comprise an outer gas cone 406 and an inner sample cone 407. A cone gas may be supplied to an annular region between the inner sample cone 407 and the outer gas cone 406. The cone gas may emerge from the annulus in a direction which is generally opposed to the direction of ion travel into the mass spectrometer 100. The cone gas may act as a declustering gas which effectively pushes away large contaminants thereby preventing large contaminants from impacting upon the outer cone 406 and/or inner cone 407 and also preventing the large contaminants from entering into the initial vacuum stage of the mass spectrometer 100.

Figure 5:
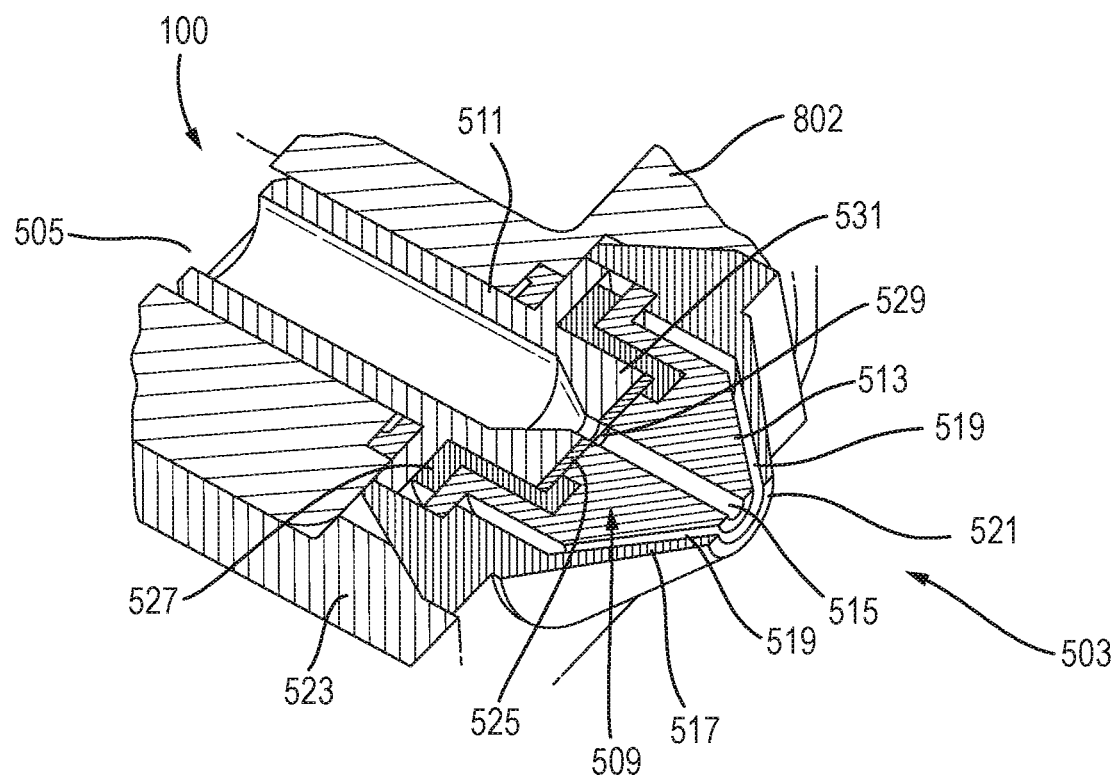
FIG. 5 shows a first known ion inlet assembly which shares features with an ion inlet assembly according to various embodiments.

FIG. 5 shows in more detail a first known ion inlet assembly which is similar to an ion inlet assembly according to various embodiments. The known ion inlet assembly as shown and described below with reference to FIGS. 5 and 6A is presented in order to highlight various aspects of an ion inlet assembly according to various embodiments and also so that differences between an ion inlet assembly according to various embodiments as shown and discussed below with reference to FIG. 6C can be fully appreciated.

With reference to FIG. 5, it will be understood that the ion source (not shown) generates analyte ions which are directed towards a vacuum chamber 505 of the mass spectrometer 100.

A gas cone assembly is provided comprising an inner gas cone or sampling cone 513 having an aperture 515 and an outer gas cone 517 having an aperture 521. A disposable disc 525 is arranged beneath or downstream of the inner gas cone or sampling 513 and is held in position by a mounting element 527. The disc 525 covers an aperture 511 of the vacuum chamber 505. The disc 525 is removably held in position by the inner gas cone 513 resting upon the mounting element 527.

As will be discussed in more detail below with reference to FIG. 6C, according to various embodiments the mounting element 527 is not provided in the preferred ion inlet assembly.

The disc 525 has an aperture or sampling orifice 529 through which ions can pass.

A carrier 531 is arranged underneath or below the disc 525. The carrier 531 is arranged to cover the aperture 511 of the vacuum chamber 505. Upon removal of the disc 525, the carrier 531 may remain in place due to suction pressure.

FIG. 6A shows an exploded view of the first known ion inlet assembly. The outer gas cone 517 has a cone aperture 521 and is slidably mounted within a clamp 535. The clamp 535 allows a user to remove the outer gas cone 517 without physically having to touch the outer gas cone 517 which will get hot during use.

An inner gas cone or sampling cone 513 is shown mounted behind or below the outer gas cone 517.

The known arrangement utilises a carrier 531 which has a 1 mm diameter aperture. The ion block 802 is also shown having a calibration port 550. However, the calibration port 550 is not provided in an ion inlet assembly according to various embodiments.

FIG. 6B shows an second different known ion inlet assembly as used on a different instrument which has an isolation valve 560 which is required to hold vacuum pressure when the outer cone gas nozzle 517 and the inner nozzle 513 are removed for servicing. The inner cone 513 has a gas limiting orifice into the subsequent stages of the mass spectrometer. The inner gas cone 513 comprises a high cost, highly precisioned part which requires routine removal and cleaning. The inner gas cone 513 is not a disposable or consumable item. Prior to removing the inner sampling cone 513 the isolation valve 560 must be rotated into a closed position in order to isolate the downstream vacuum stages of the mass spectrometer from atmospheric pressure. The isolation valve 560 is therefore required in order to hold vacuum pressure whilst the inner gas sampling cone 513 is removed for cleaning.

FIG. 6C shows an exploded view of an ion inlet assembly according to various embodiments. The ion inlet assembly according to various embodiments is generally similar to the first known ion inlet assembly as shown and described above with reference to FIGS. 5 and 6A except for a few differences. One difference is that a calibration port 550 is not provided in the ion block 802 and a mounting member or mounting element 527 is not provided.

Accordingly, the ion block 802 and ion inlet assembly have been simplified. Furthermore, importantly the disc 525 may comprise a 0.25 or 0.30 mm diameter aperture disc 525 which is substantially smaller diameter than conventional arrangements.

According to various embodiments both the disc 525 and the vacuum holding member or carrier 531 may have a substantially smaller diameter aperture than conventional arrangements such as the first known arrangement as shown and described above with reference to FIGS. 5 and 6A.

For example, the first known instrument utilises a vacuum holding member or carrier 531 which has a 1 mm diameter aperture. In contrast, according to various embodiments the vacuum holding member or carrier 531 according to various embodiments may have a much smaller diameter aperture e.g. a 0.3 mm or 0.40 mm diameter aperture.

Figure 6D:
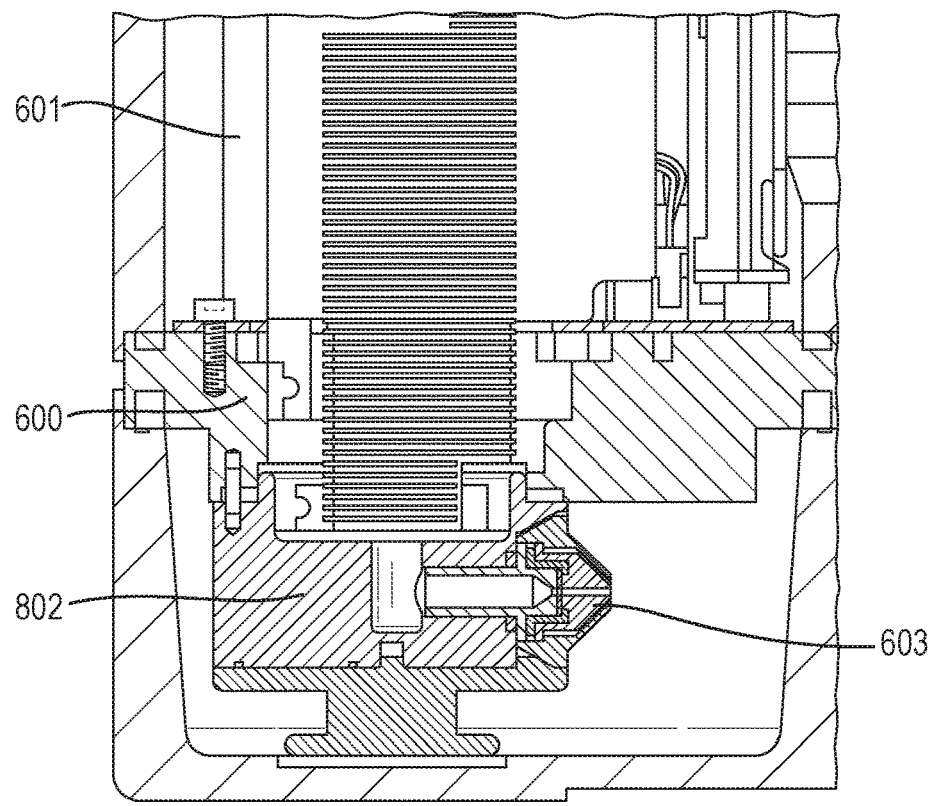
FIG. 6D shows the arrangement of an ion block attached to a pumping block upstream of a vacuum chamber housing a first ion guide according to various embodiments.

FIG. 6D shows in more detail how the ion block assembly 802 according to various embodiments may be enclosed in an atmospheric pressure source or housing. The ion block assembly 802 may be mounted to a pumping block or thermal interface 600. Ions pass through the ion block assembly 802 and then through the pumping block or thermal interface 600 into a first vacuum chamber 601 of the mass spectrometer 100. The first vacuum chamber 601 preferably houses the first ion guide 301 which as shown in FIG. 6D and which may comprise a conjoined ring ion guide 301. FIG. 6D also indicates how ion entry 603 into the mass spectrometer 100 also represents a potential leak path. A correct pressure balance is required between the diameters of the various gas flow restriction apertures in the ion inlet assembly with the configuration of the vacuum pumping system.

Figure 6E:
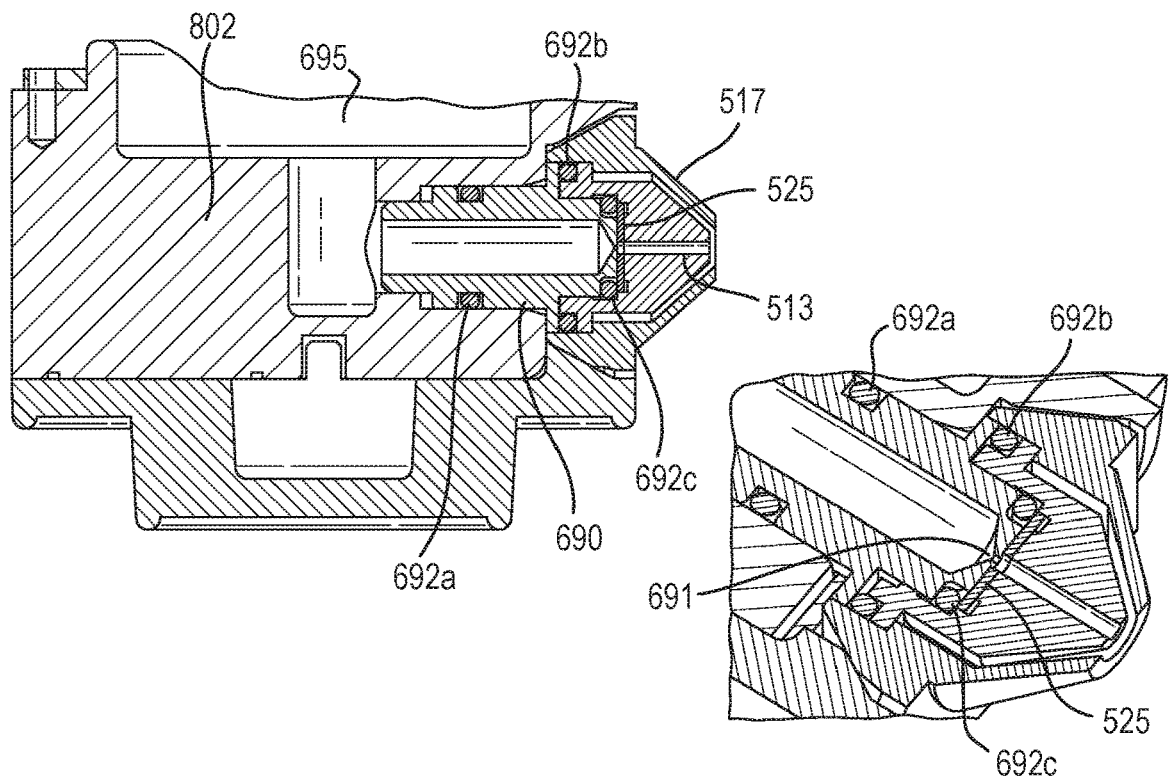
FIG. 6E shows in more detail a fixed valve assembly which is retained within an ion block according to various embodiments.

FIG. 6E shows the ion inlet assembly according to various embodiments and illustrates how ions pass through an outer gas cone 517 and an inner gas cone or sampling cone 513 before passing through an apertured disc 525. No mounting member or mounting element is provided unlike the first known ion inlet assembly as described above.

The ions then pass through an aperture in a fixed valve 690. The fixed valve 690 is held in place by suction pressure and is not removable by a user in normal operation. Three O-ring vacuum seals 692a,692b,692c are shown. The fixed valve 690 may be formed from stainless steel. A vacuum region 695 of the mass spectrometer 100 is generally indicated.

Figure 6F:
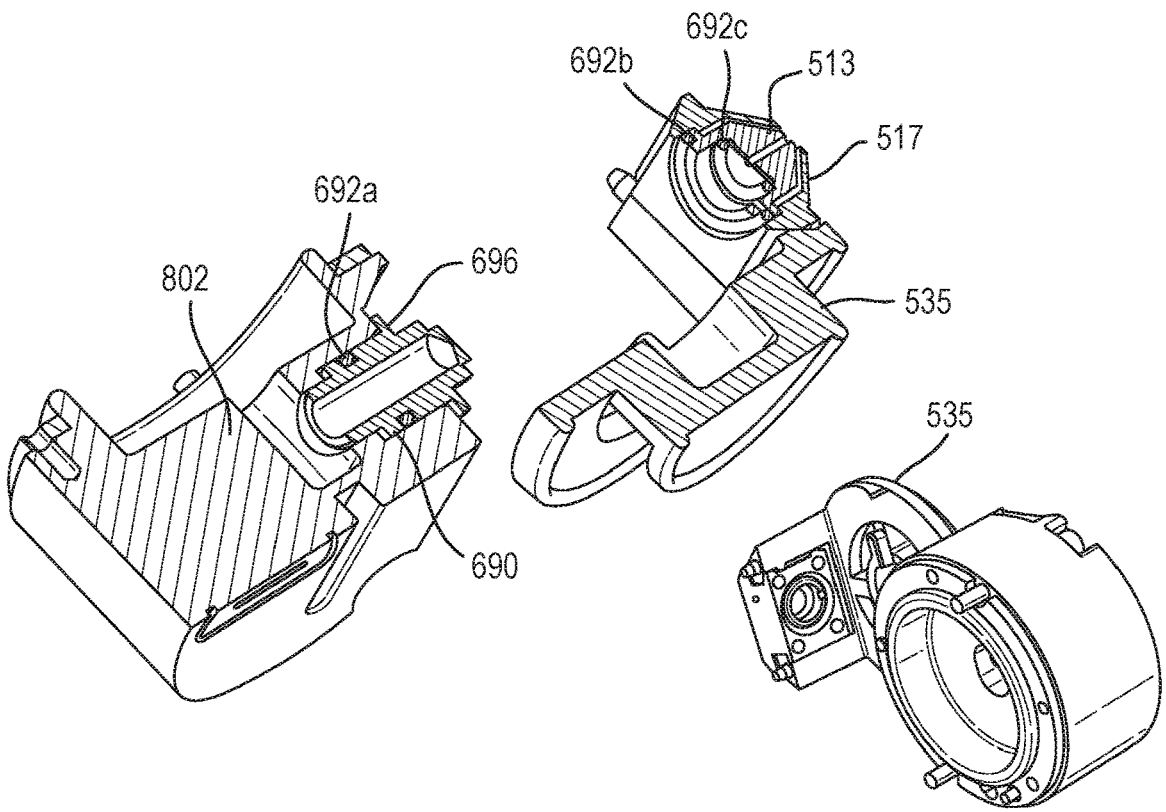
FIG. 6F shows the removal by a user of a cone assembly attached to a clamp to expose a fixed valve having a gas flow restriction aperture which is sufficient to maintain the low pressure within a downstream vacuum chamber when the cone is removed and FIG. 6G illustrates how the fixed valve may be retained in position by suction pressure according to various embodiments.

FIG. 6F shows the outer cone 517, inner sampling cone 513 and apertured disc 525 having been removed by a user by withdrawing or removing a clamp 535 to which at least the outer cone 517 is slidably inserted. According to various embodiments the inner sampling cone 513 may also be attached or secured to the outer cone 517 so that both are removed at the same time.

Instead of utilising a conventional rotatable isolation valve, a fixed non-rotatable valve 690 is provided or otherwise retained in the ion block 802. An O-ring seal 692a is shown which ensures that a vacuum seal is provided between the exterior body of the fixed valve 690 and the ion block 802. An ion block voltage contact 696 is also shown. O-rings seals 692b,692c for the inner and outer cones 513,517 are also shown.

Figure 6G:
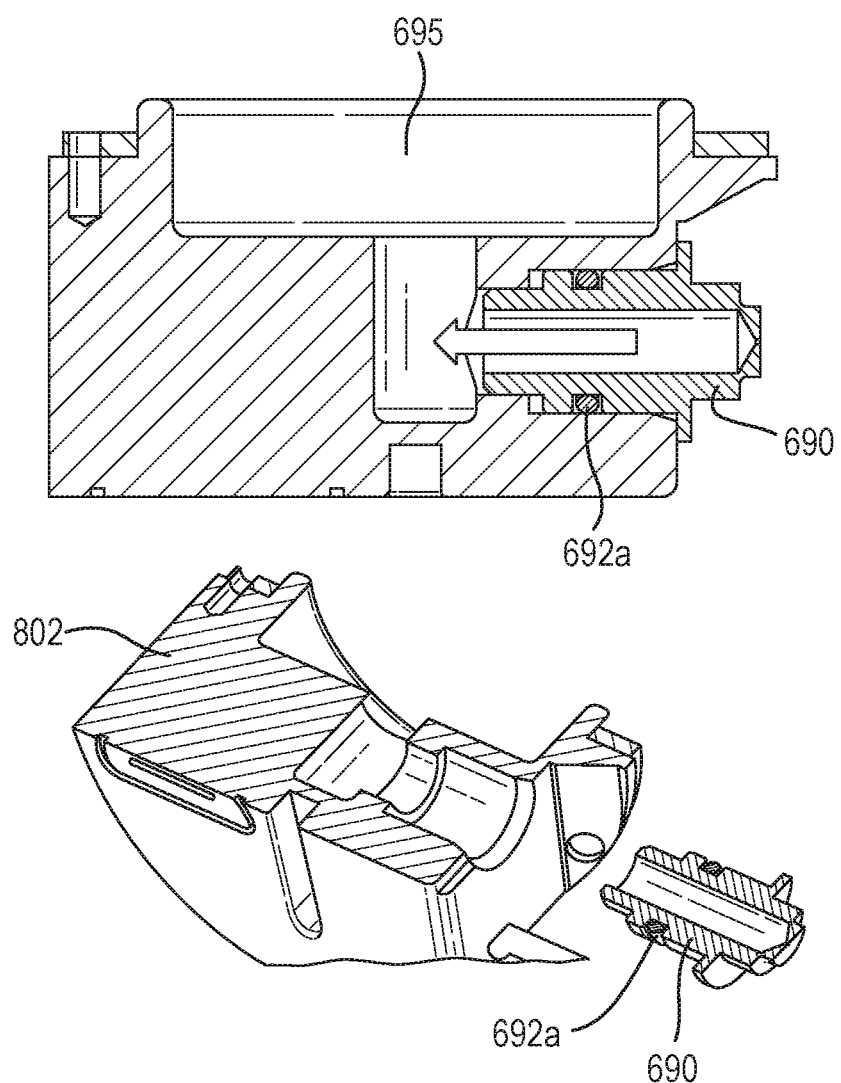

FIG. 6G illustrates how according to various embodiments a fixed valve 690 may be retained within an ion block 802 and may form a gas tight sealing therewith by virtue of an O-ring seal 692a. A user is unable to remove the fixed valve 690 from the ion block 802 when the instrument is operated due to the vacuum pressure within the vacuum chamber 695 of the instrument. The direction of suction force which holds the fixed valve 690 in a fixed position against the ion block 802 during normal operation is shown.

The size of the entrance aperture into the fixed valve 690 is designed for optimum operation conditions and component reliability. Various embodiments are contemplated wherein the shape of the entrance aperture may be cylindrical. However, other embodiments are contemplated wherein there may be more than one entrance aperture and/or wherein the one or more entrance apertures to the fixed valve 690 may have a non-circular aperture. Embodiments are also contemplated wherein the one or more entrance apertures may be angled at a non-zero angle to the longitudinal axis of the fixed valve 690.

It will be understood that total removal of the fixed valve 690 from the ion block 802 will rapidly result in total loss of vacuum pressure within the mass spectrometer 100.

According to various embodiments the ion inlet assembly may be temporarily sealed in order to allow a vacuum housing within the mass spectrometer 100 to be filled with dry nitrogen for shipping. It will be appreciated that filling a vacuum chamber with dry nitrogen allows faster initial pump-down during user initial instrument installation.

It will be appreciated that since according to various embodiments the internal aperture in the vacuum holding member or carrier 531 is substantially smaller in diameter than conventional arrangements, then the vacuum within the first and subsequent vacuum chambers of the instrument can be maintained for substantially longer periods of time than is possible conventionally when the disc 525 is removed and/or replaced.

Accordingly, the mass spectrometer 100 according to various embodiments does not require an isolation valve in contrast with other known mass spectrometers in order to maintain the vacuum within the instrument when a component such as the outer gas cone 517, the inner gas cone 513 or the disc 525 are removed.

A mass spectrometer 100 according to various embodiments therefore enables a reduced cost instrument to be provided which is also simpler for a user to operate since no isolation valve is needed. Furthermore, a user does not need to be understand or learn how to operate such an isolation valve.

The ion block assembly 802 may comprise a heater in order to keep the ion block 802 above ambient temperature in order to prevent droplets of analyte, solvent, neutral particles or condensation from forming within the ion block 802.

According to an embodiment when a user wishes to replace and/or remove either the outer cone 517 and/or the inner sampling cone 513 and/or the disc 525 then both the source or ion block heater and the desolvation heater 404 may be turned OFF. The temperature of the ion block 802 may be monitored by a thermocouple which may be provided within the ion block heater or which may be otherwise provided in or adjacent to the ion block 802.

When the temperature of the ion block is determined to have dropped below a certain temperature such as e.g. 55°

C. then the user may be informed that the clamp 535, outer gas cone 517, inner gas sampling cone 513 and disc 525 are sufficiently cooled down such that a user can touch them without serious risk of injury.

According to various embodiments a user can simply remove and/or replace the outer gas cone 517 and/or inner gas sampling cone 513 and/or disc 525 in less than two minutes without needing to vent the instrument. In particular, the low pressure within the instrument is maintained for a sufficient period of time by the aperture in the fixed valve 690.

According to various embodiments the instrument may be arranged so that the maximum leak rate into the source or ion block 802 during sample cone maintenance is approx. 7 mbar L/s. For example, assuming a backing pump speed of 9 m$^3$/hour (2.5 L/s) and a maximum acceptable pressure of 3 mbar, then the maximum leak rate during sampling cone maintenance may be approx. 2.5 L/s×3 mbar=7.5 mbar L/s.

The ion block 802 may comprise an ion block heater having a K-type thermistor. As will be described in more detail below, according to various embodiments the source (ion block) heater may be disabled to allow forced cooling of the source or ion block 802. For example, desolvation heater 404 and/or ion block heater may be switched OFF whilst API gas is supplied to the ion block 802 in order to cool it down. According to various embodiments either a desolvation gas flow and/or a nebuliser gas flow from the probe 401 may be directed towards the cone region 517,513 of the ion block 802. Additionally and/or alternatively, the cone gas supply may be used to cool the ion block 802 and the inner and outer cones 513,517. In particular, by turning the desolvation heater 404 OFF but maintaining a supply of nebuliser and/or desolvation gas from the probe 401 so as to fill the enclosure housing the ion block with ambient temperature nitrogen or other gas will have a rapid cooling effect upon the metal and plastic components forming the ion inlet assembly which may be touched by a user during servicing. Ambient temperature (e.g. in the range 18-25° C.) cone gas may also be supplied in order to assist with cooling the ion inlet assembly in a rapid manner. Conventional instruments do not have the functionality to induce rapid cooling of the ion block 802 and gas cones 521,513.

Liquid and gaseous exhaust from the source enclosure may be fed into a trap bottle. The drain tubing may be routed so as to avoid electronic components and wiring. The instrument may be arranged so that liquid in the source enclosure always drains out even when the instrument is switched OFF. For example, it will be understood that an LC flow into the source enclosure could be present at any time.

An exhaust check valve may be provided so that when the API gas is turned OFF the exhaust check valve prevents a vacuum from forming in the source enclosure and trap bottle. The exhaust trap bottle may have a capacity 5L.

The fluidics system may comprise a piston pump which allows the automated introduction of a set-up solution into the ion source. The piston pump may have a flow rate range of 0.4 to 50 mL/min. A divert/select valve may be provided which allows rapid automated changeover between LC flow and the flow of one or two internal set-up solutions into the source.

According to various embodiments three solvent bottles 201 may be provided. Solvent A bottle may have a capacity within the range 250-300 mL, solvent B bottle may have a capacity within the range 50-60 mL and solvent C bottle may have a capacity within the range 100-125 mL. The solvent bottles 201 may be readily observable by a user who may easily refill the solvent bottles.

According to an embodiment solvent A may comprise a lock-mass, solvent B may comprise a calibrant and solvent C may comprise a wash. Solvent C (wash) may be connected to a rinse port.

A driver PCB may be provided in order to control the piston pump and the divert/select valve. On power-up the piston pump may be homed and various purge parameters may be set.

Fluidics may be controlled by software and may be enabled as a function of the instrument state and the API gas valve state in a manner as detailed below:

| Instrument state | API gas valve | Software control of fluidics |
|---|---|---|
| Operate | Open | Enabled |
| Operate | Closed | Disabled |
| Over-pressure | Open | Enabled |
| Over-pressure | Closed | Disabled |
| Power Save | Open | Disabled |
| Power Save | Closed | Disabled |

When software control of the fluidics is disabled then the valve is set to a divert position and the pump is stopped.

FIG. 7A illustrates a vacuum pumping arrangement according to various embodiments.

A split-flow turbo molecular vacuum pump (commonly referred to as a "turbo" pump) may be used to pump the fourth or further vacuum chamber or fourth or further differential pumping region, the third vacuum chamber or third differential pumping region, and the second vacuum chamber or second differential pumping region. According to an embodiment the turbo pump may comprise either a Pfeiffer® Splitflow 310 fitted with a TC110 controller or an Edwards® nEXT300/100/100D turbo pump. The turbo pump may be air cooled by a cooling fan.

The turbo molecular vacuum pump may be backed by a rough, roughing or backing pump such as a rotary vane vacuum pump or a diaphragm vacuum pump. The rough, roughing or backing pump may also be used to pump the first vacuum chamber housing the first ion guide 301. The rough, roughing or backing pump may comprise an Edwards® nRV14i backing pump. The backing pump may be provided external to the instrument and may be connected to the first vacuum chamber which houses the first ion guide 301 via a backing line 700 as shown in FIG. 7A.

A first pressure gauge such as a cold cathode gauge 702 may be arranged and adapted to monitor the pressure of the fourth or further vacuum chamber or fourth or further differential pumping region. According to an embodiment the Time of Flight housing pressure may be monitored by an Inficon® MAG500 cold cathode gauge 702.

A second pressure gauge such as a Pirani gauge 701 may be arranged and adapted to monitor the pressure of the backing pump line 700 and hence the first vacuum chamber which is in fluid communication with the upstream pumping block 600 and ion block 802. According to an embodiment the instrument backing pressure may be monitored by an Inficon® PSG500 Pirani gauge 701.

According to various embodiments the observed leak plus outgassing rate of the Time of Flight chamber may be arranged to be less than $4\times10^{-5}$ mbar L/s. Assuming a 200 L/s effective turbo pumping speed then the allowable leak plus outgassing rate is $5\times10^{-7}$ mbar×200 L/s=$1\times10^{-4}$ mbar L/s.

A turbo pump such as an Edwards® nEXT300/100/100D turbo pump may be used which has a main port pumping speed of 400 L/s. As will be detailed in more detail below, EMC shielding measures may reduce the pumping speed by approx. 20% so that the effective pumping speed is 320 L/s. Accordingly, the ultimate vacuum according to various embodiments may be $4\times10^{-5}$ mbar L/s/320 L/s=$1.25\times10^{-7}$ mbar.

Figure 7B:
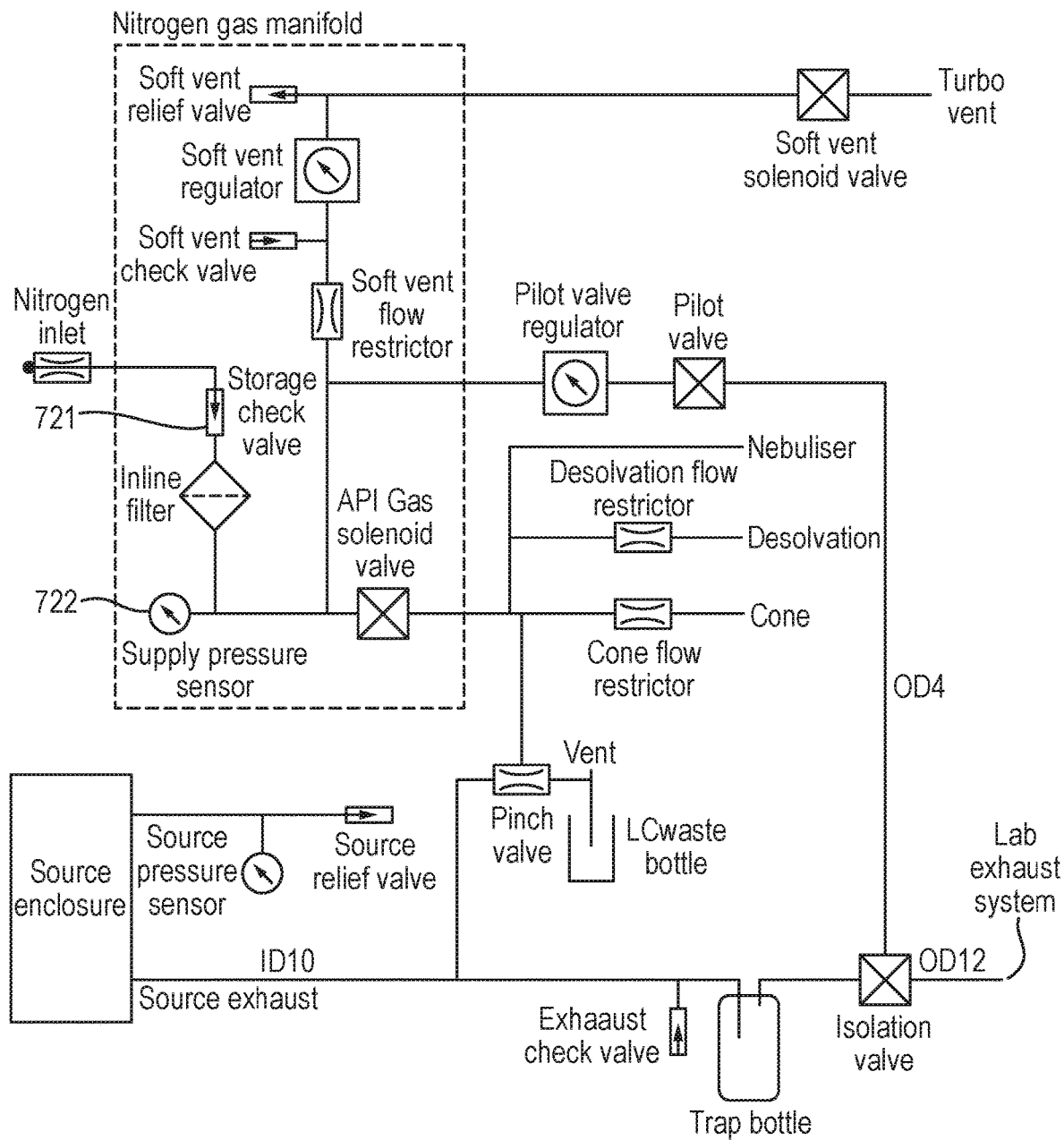
FIG. 7B shows further details of a gas handling system which may be implemented.

According to an embodiment a pump-down sequence may comprise closing a soft vent solenoid as shown in FIG. 7B, starting the backing pump and waiting until the backing pressure drops to 32 mbar. If 32 mbar is not reached within 3 minutes of starting the backing pump then a vent sequence may be performed. Assuming that a pressure of 32 mbar is reached within 3 minutes then the turbo pump is then started. When the turbo speed exceeds 80% of maximum speed then the Time of Flight vacuum gauge 702 may then be switched ON. It will be understood that the vacuum gauge 702 is a sensitive detector and hence is only switched ON when the vacuum pressure is such that the vacuum gauge 702 which not be damaged.

If the turbo speed does not reach 80% of maximum speed within 8 minutes then a vent sequence may be performed.

A pump-down sequence may be deemed completed once the Time of Flight vacuum chamber pressure is determined to be $<1\times10^{-5}$ mbar.

If a vent sequence is to be performed then the instrument may be switched to a Standby mode of operation. The Time of Flight vacuum gauge 702 may be switched OFF and the turbo pump may also be switched OFF. When the turbo pump speed falls to less than 80% of maximum then a soft vent solenoid valve as shown in FIG. 7B may be opened. The system may then wait for 10 seconds before then switching OFF the backing pump.

It will be understood by those skilled in the art that the purpose of the turbo soft vent solenoid valve as shown in FIG. 7B and the soft vent line is to enable the turbo pump to be vented at a controlled rate. It will be understood that if the turbo pump is vented at too fast a rate then the turbo pump may be damaged.

The instrument may switch into a maintenance mode of operation which allows an engineer to perform service work on all instrument sub-systems except for the vacuum system or a subsystem incorporating the vacuum system without having to vent the instrument. The instrument may be pumped down in maintenance mode and conversely the instrument may also be vented in maintenance mode.

A vacuum system protection mechanism may be provided wherein if the turbo speed falls to less than 80% of maximum speed then a vent sequence is initiated. Similarly, if the backing pressure increases to greater than 10 mbar then a vent sequence may also be initiated. According to an embodiment if the turbo power exceeds 120 W for more than 15 minutes then a vent sequence may also be initiated. If on instrument power-up the turbo pump speed is >80% of maximum then the instrument may be set to a pumped state, otherwise the instrument may be set to a venting state.

FIG. 7B shows a schematic of a gas handling system which may be utilised according to various embodiments. A storage check valve 721 may be provided which allows the instrument to be filled with nitrogen for storage and transport. The storage check valve 721 is in fluid communication with an inline filter.

A soft vent flow restrictor may be provided which may limit the maximum gas flow to less than the capacity of a soft vent relief valve in order to prevent the analyser pressure from exceeding 0.5 bar in a single fault condition. The soft vent flow restrictor may comprise an orifice having a diameter in the range 0.70 to 0.75 mm.

A supply pressure sensor 722 may be provided which may indicate if the nitrogen pressure has fallen below 4 bar.

An API gas solenoid valve may be provided which is normally closed and which has an aperture diameter of not less than 1.4 mm.

An API gas inlet is shown which preferably comprises a Nitrogen gas inlet. According to various embodiments the nebuliser gas, desolvation gas and cone gas are all supplied from a common source of nitrogen gas.

A soft vent regulator may be provided which may function to prevent the analyser pressure exceeding 0.5 bar in normal condition.

A soft vent check valve may be provided which may allow the instrument to vent to atmosphere in the event that the nitrogen supply is OFF.

A soft vent relief valve may be provided which may have a cracking pressure of 345 mbar. The soft vent relief valve may function to prevent the pressure in the analyser from exceeding 0.5 bar in a single fault condition. The gas flow rate through the soft vent relief valve may be arranged so as not to be less than 2000 L/h at a differential pressure of 0.5 bar.

The soft vent solenoid valve may normally be in an open position. The soft vent solenoid valve may be arranged to restrict the gas flow rate in order to allow venting of the turbo pump at 100% rotational speed without causing damage to the pump. The maximum orifice diameter may be 1.0 mm.

The maximum nitrogen flow may be restricted such that in the event of a catastrophic failure of the gas handling the maximum leak rate of nitrogen into the lab should be less than 20% of the maximum safe flow rate. According to various embodiments an orifice having a diameter of 1.4 to 1.45 mm may be used.

A source pressure sensor may be provided.

A source relief valve having a cracking pressure of 345 mbar may be provided. The source relief valve may be arranged to prevent the pressure in the source from exceeding 0.5 bar in a single fault condition. The gas flow rate through the source relief valve may be arranged so as not to be less than 2000 L/h at a differential pumping pressure of 0.5 bar. A suitable valve is a Ham-Let® H-480-S-G-1/4-5 psi valve.

A cone restrictor may be provided to restrict the cone flow rate to 36 L/hour for an input pressure of 7 bar. The cone restrictor may comprise a 0.114 mm orifice.

The desolvation flow may be restricted by a desolvation flow restrictor to a flow rate of 940 L/hour for an input pressure of 7 bar. The desolvation flow restrictor may comprise a 0.58 mm orifice.

A pinch valve may be provided which has a pilot operating pressure range of at least 4 to 7 bar gauge. The pinch valve may normally be open and may have a maximum inlet operating pressure of at least 0.5 bar gauge.

When the instrument is requested to turn the API gas OFF, then control software may close the API gas valve, wait 2 seconds and then close the source exhaust valve.

In the event of an API gas failure wherein the pressure switch opens (pressure <4 bar) then software control of the API gas may be disabled and the API gas valve may be closed. The system may then wait 2 seconds before closing the exhaust valve.

In order to turn the API gas ON a source pressure monitor may be turned ON except while a source pressure test is performed. An API gas ON or OFF request from software may be stored as an API Gas Request state which can either be ON or OFF. Further details are presented below:

| API Gas Request state | API Gas Control state | API gas valve |
|---|---|---|
| ON | Enabled | Open |
| ON | Disabled | Closed |
| OFF | Enabled | Closed |
| OFF | Disabled | Closed |

Figure 7C:
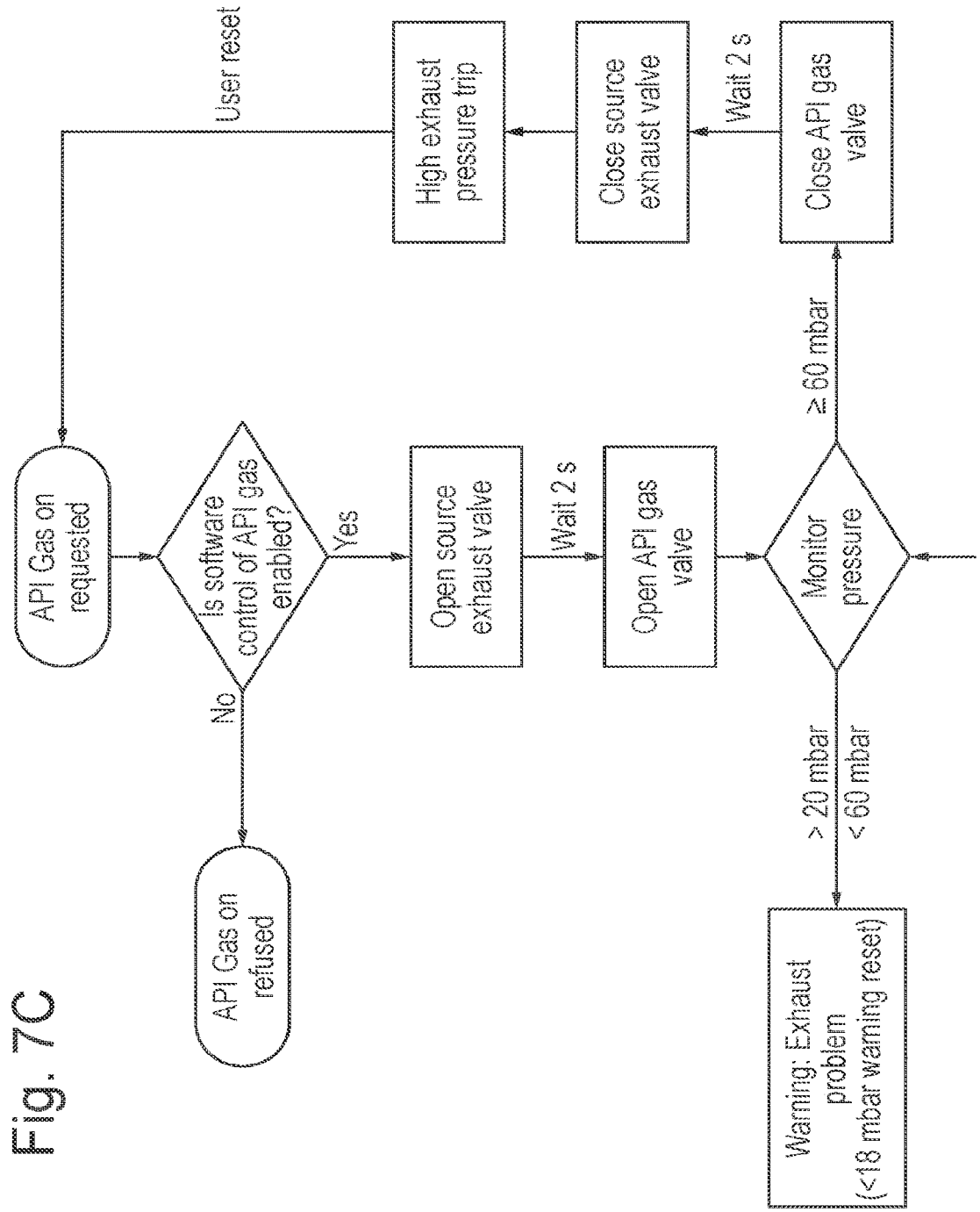
FIG. 7C shows a flow diagram illustrating the steps which may be performed following a user request to the turn the Atmospheric Pressure Ionisation ("API") gas ON and FIG. 7D shows a flow chart illustrating a source pressure test which may be performed according to various embodiments.

FIG. 7C shows a flow diagram showing an instrument response to a user request to turn the API gas ON. A determination may be made as to whether or not software control of API gas is enabled. If software control is not enabled then the request may be refused. If software control of API gas is enabled then the open source exhaust valve may be opened. Then after a delay of 2 seconds the API gas valve may be opened. The pressure is then monitored. If the pressure is determined to be between 20-60 mbar then a warning message may be communicated or issued. If the pressure is greater than 60 mbar then then the API gas valve may be closed. Then after a delay of 2 seconds the source exhaust valve may be closed and a high exhaust pressure trip may occur.

A high exhaust pressure trip may be reset by running a source pressure test.

According to various embodiments the API gas valve may be closed within 100 ms of an excess pressure being sensed by the source pressure sensor.

Figure 7D:
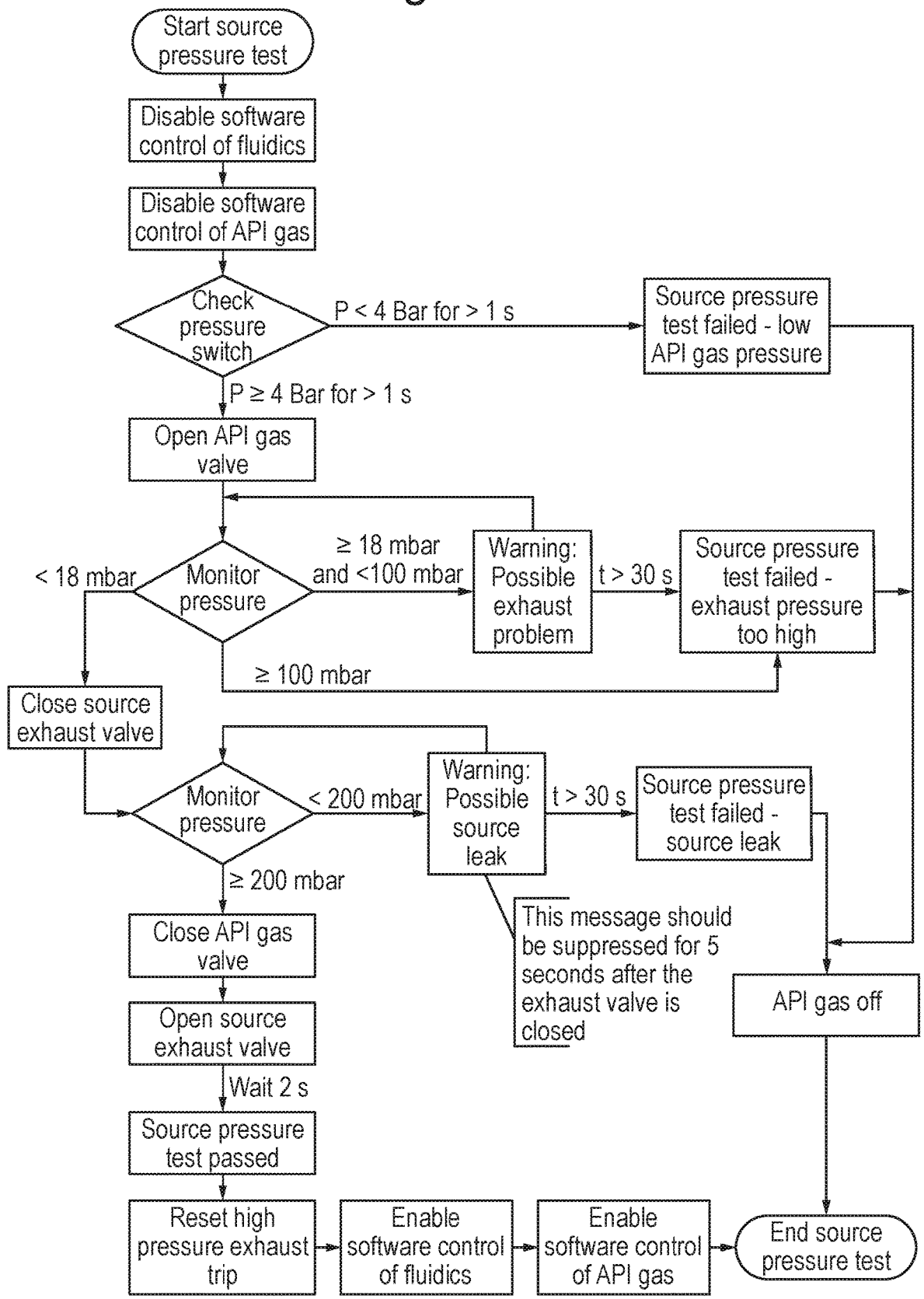
FIG. 7A shows a pumping arrangement according to various embodiments.

FIG. 7D shows a flow diagram illustrating a source pressure test which may be performed according to various embodiments. The source pressure test may be commenced and software control of fluidics may be disabled so that no fluid flows into the Electrospray probe 401. Software control of the API gas may also be disabled i.e. the API is turned OFF. The pressure switch may then be checked. If the pressure is above 4 bar for more than 1 second then the API gas valve may be opened. However, if the pressure is less than 4 bar for more than 1 second then the source pressure test may move to a failed state due to low API gas pressure.

Assuming that the API gas valve is opened then the pressure may then be monitored. If the pressure is in the range 18-100 mbar then a warning message may be output indicating a possible exhaust problem. If the warning status continues for more than 30 seconds then the system may conclude that the source pressure test has failed due to the exhaust pressure being too high.

If the monitored pressure is determined to be less than 18 mbar then the source exhaust valve is closed.

The pressure may then again be monitored. If the pressure is less than 200 mbar then a warning message indicating a possible source leak may be issued.

If the pressure is determined to be greater than 200 mbar then the API gas valve may be closed and the source exhaust valve may be opened i.e. the system looks to build pressure and to test for leaks. The system may then wait 2 seconds before determining that the source pressure test is passed.

If the source pressure test has been determined to have been passed then the high pressure exhaust trip may be reset and software control of fluidics may be enabled. Software control of the API gas may then be enabled and the source pressure test may then be concluded.

According to various embodiments the API gas valve may be closed within 100 ms of an excess pressure being sensed by the source pressure sensor.

In the event of a source pressure test failure, the divert valve position may be set to divert and the valve may be kept in this position until the source pressure test is either passed or the test is over-ridden.

It is contemplated that the source pressure test may be over-ridden in certain circumstances. Accordingly, a user may be permitted to continue to use an instrument where they have assessed any potential risk as being acceptable. If the user is permitted to continue using the instrument then the source pressure test status message may still be displayed in order to show the original failure. As a result, a user may be reminded of the continuing failed status so that the user may continually re-evaluate any potential risk.

In the event that a user requests a source pressure test over-ride then the system may reset a high pressure exhaust trip and then enable software control of the divert valve. The system may then enable software control of the API gas before determining that the source pressure test over-ride is complete.

The pressure reading used in the source pressure test and source pressure monitoring may include a zero offset correction.

The gas and fluidics control responsibility may be summarised as detailed below:

| Mode of operation | Software | Electronics |
|---|---|---|
| Operate | Gas and fluidics | None |
| Power save | Gas | Fluidics |
| Standby | Gas | Fluidics |
| SPT/Failure | None | Gas and fluidics |
| Vacuum loss | None | Gas and fluidics |
| Gas fail state | None | Gas and fluidics |
| Operate gas OFF | Gas | Fluidics |

A pressure test may be initiated if a user triggers an interlock.

The instrument may operate in various different modes of operation. If the turbo pump speed falls to less than 80% of maximum speed whilst in Operate, Over-pressure or Power save mode then the instrument may enter a Standby state or mode of operation.

If the pressure in the Time of Flight vacuum chamber is greater than $1\times10^{-5}$ mbar and/or the turbo speed is less than 80% of maximum speed then the instrument may be prevented from operating in an Operate mode of operation.

According to various embodiments the instrument may be operated in a Power save mode. In a Power save mode of operation the piston pump may be stopped. If the instrument is switched into a Power save mode while the divert valve is in the LC position, then the divert valve may change to a divert position. A Power save mode of operation may be considered as being a default mode of operation wherein all back voltages are kept ON, front voltages are turned OFF and gas is OFF.

If the instrument switches from a Power save mode of operation to an Operate mode of operation then the piston pump divert valves may be returned to their previous states i.e. their states immediately before a Power save mode of operation was entered.

If the Time of Flight region pressure rises above $1.5\times10^{-5}$ mbar while the instrument is in an Operate mode of operation then the instrument may enter an Over-pressure mode of operation or state.

If the Time of Flight pressure enters the range $1\times10^{-8}$ to $1\times10^{-5}$ mbar while the instrument is in an Over-pressure mode of operation then the instrument may enter an Operate mode of operation.

If the API gas pressure falls below its trip level while the instrument is in an Operate mode of operation then the instrument may enter a Gas Fail state or mode of operation. The instrument may remain in a Gas Fail state until both: (i) the API gas pressure is above its trip level; and (ii) the instrument is operated in either Standby or Power save mode.

According to an embodiment the instrument may transition from an Operate mode of operation to an Operate with Source Interlock Open mode of operation when the source cover is opened. Similarly, the instrument may transition from an Operate with Source Interlock Open mode of operation to an Operate mode of operation when the source cover is closed.

According to an embodiment the instrument may transition from an Over-pressure mode of operation to an Over-pressure with Source Interlock Open mode of operation when the source cover is opened. Similarly, the instrument may transition from an Over-pressure with Source Interlock Open mode of operation to an Over-pressure mode of operation when the source cover is closed.

The instrument may operate in a number of different modes of operation which may be summarised as follows:

| Mode of operation | Analyser voltages | Front end voltages | Desolvation heater | Source heater | API gas control state |
|---|---|---|---|---|---|
| Standby | OFF | OFF | OFF | ON | Enabled |
| Operate | ON | ON | ON | ON | Enabled |
| Power Save | ON | OFF | OFF | ON | Enabled |
| Over-pressure | OFF | ON | ON | ON | Enabled |
| Gas Fail | ON | OFF | OFF | ON | Disabled |
| Operate with Source Interlock | ON | OFF | OFF | OFF | Disabled |
| Over-pressure with Source interlock | OFF | OFF | OFF | OFF | Disabled |
| Not Pumped | OFF | OFF | OFF | OFF | Enabled |

Reference to front end voltages relates to voltages which are applied to the Electrospray capillary electrode 402, the source offset, the source or first ion guide 301, aperture #1 (see FIG. 15A) and the quadrupole ion guide 302.

Reference to analyser voltages relates to all high voltages except the front end voltages.

Reference to API gas refers to desolvation, cone and nebuliser gases.

Reference to Not Pumped refers to all vacuum states except pumped.

If any high voltage power supply loses communication with the overall system or a global circuitry control module then the high voltage power supply may be arranged to switch OFF its high voltages. The global circuitry control module may be arranged to detect the loss of communication of any subsystem such as a power supply unit ("PSU"), a pump or gauge etc.

According to various embodiments the system will not indicate its state or mode of operation as being Standby if the system is unable to verify that all subsystems are in a Standby state.

As is apparent from the above table, when the instrument is operated in an Operate mode of operation then all voltages are switched ON. When the instrument transitions to operate in an Operate mode of operation then the following voltages are ON namely transfer lens voltages, ion guide voltages, voltages applied to the first ion guide 301 and the capillary electrode 402. In addition, the desolvation gas and desolvation heater are all ON.

If a serious fault were to develop then the instrument may switch to a Standby mode of operation wherein all voltages apart from the source heater provided in the ion block 802 are turned OFF and only a service engineer can resolve the fault. It will be understood that the instrument may only be put into a Standby mode of operation wherein voltages apart from the source heater in the ion block 802 are turned OFF only if a serious fault occurs or if a service engineer specifies that the instrument should be put into a Standby mode operation. A user or customer may (or may not) be able to place an instrument into a Standby mode of operation. Accordingly, in a Standby mode of operation all voltages are OFF and the desolvation gas flow and desolvation heater 404 are all OFF. Only the source heater in the ion block 802 may be left ON.

The instrument may be kept in a Power Save mode by default and may be switched so as to operate in an Operate mode of operation wherein all the relevant voltages and gas flows are turned ON. This approach significantly reduces the time taken for the instrument to be put into a useable state. When the instrument transitions to a Power Save mode of operation then the following voltages are ON—pusher electrode 305, reflectron 306, ion detector 307 and more generally the various Time of Flight mass analyser 304 voltages.

The stability of the power supplies for the Time of Flight mass analyser 304, ion detector 307 and reflectron 306 can affect the mass accuracy of the instrument. The settling time when turning ON or switching polarity on a known conventional instrument is around 20 minutes.

It has been established that if the power supplies are cold or have been left OFF for a prolonged period of time then they may require up to 10 hours to warm up and stabilise. For this reason customers may be prevented from going into a Standby mode of operation which would switch OFF the voltages to the Time of Flight analyser 304 including the reflectron 306 and ion detector 307 power supplies.

On start-up the instrument may move to a Power save mode of operation as quickly as possible as this allows the power supplies the time they need to warm up whilst the instrument is pumping down. As a result, by the time the instrument has reached the required pressure to carry out instrument setup the power supplies will have stabilised thus reducing any concerns relating to mass accuracy.

According to various embodiments in the event of a vacuum failure in the vacuum chamber housing the Time of Flight mass analyser 304 then power may be shut down or turned OFF to all the peripherals or sub-modules e.g. the ion source 300, first ion guide 301, the segmented quadrupole rod set ion guide 302, the transfer optics 303, the pusher electrode 305 high voltage supply, the reflectron 306 high voltage supply and the ion detector 307 high voltage supply. The voltages are primarily all turned OFF for reasons of instrument protection and in particular protecting sensitive components of the Time of Flight mass analyser 307 from high voltage discharge damage.

It will be understood that high voltages may be applied to closely spaced electrodes in the Time of Flight mass analyser 304 on the assumption that the operating pressure will be very low and hence there will be no risk of sparking or electrical discharge effects. Accordingly, in the event of a serious vacuum failure in the vacuum chamber housing the Time of Flight mass analyser 304 then the instrument may remove power or switch power OFF to the following modules or sub-modules: (i) the ion source high voltage supply module; (ii) the first ion guide 301 voltage supply module; (iii) the quadrupole ion guide 302 voltage supply module; (iv) the high voltage pusher electrode 305 supply module; (v) the high voltage reflectron 306 voltage supply module; and (vi) the high voltage detector 307 module. The instrument protection mode of operation is different to a Standby mode of operation wherein electrical power is still supplied to various power supplies or modules or sub-modules. In contrast, in an instrument protection mode of operation power is removed to the various power supply modules by the action of a global circuitry control module. Accordingly, if one of the power supply modules were faulty it would still be unable in a fault condition to turn voltages ON because the module would be denied power by the global circuitry control module.

Figure 8:
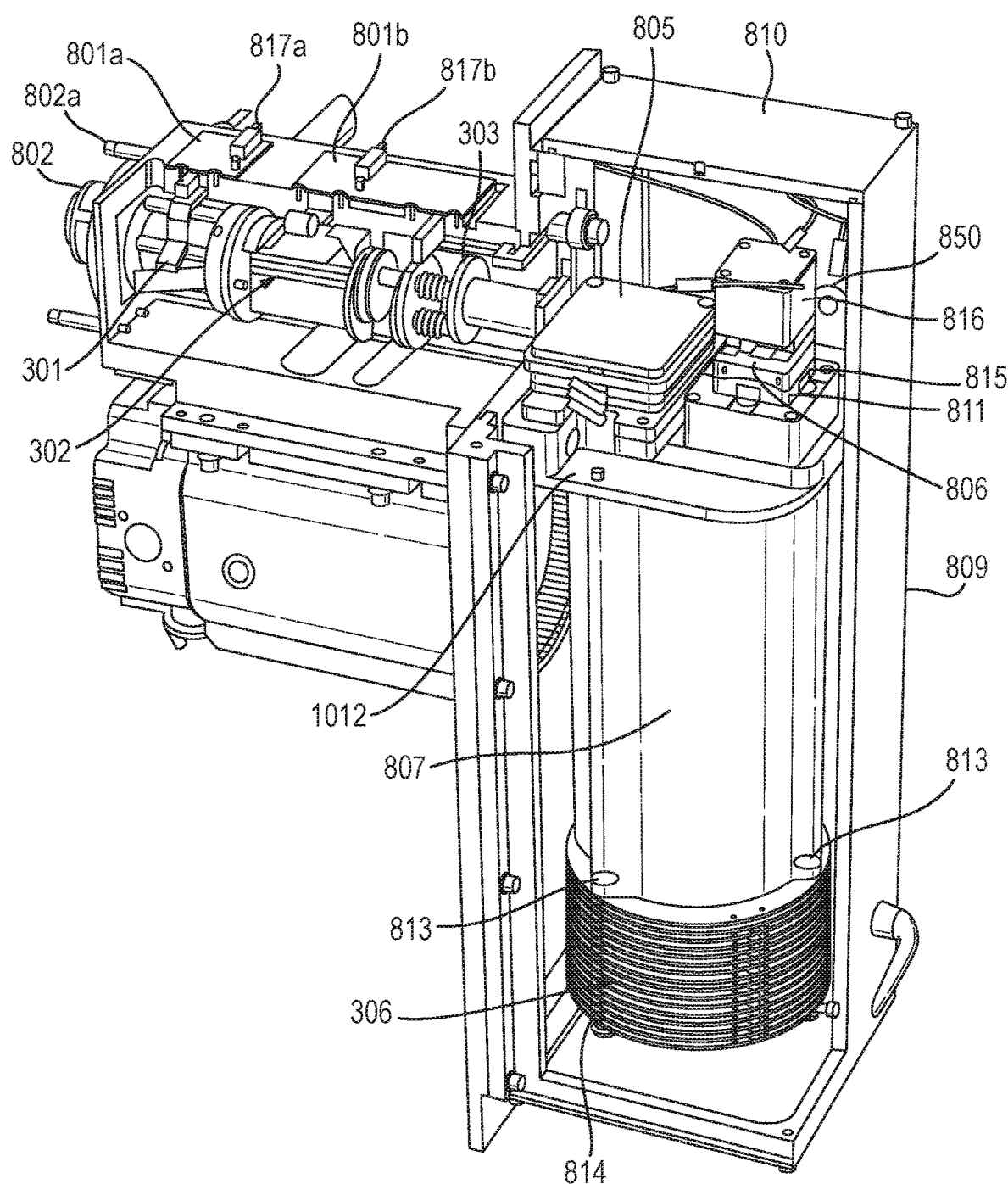
FIG. 8 shows in more detail a mass spectrometer according to various embodiments.

FIG. 8 shows a view of a mass spectrometer 100 according to various embodiments in more detail. The mass spectrometer 100 may comprise a first vacuum PCB interface 801a having a first connector 817a for directly connecting the first vacuum interface PCB 801a to a first local control circuitry module (not shown) and a second vacuum PCB interface 801b having a second connector 817b for directly connecting the second vacuum interface PCB 801b to a second local control circuitry module (not shown).

The mass spectrometer 100 may further comprise a pumping or ion block 802 which is mounted to a pumping block or thermal isolation stage (not viewable in FIG. 8). According to various embodiments one or more dowels or projections 802a may be provided which enable a source enclosure (not shown) to connect to and secure over and house the ion block 802. The source enclosure may serve the purpose of preventing a user from inadvertently coming into contact with any high voltages associated with the Electrospray probe 402. A micro-switch or other form of interlock may be used to detect opening of the source enclosure by a user in order to gain source access whereupon high voltages to the ion source 402 may then be turned OFF for user safety reasons.

Ions are transmitted via an initial or first ion guide 301, which may comprise a conjoined ring ion guide, and then via a segmented quadrupole rod set ion guide 302 to a transfer lens or transfer optics arrangement 303. The transfer optics 303 may be designed in order to provide a highly efficient ion guide and interface into the Time of Flight mass analyser 304 whilst also reducing manufacturing costs.

Ions may be transmitted via the transfer optics 303 so that the ions arrive in a pusher electrode assembly 305. The pusher electrode assembly 305 may also be designed so as to provide high performance whilst at the same time reducing manufacturing costs.

According to various embodiments a cantilevered Time of Flight stack 807 may be provided. The cantilevered arrangement may be used to mount a Time of Flight stack or flight tube 807 and has the advantage of both thermally and electrically isolating the Time of Flight stack or flight tube 807. The cantilevered arrangement represents a significant design departure from conventional instruments and results in substantial improvements in instrument performance.

According to an embodiment an alumina ceramic spacer and a plastic (PEEK) dowel may be used.

According to an embodiment when a lock mass is introduced and the instrument is calibrated then the Time of Flight stack or flight tube 807 will not be subjected to thermal expansion. The cantilevered arrangement according to various embodiments is in contrast to known arrangements wherein both the reflectron 306 and the pusher assembly 305 were mounted to both ends of a side flange. As a result conventional arrangements were subjected to thermal impact.

Ions may be arranged to pass into a flight tube 807 and may be reflected by a reflectron 306 towards an ion detector 811. The output from the ion detector 811 is passed to a pre-amplifier (not shown) and then to an Analogue to Digital Converter ("ADC") (also not shown). The reflectron 306 is preferably designed so as to provide high performance whilst also reducing manufacturing cost and improving reliability.

As shown in FIG. 8 the various electrode rings and spacers which collectively form the reflectron subassembly may be mounted to a plurality of PEEK support rods 814. The reflectron subassembly may then be clamped to the flight tube 807 using one or more cotter pins 813. As a result, the components of the reflectron subassembly are held under compression which enables the individual electrodes forming the reflectron to be maintained parallel to each other with a high level of precision. According to various embodiments the components may be held under spring loaded compression.

The pusher electrode assembly 305 and the detector electronics or a discrete detector module may be mounted to a common pusher plate assembly 1012. This is described in more detail below with reference to FIGS. 10A-10C.

The Time of Flight mass analyser 304 may have a full length cover 809 which may be readily removed enabling extensive service access. The full length cover 809 may be held in place by a plurality of screws e.g. 5 screws. A service engineer may undo the five screws in order to expose the full length of the time of flight tube 807 and the reflectron 306.

The mass analyser 304 may further comprise a removable lid 810 for quick service access. In particular, the removable lid 810 may provide access to a service engineer so that the service engineer can replace an entrance plate 1000 as shown in FIG. 100. In particular, the entrance plate 1000 may become contaminated due to ions impacting upon the surface of the entrance plate 1000 resulting in surface charging effects and potentially reducing the efficiency of ion transfer from the transfer optics 303 into a pusher region adjacent the pusher electrode 305.

A SMA (SubMiniature version A) connector or housing 850 is shown but an AC coupler 851 is obscured from view.

Figure 9:
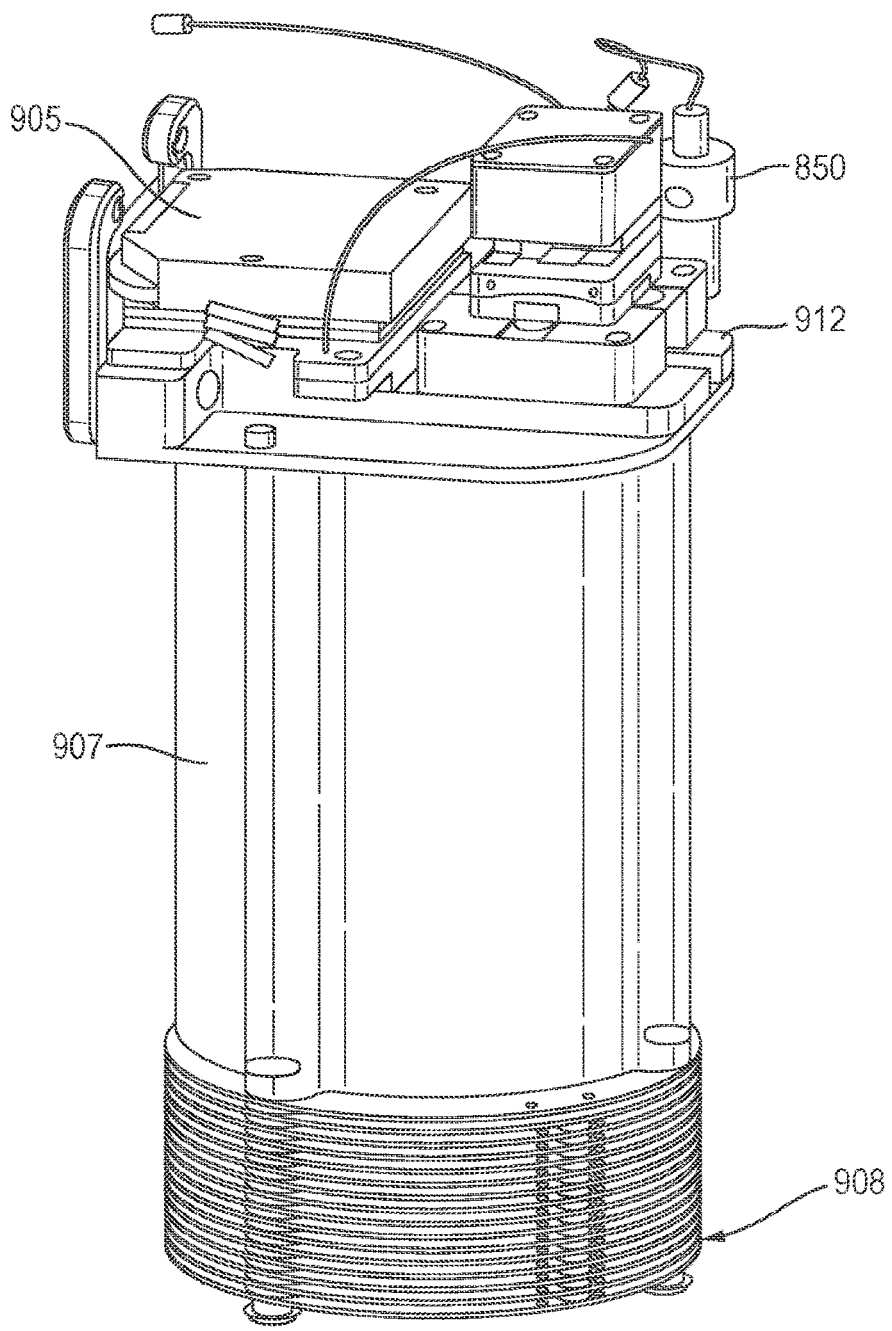
FIG. 9 shows a Time of Flight mass analyser assembly comprising a pusher plate assembly having mounted thereto a pusher electronics module and an ion detector module and wherein a reflectron assembly is suspended from an extruded flight tube which in turn is suspended from the pusher plate assembly.

FIG. 9 shows a pusher plate assembly 912, flight tube 907 and reflectron stack 908. A pusher assembly 905 having a pusher shielding cover is also shown. The flight tube 907 may comprise an extruded or plastic flight tube. The reflectron 306 may utilise fewer ceramic components than conventional reflectron assemblies thereby reducing manufacturing cost. According to various embodiments the reflectron 306 may make greater use of PEEK compared with conventional reflectron arrangements.

A SMA (SubMiniature version A) connector or housing 850 is shown but an AC coupler 851 is obscured from view.

According to other embodiments the reflectron 306 may comprise a bonded reflectron. According to another embodiment the reflectron 306 may comprise a metalised ceramic arrangement. According to another embodiment the reflectron 306 may comprise a jigged then bonded arrangement.

According to alternative embodiments instead of stacking, mounting and fixing multiple electrodes or rings, a single bulk piece of an insulating material such as a ceramic may be provided. Conductive metalised regions on the surface may then be provided with electrical connections to these regions so as to define desired electric fields. For example, the inner surface of a single piece of cylindrical shaped ceramic may have multiple parallel metalised conductive rings deposited as an alternative method of providing potential surfaces as a result of stacking multiple individual rings as is known conventionally. The bulk ceramic material provides insulation between the different potentials applied to different surface regions. The alternative arrangement reduces the number of components thereby simplifying the overall design, improving tolerance build up and reducing manufacturing cost. Furthermore, it is contemplated that multiple devices may be constructed this way and may be combined with or without grids or lenses placed in between. For example, according to one embodiment a first grid electrode may be provided, followed by a first ceramic cylindrical element, followed by a second grid electrode followed by a second ceramic cylindrical element.

Figure 10A:
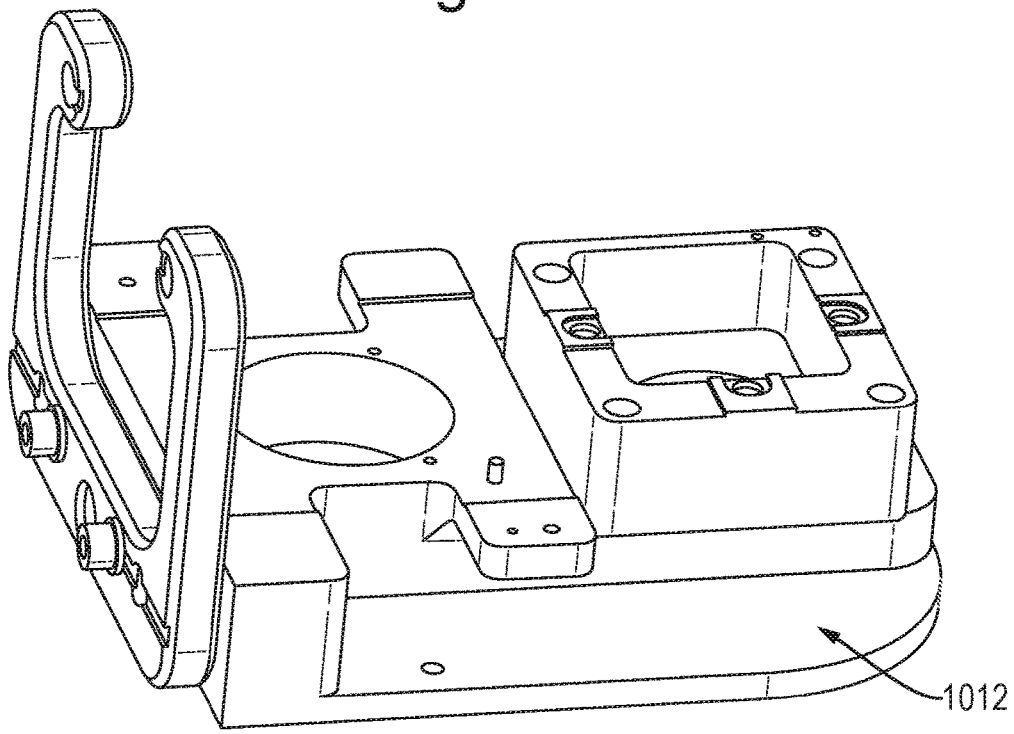
FIG. 10A shows in more detail a pusher plate assembly.
Figure 10B:
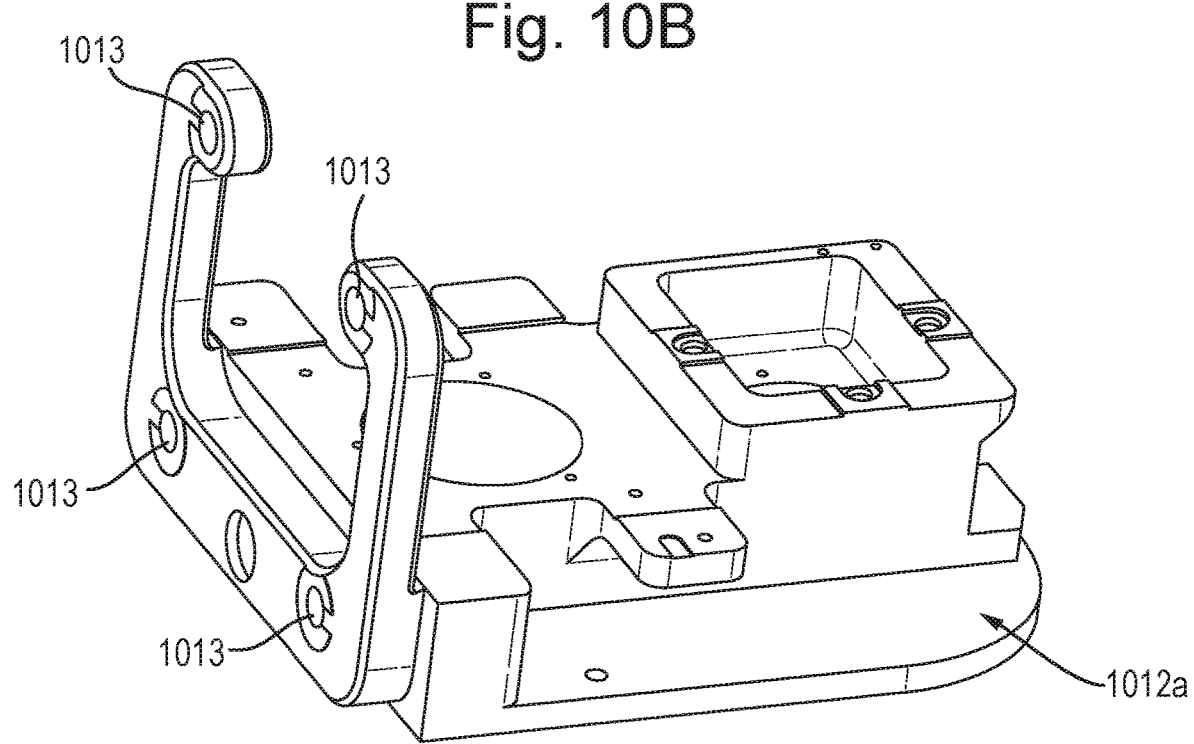
FIG. 10B shows a monolithic pusher plate assembly according to various embodiments and FIG. 10O shows a pusher plate assembly with a pusher electrode assembly or module and an ion detector assembly or module mounted thereto.
Figure 10C:
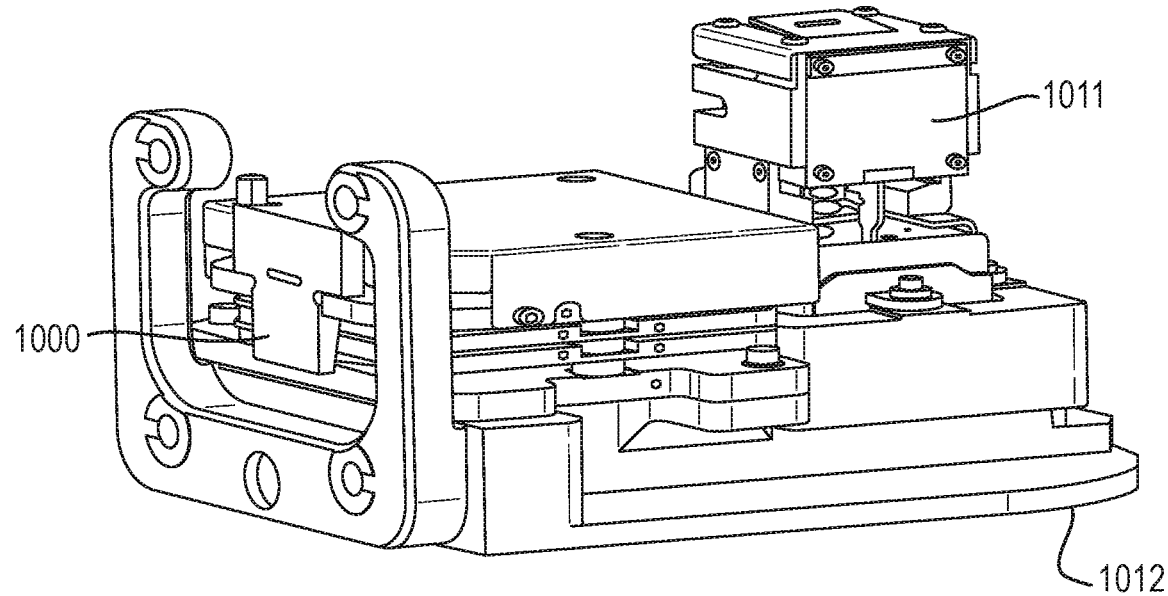

FIG. 10A shows a pusher plate assembly 1012 comprising three parts according to various embodiments. According to an alternative embodiment a monolithic support plate 1012a may be provided as shown in FIG. 10B. The monolithic support plate 1012a may be made by extrusion. The support plate 1012a may comprise a horse shoe shaped bracket having a plurality (e.g. four) fixing points 1013. According to an embodiment four screws may be used to connect the horse shoe shaped bracket to the housing of the mass spectrometer and enable a cantilevered arrangement to be provided. The bracket may be maintained at a voltage which may be the same as the Time of Flight voltage i.e. 4.5 kV. By way of contrast, the mass spectrometer housing may be maintained at ground voltage i.e. 0V.

FIG. 10O shows a pusher plate assembly 1012 having mounted thereon a pusher electrode assembly and an ion detector assembly 1011. An entrance plate 1000 having an ion entrance slit or aperture is shown.

Figure 16A:
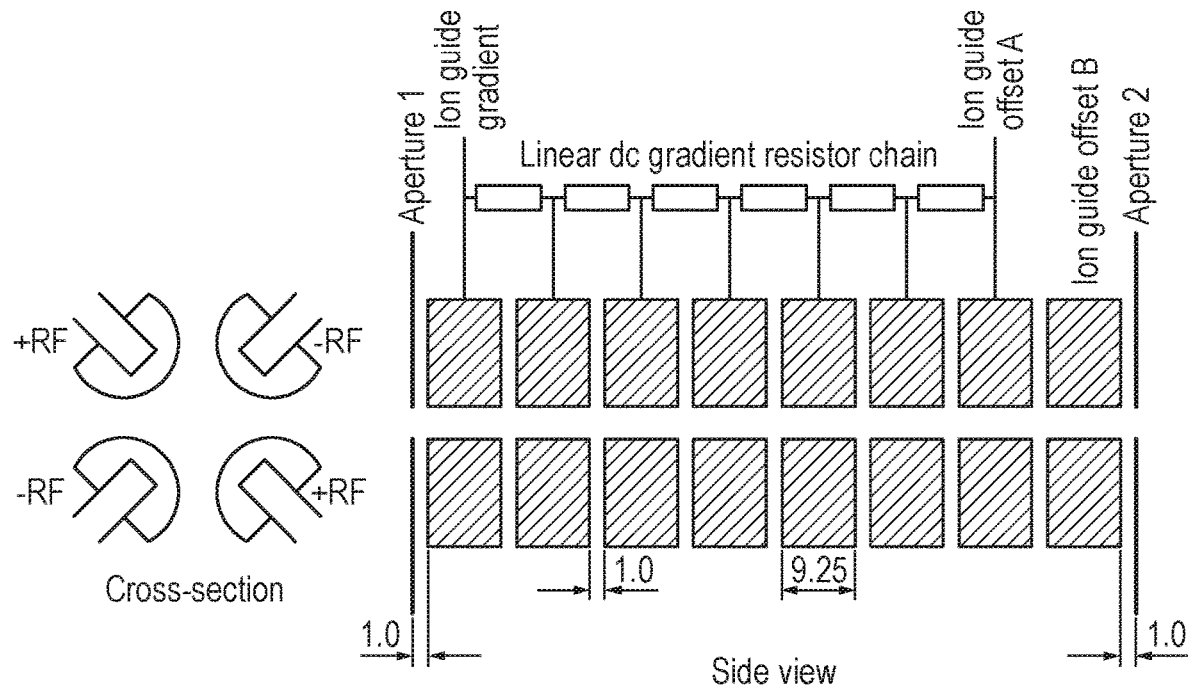
FIG. 16A shows in more detail a segmented quadrupole rod set ion guide according to various embodiments which may be provided downstream of the first ion guide and which comprises a plurality of rod electrodes.
Figure 16B:
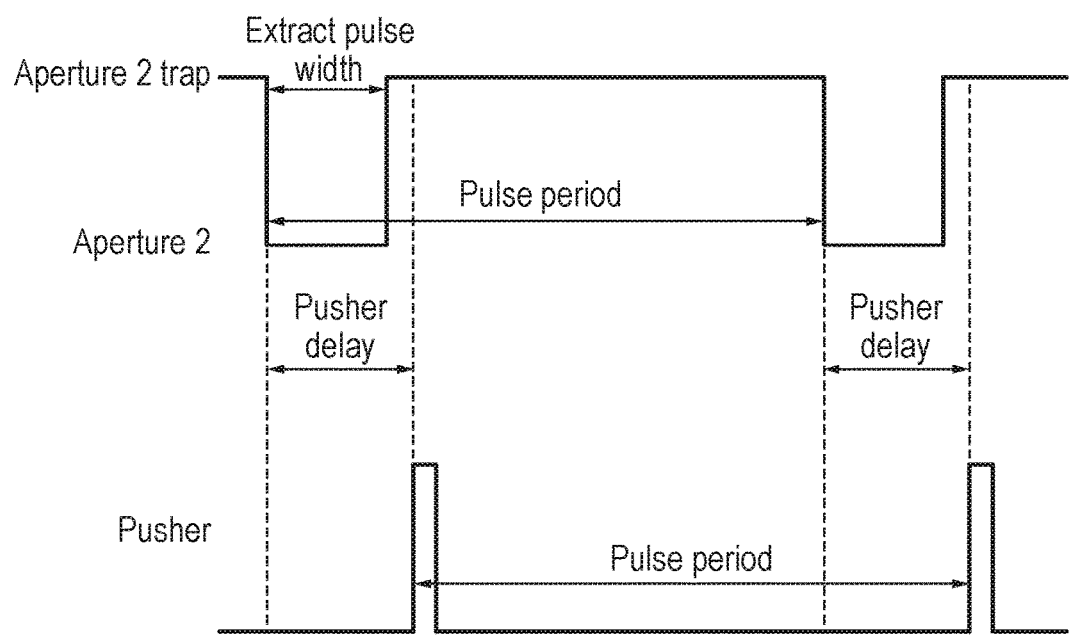
FIG. 16B illustrates how a voltage pulse applied to a pusher electrode of a Time of Flight mass analyser may be synchronised with trapping and releasing ions from the end region of the segmented quadrupole rod set ion guide.
Figure 16C:
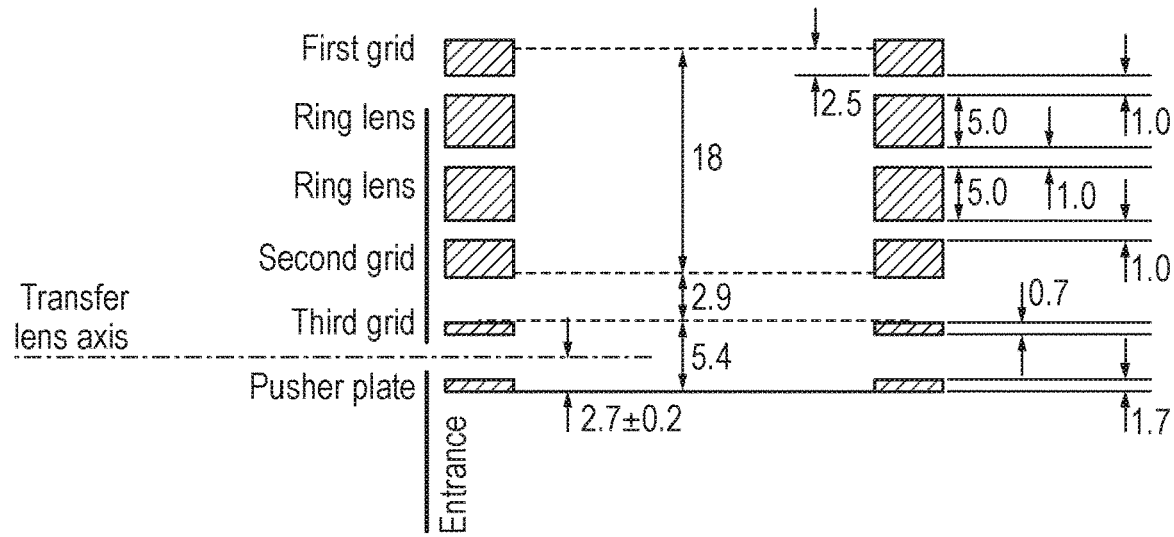
FIG. 16C illustrates in more detail the pusher electrode geometry and shows the arrangement of grid and ring lenses or electrodes and their relative spacing.

The pusher electrode may comprise a double grid electrode arrangement having a 2.9 mm field free region between a second and third grid electrode as shown in more detail in FIG. 16C.

Figure 11:
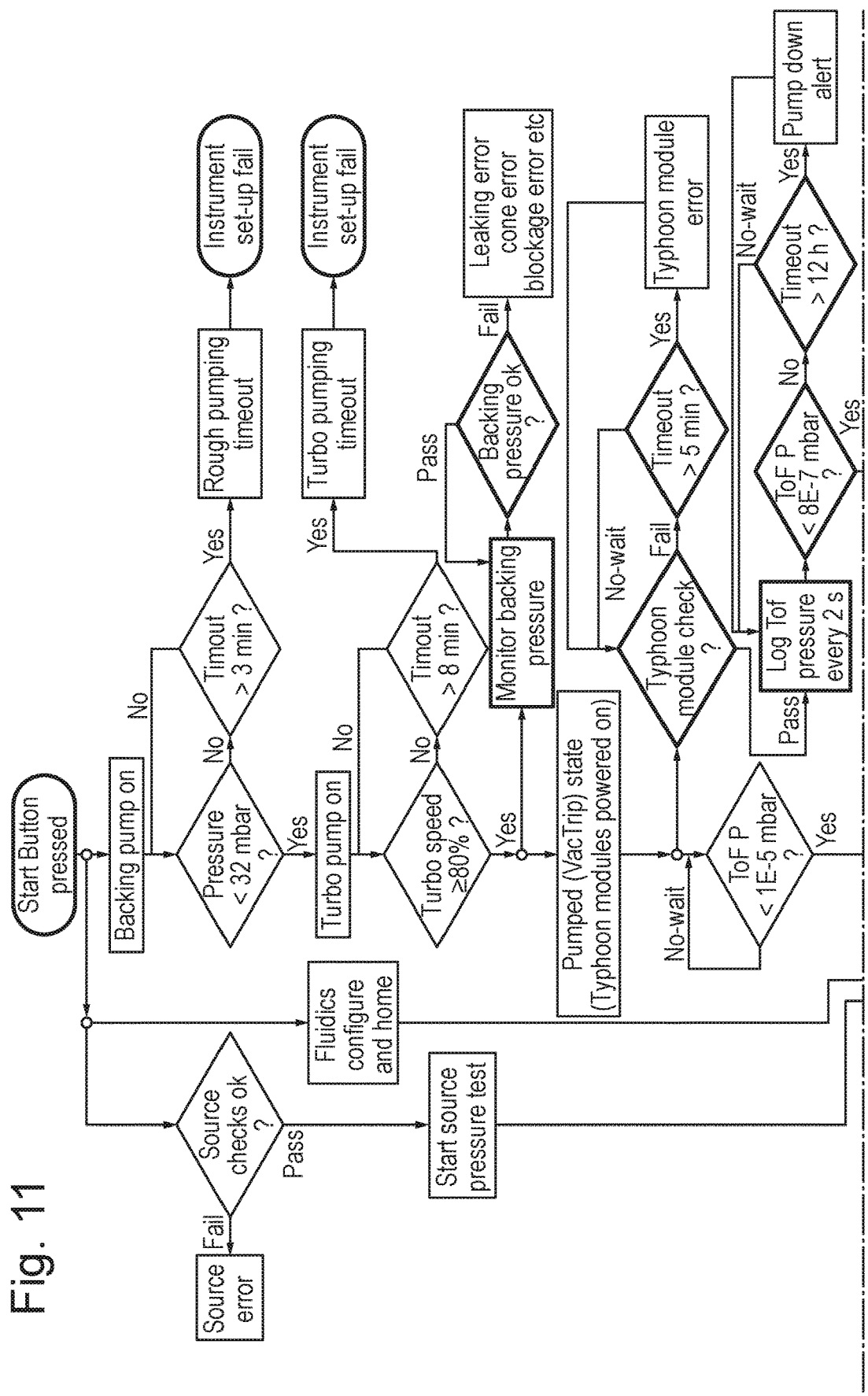
FIG. 11 shows a flow diagram illustrating various processes which occur upon a user pressing a start button on the front panel of the instrument according to various embodiments.
Figure 11:
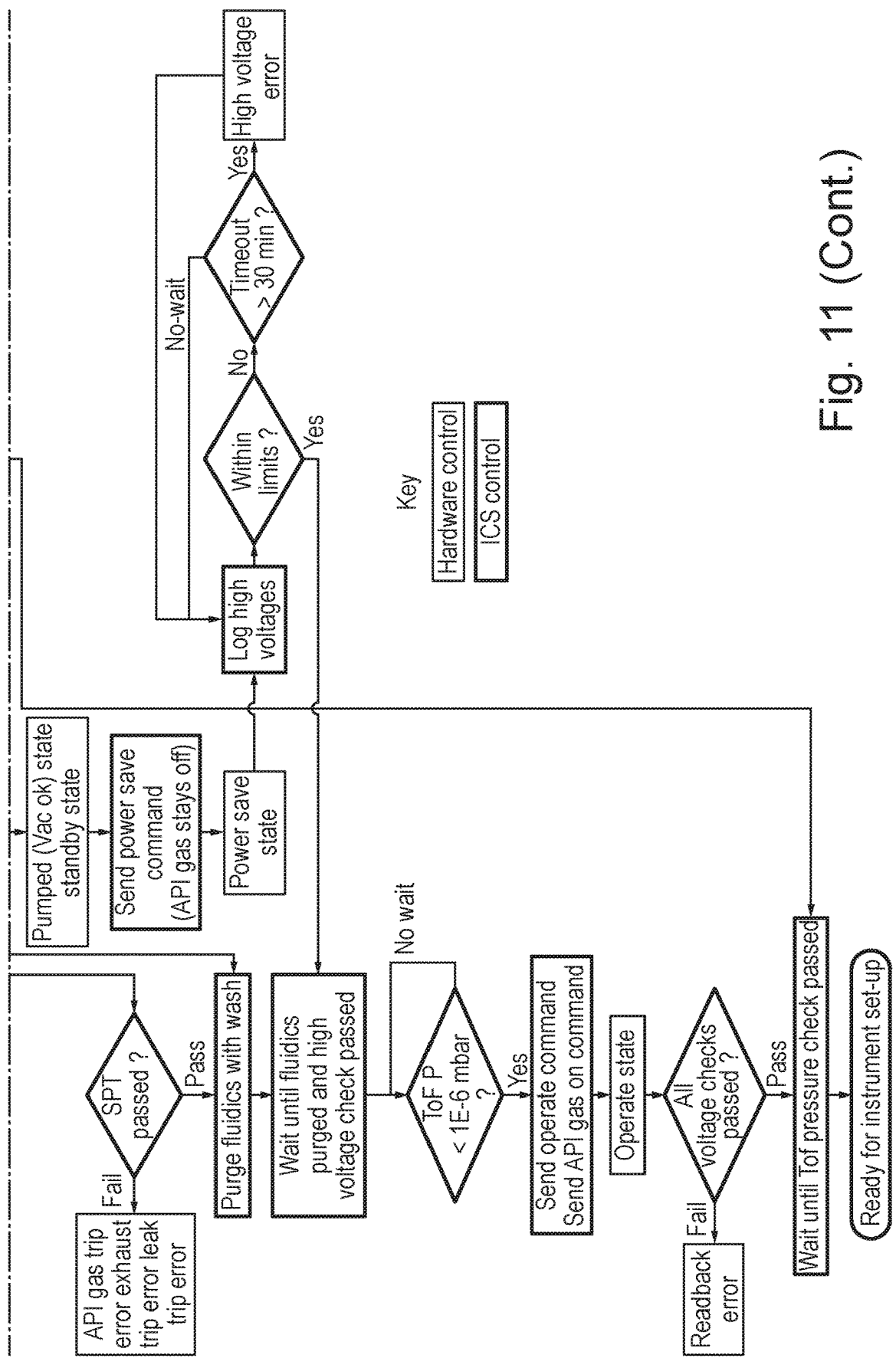

FIG. 11 shows a flow diagram illustrating various processes which may occur once a start button has been pressed.

According to an embodiment when the backing pump is turned ON a check may be made that the pressure is <32 mbar within three minutes of operation. If a pressure of <32 mbar is not achieved or established within three minutes of operation then a rough pumping timeout (amber) warning may be issued.

Figure 12A:
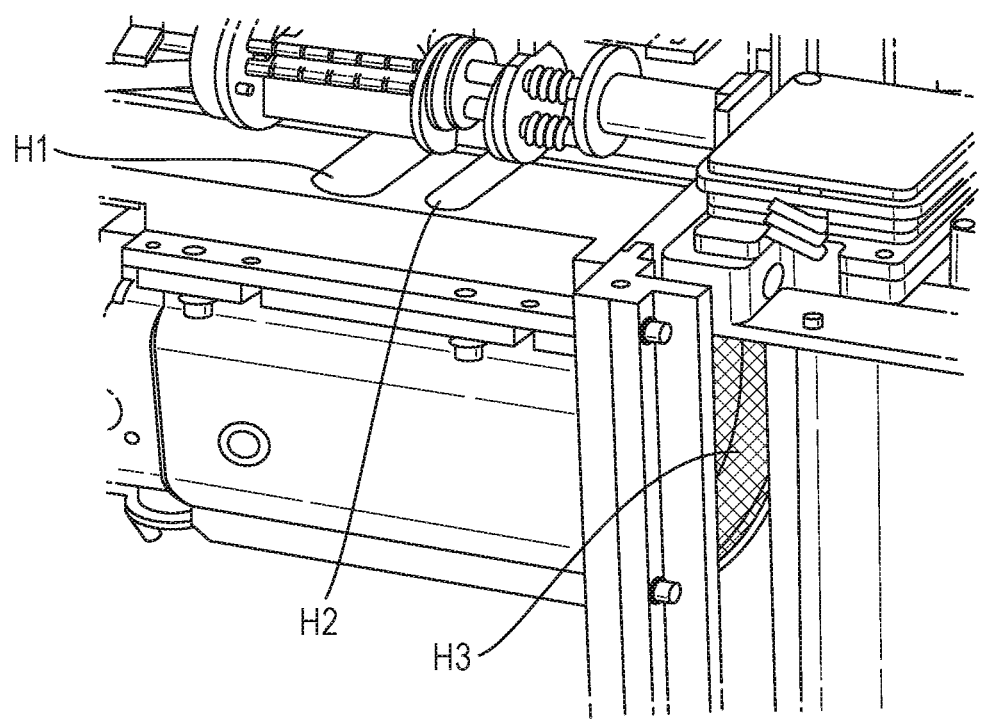
FIG. 12A shows in greater detail three separate pumping ports of a turbo molecular pump according to various embodiments and FIG. 12B shows in greater detail two of the three pumping ports which are arranged to pump separate vacuum chambers.

FIG. 12A shows the three different pumping ports of the turbo molecular pump according to various embodiments. The first pumping port H1 may be arranged adjacent the segmented quadrupole rod set 302. The second pumping port H2 may be arranged adjacent a first lens set of the transfer lens arrangement 303. The third pumping port (which may be referred to either as the H port or the H3 port) may be directly connected to Time of Flight mass analyser 304 vacuum chamber.

Figure 12B:
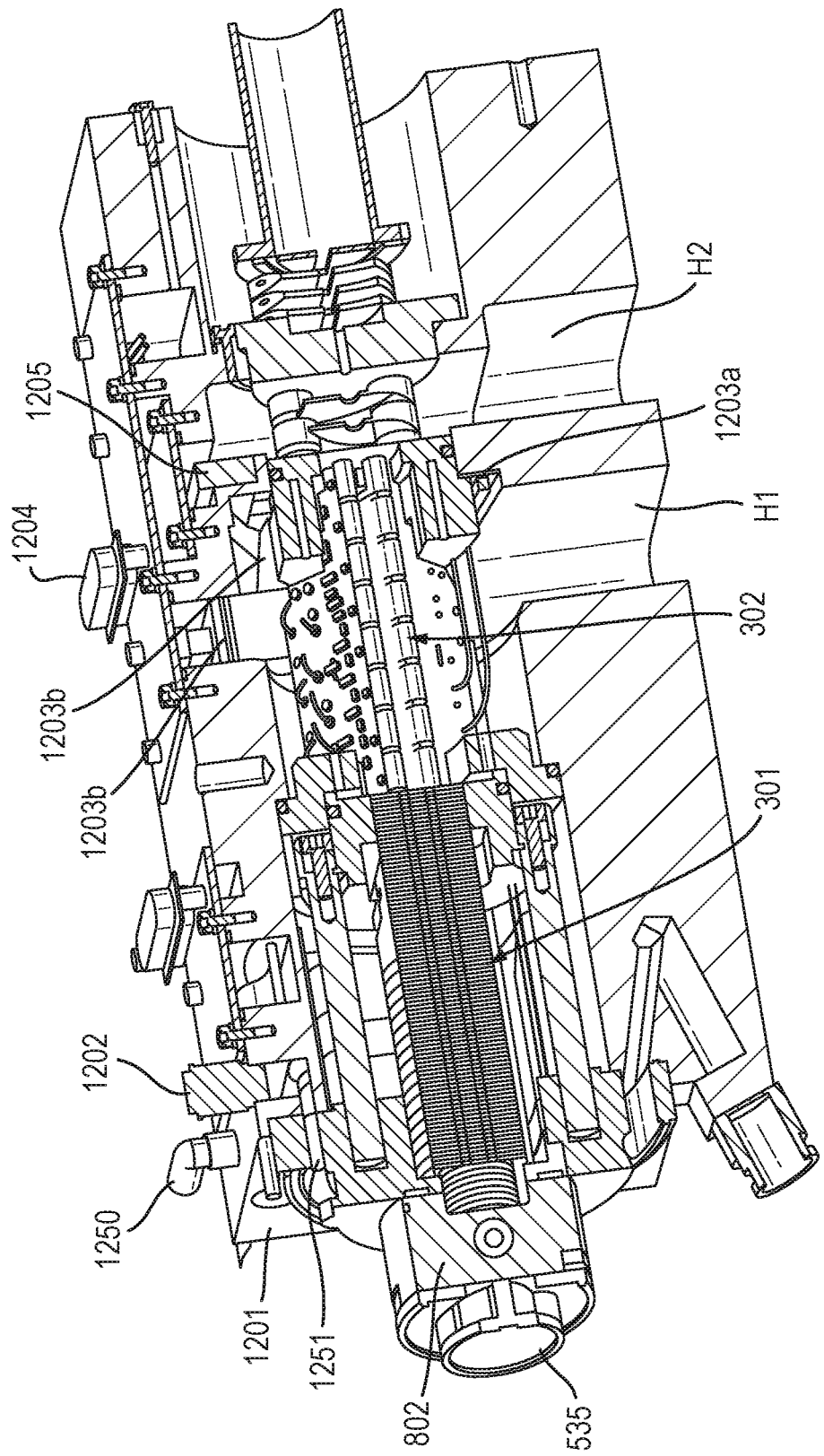

FIG. 12B shows from a different perspective the first pumping port H1 and the second pumping port H2. The user clamp 535 which is mounted in use to the ion block 802 is shown. The first ion guide 301 and the quadrupole rod set ion guide 302 are also indicated. A nebuliser or cone gas input 1201 is also shown. An access port 1251 is provided for measuring pressure in the source. A direct pressure sensor is provided (not fully shown) for measuring the pressure in the vacuum chamber housing the initial ion guide 301 and which is in fluid communication with the internal volume of the ion block 802. An elbow fitting 1250 and an over pressure relief valve 1202 are also shown.

One or more part-rigid and part-flexible printed circuit boards ("PCBs") may be provided. According to an embodiment a printed circuit board may be provided which comprises a rigid portion 1203a which is located at the exit of the quadrupole rod set region 302 and which is optionally at least partly arranged perpendicular to the optic axis or direction of ion travel through the quadrupole rod set 302. An upper or other portion of the printed circuit board may comprise a flexible portion 1203b so that the flexible portion 1203b of the printed circuit board has a stepped shape in side profile as shown in FIG. 12B.

According to various embodiments the H1 and H2 pumping ports may comprise EMC splinter shields.

It is also contemplated that the turbo pump may comprise dynamic EMC sealing of the H or H3 port. In particular, an EMC mesh may be provided on the H or H3 port.

Figure 13:
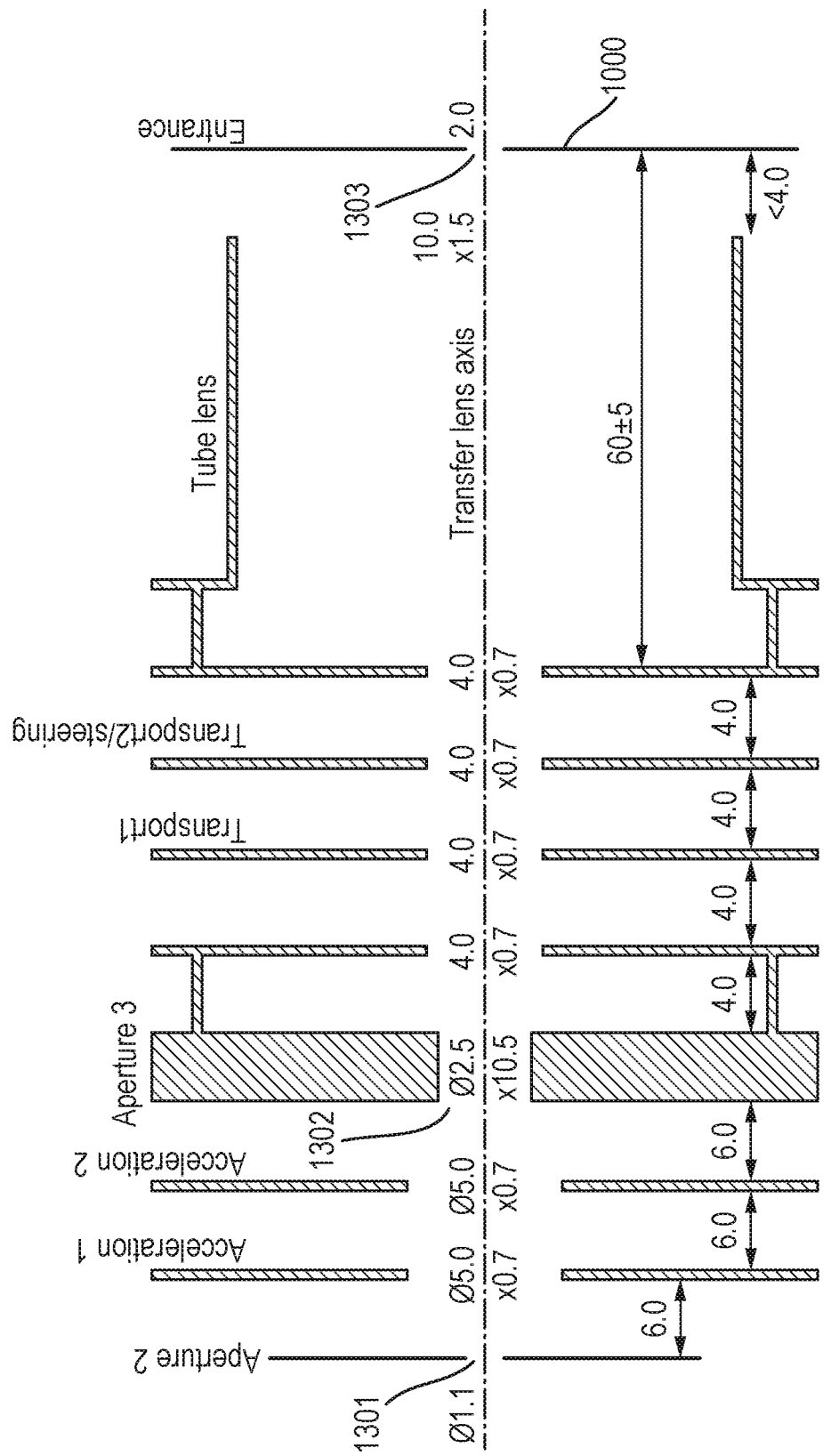
FIG. 13 shows in more detail a transfer lens arrangement.

FIG. 13 shows in more detail the transfer lens arrangement 303 and shows a second differential pumping aperture (Aperture #2) 1301 which separates the vacuum chamber housing the segmented quadrupole rod set 302 from first transfer optics which may comprise two acceleration electrodes. The relative spacing of the lens elements, their internal diameters and thicknesses according to an embodiment are shown. However, it should be understood that the relative spacing, size of apertures and thicknesses of the electrodes or lens elements may be varied from the specific values indicated in FIG. 13.

The region upstream of the second aperture (Aperture #2) 1301 may be in fluid communication with the first pumping port H1 of the turbo pump. A third differential pumping aperture (Aperture #3) 1302 may be provided between the first transfer optics and second transfer optics.

The region between the second aperture (Aperture #2) 1301 and the third aperture (Aperture #3) 1302 may be in fluid communication with the second pumping port H2 of the turbo pump.

The second transfer optics which is arranged downstream of the third aperture 1302 may comprises a lens arrangement comprising a first electrode which is electrical connection with the third aperture (Aperture #3) 1302. The lens arrangement may further comprise a second (transport) lens and a third (transport/steering) lens. Ions passing through the second transfer optics then pass through a tube lens before passing through an entrance aperture 1303. Ions passing through the entrance aperture 1303 pass through a slit or entrance plate 1000 into a pusher electrode assembly module.

The lens apertures after Aperture #3 1302 may comprise horizontal slots or plates. Transport 2/steering lens may comprise a pair of half plates.

The entrance plate 1000 may be arranged to be relatively easily removable by a service engineer for cleaning purposes.

One or more of the lens plates or electrodes which form a part of the overall transfer optics 303 may be manufactured by introducing an overcompensation etch of 5%. An additional post etch may also be performed. Conventional lens plates or electrodes may have a relatively sharp edge as a result of the manufacturing process. The sharp edges can cause electrical breakdown with conventional arrangements. Lens plates or electrodes which may be fabricated according to various embodiments using an overcompensation etching approach and/or additional post etch may have significantly reduced sharp edges which reduces the potential for electrical breakdown as well as reducing manufacturing cost.

Figure 14A:
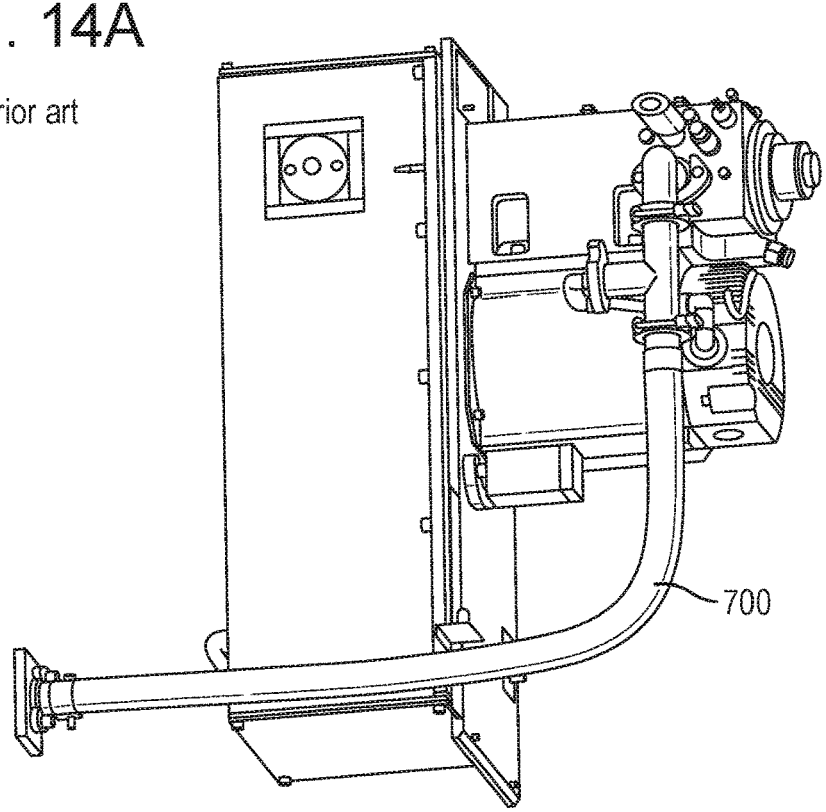
FIG. 14A shows details of a known internal vacuum configuration and FIG. 14B shows details of a new internal vacuum configuration according to various embodiments.
Figure 14B:
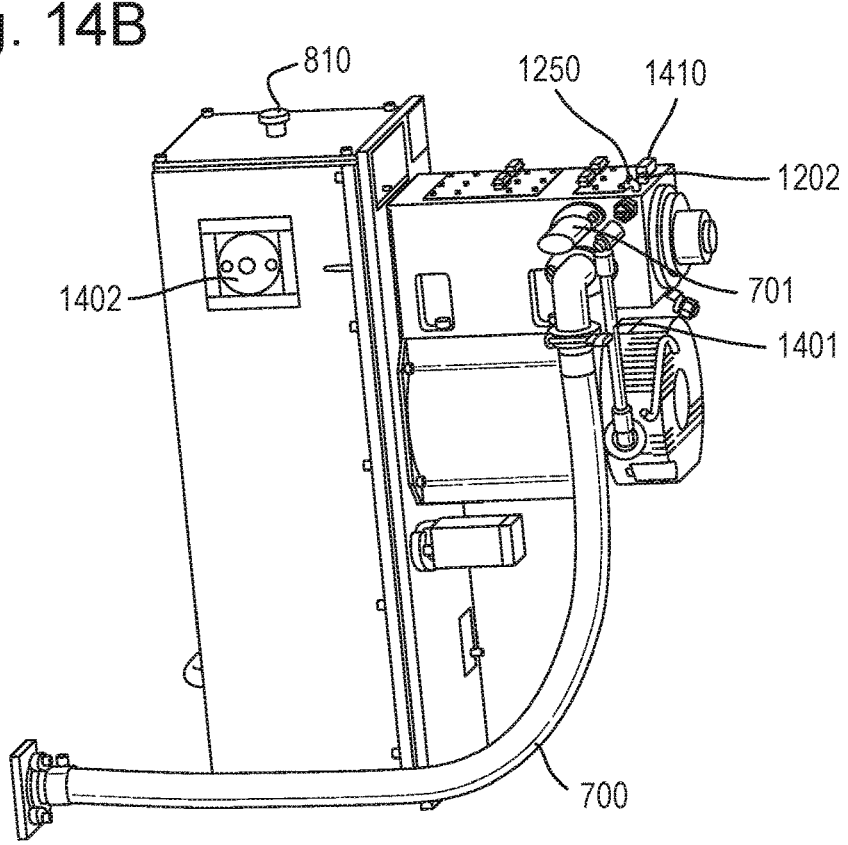

FIG. 14A shows details of a known internal vacuum configuration and FIG. 14B shows details of a new internal vacuum configuration according to various embodiments.

A conventional arrangement is shown in FIG. 14A wherein the connection 700 from the backing pump to the first vacuum chamber of a mass spectrometer makes a T-connection into the turbo pump when backing pressure is reached. However, this requires multiple components so that multiple separate potential leak points are established. Furthermore, the T-connection adds additional manufacturing and maintenance costs.

FIG. 14B shows an embodiment wherein the backing pump 700 is only directly connected to the first vacuum chamber i.e. the T-connection is removed. A separate connection 1401 is provided between the first vacuum chamber and the turbo pump.

A high voltage supply feed through 1402 is shown which provides a high voltage (e.g. 1.1 kV) to the pusher electrode module 305. An upper access panel 810 is also shown. A Pirani pressure gauge 701 is arranged to measure the vacuum pressure in the vacuum chamber housing the first ion guide 301. An elbow gas fitting 1250 is shown through which desolvation/cone gas may be supplied. With reference to FIG. 14B, behind the elbow gas fitting 1250 is shown the over pressure relief valve 1202 and behind the over pressure relief valve 1202 is shown a further elbow fitting which enables gas pressure from the source to be directly measured.

Figure 15A:
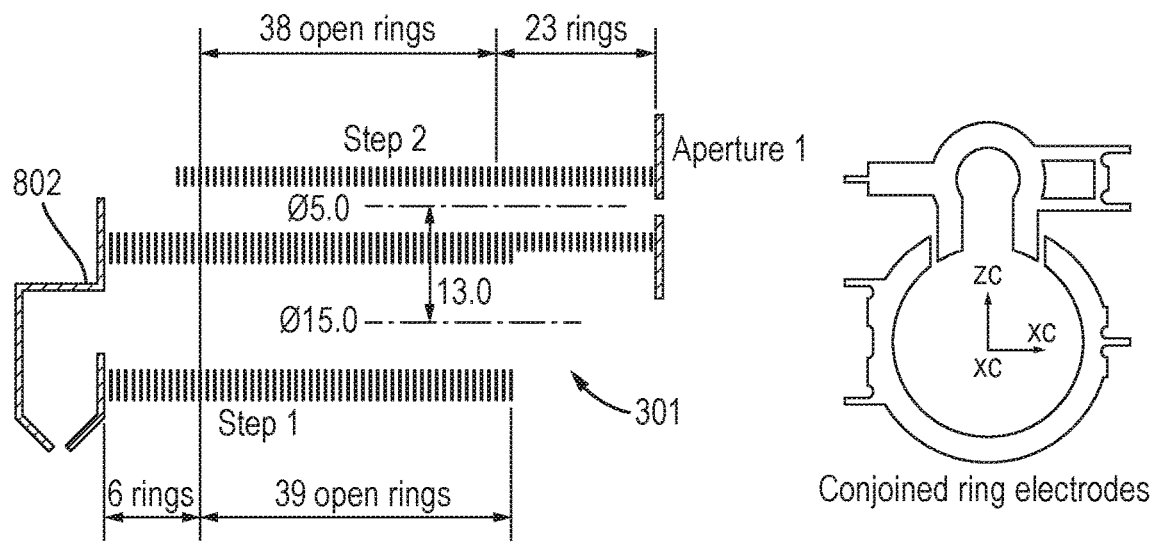
FIG. 15A shows a schematic of an arrangement of ring electrodes and conjoined ring electrodes forming a first ion guide which is arranged to separate charged ions from undesired neutral particles.

FIG. 15A shows a schematic of the ion block 802 and source or first ion guide 301. According to an embodiment the source or first ion guide 301 may comprise six initial ring electrodes followed by 38-39 open ring or conjoined electrodes. The source or first ion guide 301 may conclude with a further 23 rings. It will be appreciated, however, that the particular ion guide arrangement 301 shown in FIG. 15A may be varied in a number of different ways. In particular, the number of initial ring electrodes (e.g. 6) and/or the number of final stage (e.g. 23) ring electrodes may be varied. Similarly, the number of intermediate open ring or conjoined ring electrodes (e.g. 38-39) may also be varied.

It should be understood that the various dimensions illustrated on FIG. 15A are for illustrative purposes only and are not intended to be limiting. In particular, embodiments are contemplated wherein the sizing of ring and/or conjoined ring electrodes may be different from that shown in FIG. 15A.

A single conjoined ring electrode is also shown in FIG. 15A.

According to various embodiment the initial stage may comprise 0-5, 5-10, 10-15, 15-20, 20-25, 25-30, 30-35, 35-40, 40-45, 45-50 or >50 ring or other shaped electrodes. The intermediate stage may comprise 0-5, 5-10, 10-15, 15-20, 20-25, 25-30, 30-35, 35-40, 40-45, 45-50 or >50 open ring, conjoined ring or other shaped electrodes. The final stage may comprise 0-5, 5-10, 10-15, 15-20, 20-25, 25-30, 30-35, 35-40, 40-45, 45-50 or >50 ring or other shaped electrodes.

The ring electrodes and/or conjoined ring electrodes may have a thickness of 0.5 mm and a spacing of 1.0 mm. However, the electrodes may have other thicknesses and/or different spacings.

Aperture #1 plate may comprise a differential pumping aperture and may have a thickness of 0.5 mm and an orifice diameter of 1.50 mm. Again, these dimensions are illustrative and are not intended to be limiting.

A source or first ion guide RF voltage may be applied to all Step 1 and Step 2 electrodes in a manner as shown in FIG. 15A. The source or first ion guide RF voltage may comprise 200 V peak-to-peak at 1.0 MHz.

Embodiments are contemplated wherein a linear voltage ramp may be applied to Step 2 Offset (cone).

The Step 2 Offset (cone) voltage ramp duration may be made equal to the scan time and the ramp may start at the beginning of a scan. Initial and final values for the Step 2 Offset (cone) ramp may be specified over the complete range of Step 2 Offset (cone).

Figure 15B:
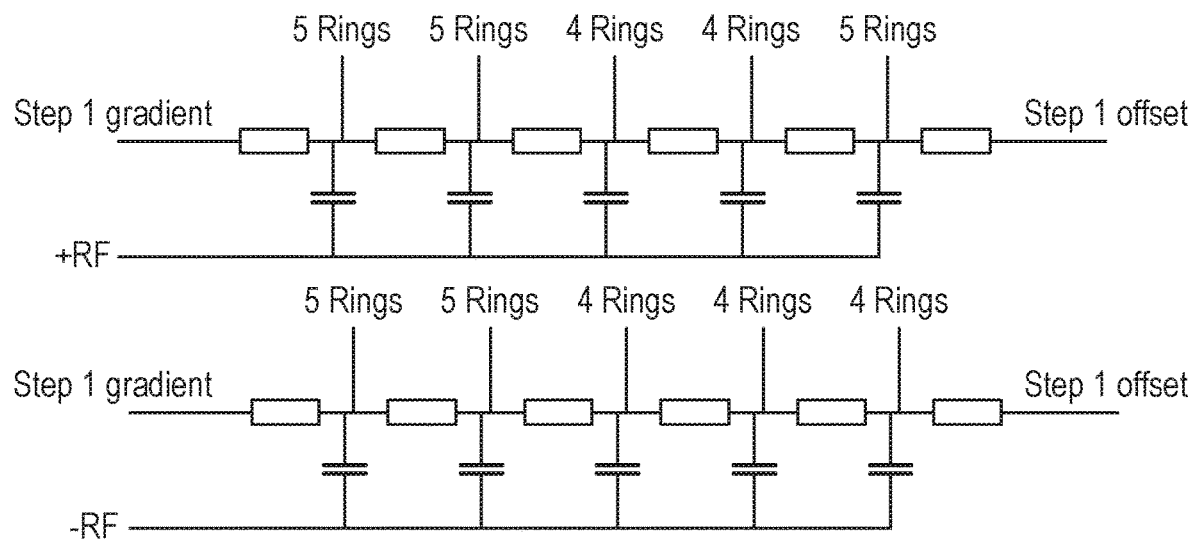

According to various embodiments a resistor chain as shown in FIG. 15B may be used to produce a linear axial field along the length of Step 1. Adjacent ring electrodes may have opposite phases of RF voltage applied to them.

A resistor chain may also be used to produce a linear axial field along the length of Step 2 as shown in FIG. 15C. Adjacent ring electrodes may have opposite phases of RF voltage applied to them.

Embodiments are contemplated wherein the RF voltage applied to some or substantially all the ring and conjoined ring electrodes forming the first ion guide 301 may be reduced or varied in order to perform a non-mass to charge ratio specific attenuation of the ion beam. For example, as will be appreciated, with a Time of Flight mass analyser 304 the ion detector 307 may suffer from saturation effects if an intense ion beam is received at the pusher electrode 305. Accordingly, the intensity of the ion beam arriving adjacent the pusher electrode 305 can be controlled by varying the RF voltage applied to the electrodes forming the first ion guide 301. Other embodiments are also contemplated wherein the RF voltage applied to the electrodes forming the second ion guide 302 may additionally and/or alternatively be reduced or varied in order to attenuate the ion beam or otherwise control the intensity of the ion beam. In particular, it is desired to control the intensity of the ion beam as received in the pusher electrode 305 region.

FIG. 16A shows in more detail the quadrupole ion guide 302 according to various embodiments. The quadrupole rods may have a diameter of 6.0 mm and may be arranged with an inscribed radius of 2.55 mm. Aperture #2 plate which may comprise a differential pumping aperture may have a thickness of 0.5 mm and an orifice diameter of 1.50 mm. The various dimensions shown in FIG. 16A are intended to be illustrative and non-limiting.

The ion guide RF amplitude applied to the rod electrodes may be controllable over a range from 0 to 800 V peak-to-peak.

The ion guide RF voltage may have a frequency of 1.4 MHz. The RF voltage may be ramped linearly from one value to another and then held at the second value until the end of a scan.

As shown in FIG. 16B, the voltage on the Aperture #2 plate may be pulsed in an Enhanced Duty Cycle mode operation from an Aperture 2 voltage to an Aperture 2 Trap voltage. The extract pulse width may be controllable over the range 1-25 μs. The pulse period may be controllable over the range 22-85 μs. The pusher delay may be controllable over the range 0-85 μs.

FIG. 16C shows in more detail the pusher electrode arrangement. The grid electrodes may comprise Ø 60 parallel wire with 92% transmission (Ø 0.018 mm parallel wires at 0.25 mm pitch). The dimensions shown are intended to be illustrative and non-limiting.

Figure 16D:
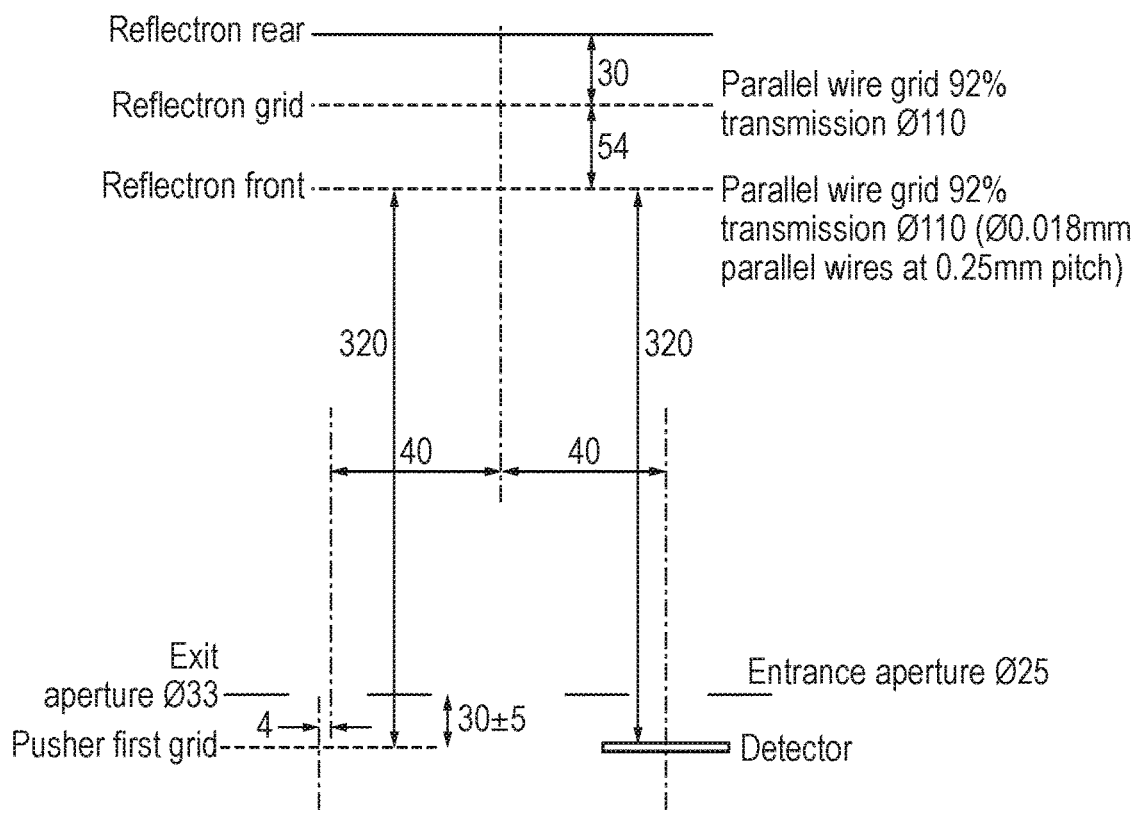
FIG. 16D illustrates in more detail the overall geometry of the Time of Flight mass analyser including the relative spacings of elements of the pusher electrode and associated electrodes, the reflectron grid electrodes and the ion detector.

FIG. 16D shows in more detail the Time of Flight geometry. The region between the pusher first grid, reflectron first grid and the detector grid preferably comprises a field free region. The position of the ion detector 307 may be defined by the ion impact surface in the case of a MagneTOF® ion detector or the surface of the front MCP in the case of a MCP detector.

The reflectron ring lenses may be 5 mm high with 1 mm spaces between them. The various dimensions shown in FIG. 16D are intended to be illustrative and non-limiting.

According to various embodiments the parallel wire grids may be aligned with their wires parallel to the instrument axis. It will be understood that the instrument axis runs through the source or first ion guide 301 through to the pusher electrode assembly 305.

A flight tube power supply may be provided which may have an operating output voltage of either +4.5 kV or −4.5 kV depending on the polarity requested.

A reflectron power supply may be provided which may have an operating output voltage ranging from 1625±100 V or −1625±100 V depending on the polarity requested.

Figure 16E:
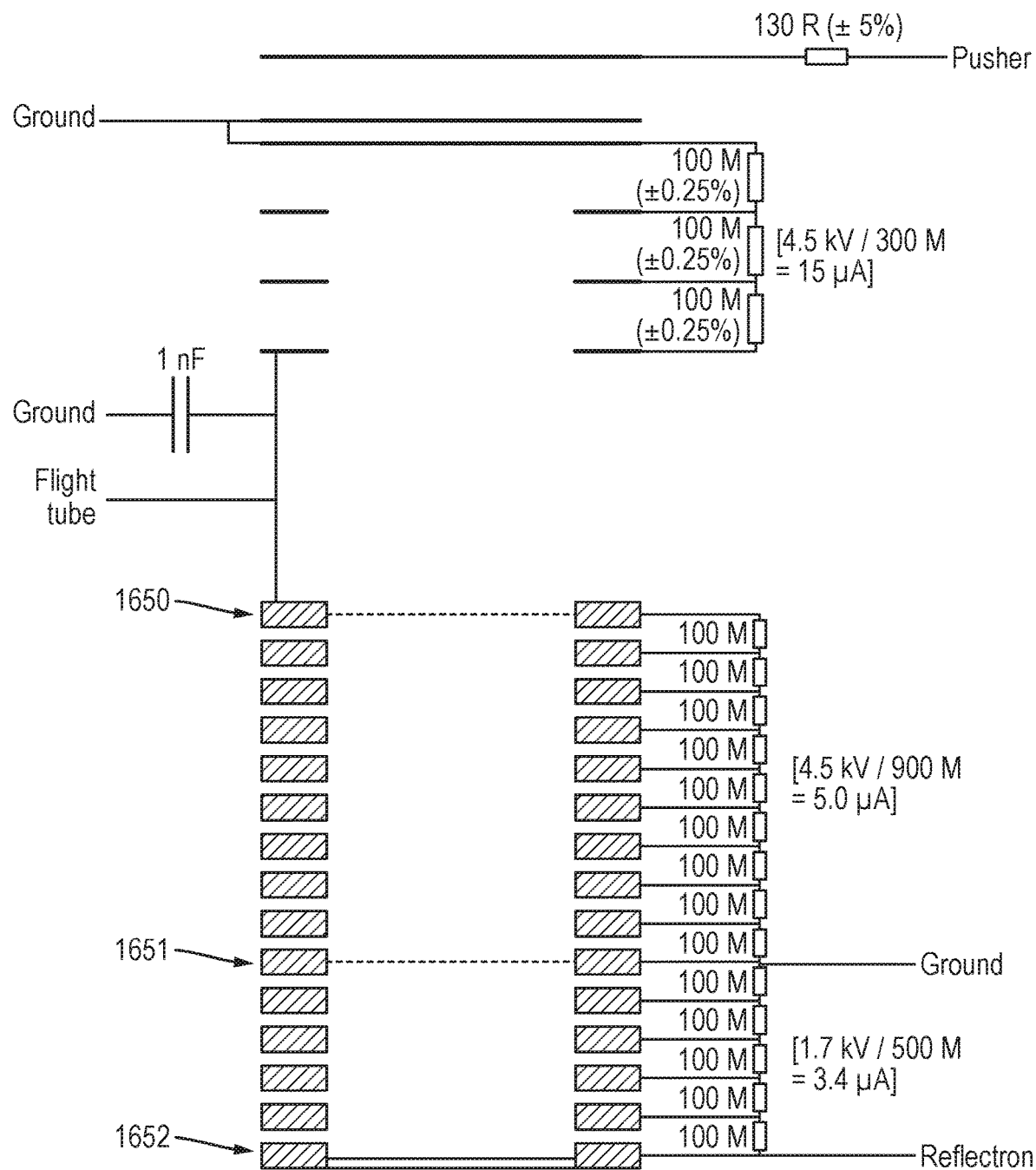
FIG. 16E is a schematic illustrating the wiring arrangement according to various embodiments of the pusher electrode and associated grid and ring electrodes and the grid and ring electrodes forming the reflectron.

FIG. 16E is a schematic of the Time of Flight wiring according to an embodiment. The various resistor values, voltages, currents and capacitances are intended to be illustrative and non-limiting.

According to various embodiments a linear voltage gradient may be maintained along the length of the reflectron 306. In a particular embodiment a reflectron clamp plate may be maintained at the reflectron voltage.

An initial electrode and associated grid 1650 of the reflectron 306 may be maintained at the same voltage or potential as the flight tube 807 and the last electrode of the pusher electrode assembly 305. According to an embodiment the initial electrode and associated grid 1650 of the reflectron 306, the flight tube 807 and the last electrode and associated grid of the pusher electrode assembly 305 may be maintained at a voltage or potential of e.g. 4.5 kV of opposite polarity to the instrument or mode of operation. For example, in positive ion mode the initial electrode and associated grid 1650 of the reflectron 306, the flight tube 807 and the last electrode and associated grid of the pusher electrode assembly 305 may be maintained at a voltage or potential of −4.5 kV.

The second grid electrode 1651 of the reflectron 306 may be maintained at ground or 0V.

The final electrode 1652 of the reflectron 306 may be maintained at a voltage or potential of 1.725 kV of the same polarity as the instrument. For example, in positive ion mode the final electrode 1652 of the reflectron 306 may be maintained at a voltage or potential of +1.725 kV.

It will be understood by those skilled in the art that the reflectron 306 acts to decelerate ions arriving from the time of flight region and to redirect the ions back out of the reflectron 306 in the direction of the ion detector 307.

The voltages and potentials applied to the reflectron 306 according to various embodiments and maintaining the second grid electrode 1651 of the reflectron at ground or 0V is different from the approach adopted in conventional reflectron arrangements.

The ion detector 307 may always be maintained at a positive voltage relative to the flight tube voltage or potential. According to an embodiment the ion detector 307 may be maintained at a +4 kV voltage relative to the flight tube.

Accordingly, in a positive ion mode of operation if the flight tube is maintained at an absolute potential or voltage of −4.5 kV then the detector may be maintained at an absolute potential or voltage of −0.5 kV.

FIG. 16F shows the DC lens supplies according to an embodiment. It will be understood that Same polarity means the same as instrument polarity and that Opposite polarity means opposite to instrument polarity. Positive means becomes more positive as the control value is increased and Negative means becomes more negative as the control value is increased. The particular values shown in FIG. 16F are intended to be illustrative and non-limiting.

Figure 16G:
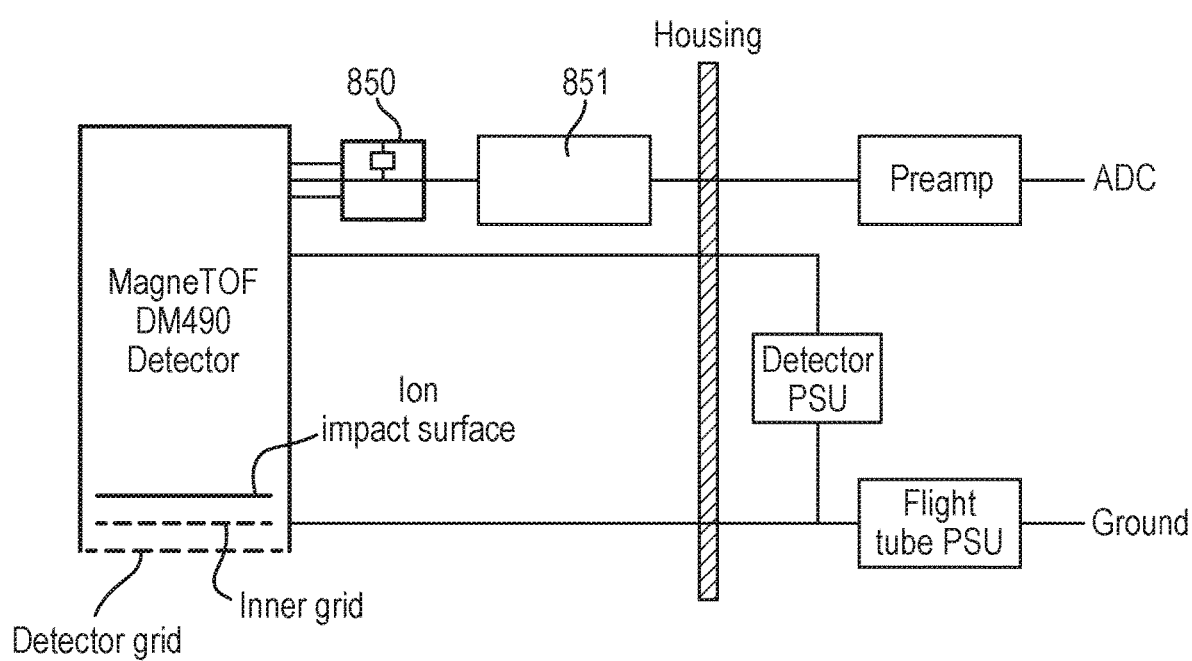
FIG. 16G is a schematic of an ion detector arrangement according to various embodiments and which shows various connections to the ion detector which are located both within and external to the Time of Flight housing and FIG. 16H shows an illustrative potential energy diagram.

FIG. 16G shows a schematic of an ion detector arrangement according to various embodiments. The detector grid may form part of the ion detector 307. The ion detector 307 may, for example, comprise a MagneTOF® DM490 ion detector. The inner grid electrode may be held at a voltage of +1320 V with respect to the detector grid and flight tube via a series of zener diodes and resistors. The ion detector 307 may be connected to a SMA 850 and an AC coupler 851 which may both be provided within or internal to the mass analyser housing or within the mass analyser vacuum chamber. The AC coupler 851 may be connected to an externally located preamp which in turn may be connected to an Analogue to Digital Converter ("ADC") module.

Figure 16H:
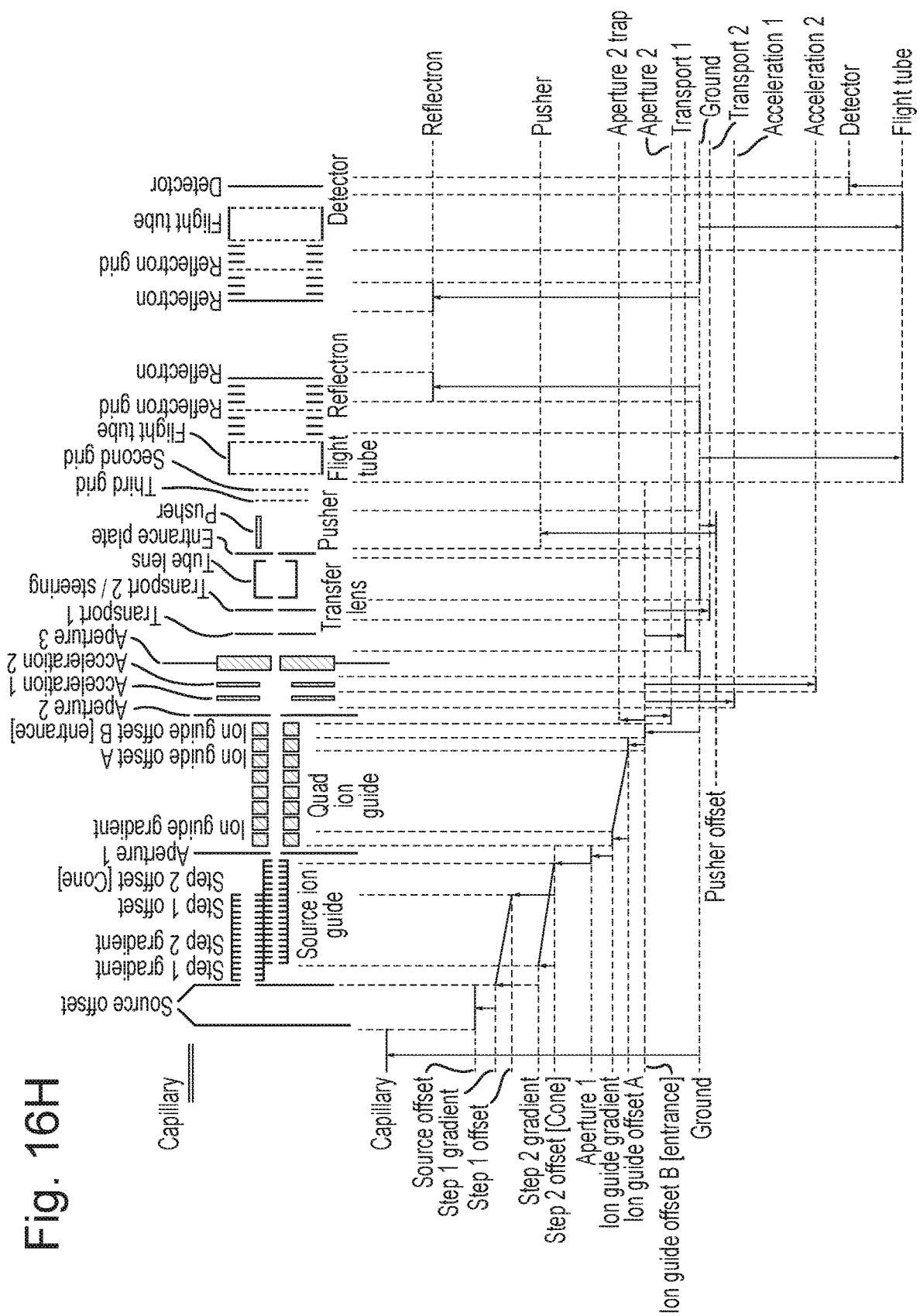

FIG. 16H shows a potential energy diagram for an instrument according to various embodiments. The potential energy diagram represents an instrument in positive ion mode. In negative ion mode all the polarities are reversed except for the detector polarity. The particular voltages/potentials shown in FIG. 16H are intended to be illustrative and non-limiting.

The instrument may include an Analogue to Digital Converter ("ADC") which may be operated in peak detecting ADC mode with fixed peak detecting filter coefficients. The ADC may also be run in a Time to Digital Converter ("TDC") mode of operation wherein all detected ions are assigned unit intensity. The acquisition system may support a scan rate of up to 20 spectra per second. A scan period may range from 40 ms to 1 s. The acquisition system may support a maximum input event rate of $7 \times 10^6$ events per second.

According to various embodiments the instrument may have a mass accuracy of 2-5 ppm may have a chromatographic dynamic range of $10^4$. The instrument may have a high mass resolution with a resolution in the range 10000-15000 for peptide mapping. The mass spectrometer 100 is preferably able to mass analyse intact proteins, glycoforms and lysine variants. The instrument may have a mass to charge ratio range of approx. 8000.

Instrument testing was performed with the instrument fitted with an ESI source 401. Sample was infused at a flow rate of 400 mL/min. Mass range was set to m/z 1000. The instrument was operated in positive ion mode and high resolution mass spectral data was obtained.

According to various embodiments the instrument may have a single analyser tune mode i.e. no sensitivity and resolution modes.

According to various embodiments the resolution of the instrument may be in the range 10000-15000 for high mass or mass to charge ratio ions such as peptide mapping applications. The resolution may be determined by measuring on any singly charged ion having a mass to charge ratio in the range 550-650.

The resolution of the instrument may be around 5500 for low mass ions. The resolution of instrument for low mass ions may be determined by measuring on any singly charged ion having a mass to charge ratio in the range 120-150.

According to various embodiments the instrument may have a sensitivity in MS positive ion mode of approx. 11,000 counts/second. The mass spectrometer 100 may have a mass accuracy of approx. 2-5 ppm Mass spectral data obtained according to various embodiments was observed as having reduced in-source fragmentation compared with conventional instruments. Adducts are reduced compared with conventional instruments. The mass spectral data also has cleaner valleys (<20%) for mAb glycoforms.

As disclosed in US 2015/0076338 (Micromass), the contents of which are incorporated herein by reference, the instrument according to various embodiment may comprise a plurality of discrete functional modules. The functional modules may comprise, for example, electrical, mechanical, electromechanical or software components. The modules may be individually addressable and may be connected in a network. A scheduler may be arranged to introduce discrete packets of instructions to the network at predetermined times in order to instruct one or more modules to perform various operations. A clock may be associated with the scheduler.

The functional modules may be networked together in a hierarchy such that the highest tier comprises the most time-critical functional modules and the lowest tier comprises functional modules which are the least time time-critical. The scheduler may be connected to the network at the highest tier.

For example, the highest tier may comprise functional modules such as a vacuum control system, a lens control system, a quadrupole control system, an electrospray module, a Time of Flight module and an ion guide module. The lowest tier may comprise functional modules such as power supplies, vacuum pumps and user displays.

The mass spectrometer 100 according to various embodiments may comprise multiple electronics modules for controlling the various elements of the spectrometer. As such, the mass spectrometer may comprise a plurality of discrete functional modules, each operable to perform a predetermined function of the mass spectrometer 100, wherein the functional modules are individually addressable and connected in a network and further comprising a scheduler operable to introduce discrete packets of instructions to the network at predetermined times in order to instruct at least one functional module to perform a predetermined operation.

The mass spectrometer 100 may comprise an electronics module for controlling (and for supplying appropriate voltage to) one or more or each of: (i) the source; (ii) the first ion guide; (iii) the quadrupole ion guide; (iv) the transfer optics; (v) the pusher electrode; (vi) the reflectron; and (vii) the ion detector.

This modular arrangement may allow the mass spectrometer to be reconfigured straightforwardly. For example, one or more different functional elements of the spectrometer may be removed, introduced or changed, and the spectrometer may be configured to automatically recognise which elements are present and to configure itself appropriately.

The instrument may allow for a schedule of packets to be sent onto the network at specific times and intervals during an acquisition. This reduces or alleviates the need for a host computer system with a real time operating system to control aspects of the data acquisition. The use of packets of information sent to individual functional modules also reduces the processing requirements of a host computer.

The modular nature conveniently allows flexibility in the design and/or reconfiguring of a mass spectrometer. According to various embodiments at least some of the functional modules may be common across a range of mass spectrometers and may be integrated into a design with minimal reconfiguration of other modules. Accordingly, when designing a new mass spectrometer, wholesale redesign of all the components and a bespoke control system are not necessary. A mass spectrometer may be assembled by connecting together a plurality of discrete functional modules in a network with a scheduler.

Furthermore, the modular nature of the mass spectrometer 100 according to various embodiments allows for a defective functional module to be replaced easily. A new functional module may simply be connected to the interface. Alternatively, if the control module is physically connected to or integral with the functional module, both can be replaced.

FIG. 17 shows a more detailed schematic of a mass spectrometer 100 according to various embodiments showing an ion source 300, a first ion guide 301, a second ion guide 302, one or more transfer lenses 303, and a mass analyser 304, for example as discussed above.

The mass analyser 304 may comprise a TOF mass analyser having a pusher (acceleration) electrode 305, a reflectron 306, and an ion detector 307, for example as discussed above.

The mass analyser 304 may also comprise a pre-amplifier 1709 for amplifying the detected ion signal and an ADC 1710 for digitising the (amplified) detected ion signal.

The mass spectrometer 100 may further comprise a fluidics system 1711, for example as discussed above, a front panel display system 1712, for example as discussed above, a power supply unit (PSU) 1713 for supplying power to the various devices of the mass spectrometer 100, and an embedded PC (EPC) 1714.

The mass spectrometer 100 may further comprise a system control module 1715 comprising processing circuitry for controlling various functional modules of the mass spectrometer 100. The functional modules can include electrical, mechanical, electromechanical and/or software components, for example as discussed above. The functional modules of the mass spectrometer 100 may be controlled via a packet based "Typhoon" control system, which will be described in more detail below.

For example, the (global) system control module 1715 may control the operation of the ion source 300, the first ion guide 301, the second ion guide 302, the one or more transfer lenses 303, the pusher electrode 305, the reflectron 306, the ion detector 307, the pre-amplifier 1709, and the ADC 1710. For example, the system control module 1715 may issue control instructions, for example in data packets, to various local control circuitry modules of the mass spectrometer 100, such as a high voltage supply module 1716 for the ion source 300, a first local voltage supply module 1717 for the first ion guide 301, and a second local voltage supply module 1718 for both the second ion guide 302 and the one or more transfer lenses 303.

The various AC or RF and/or DC voltages required by the first ion guide 301 may, for example, be provided from one or more AC or RF and/or DC voltage supplies housed within the first local voltage supply module 1717. Those voltages may be provided to the electrodes of the first ion guide 301 via a first vacuum interface PCB 1719 and one or more first internal PCBs 1721. The first vacuum interface PCB 1719 may comprise a rigid PCB to maintain the vacuum within the ion guide housing. The one or more first internal PCBs 1721 may comprise one or more rigid PCBs or PCB portions and/or may comprise one or more flexible PCBs or PCB portions to facilitate connection between the first vacuum interface PCB 1719 and the first ion guide 301 within the relatively confined space of a first vacuum chamber.

Furthermore, the various AC or RF and/or DC voltages required by the second ion guide 302 may be provided from one or more AC or RF and/or DC voltage supplies housed within the second local voltage supply module 1718. Those voltages may be provided to the electrodes of the second ion guide 302 via a second vacuum interface PCB 1720 and one or more second internal PCBs 1722. The second vacuum interface PCB 1720 may again comprise a rigid PCB to maintain the vacuum within the ion guide housing. The one or more second internal PCBs 1722 may again comprise one or more rigid PCBs or PCB portions and/or may comprise one or more flexible PCBs or PCB portions to facilitate connection between the second vacuum interface PCB 1720 and the second ion guide 302 within the relatively confined space of a second vacuum chamber.

Similarly, the various AC or RF and/or DC voltages required by the one or more transfer lenses 303 may be provided from the one or more AC or RF and/or DC voltage supplies housed within the second local voltage supply module 1718. Those voltages may be provided to the one or more transfer lenses 303 via the second vacuum interface PCB 1720 and one or more third internal PCBs 1723. The one or more third internal PCBs 1723 may again comprise one or more rigid PCBs or PCB portions and/or may comprise one or more flexible PCBs or PCB portions to facilitate connection between the second vacuum interface PCB 1720 and the one or more transfer lenses 303 within the relatively confined space of a third vacuum chamber.

In addition, the system control module 1715 may control the operation of other functional modules of the mass spectrometer 100. One or more of these functional modules of the mass spectrometer 100 may be controlled via a Universal Peripheral Analogue Interface (UPAI), which will be described in more detail below. These other functional modules may be referred to herein as "peripheral" functional modules.

Figure 18:
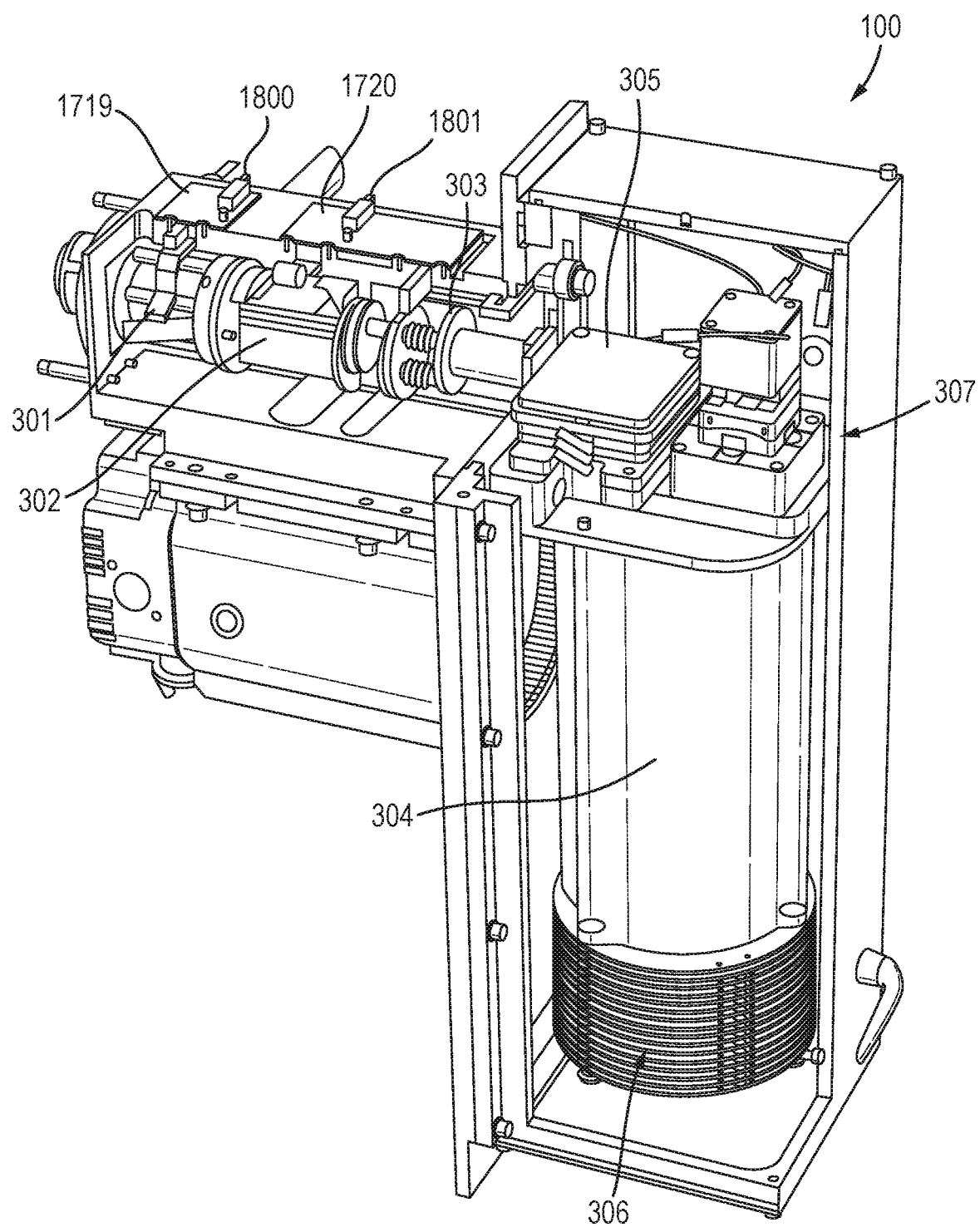
FIG. 18 shows a cutaway perspective view of a mass spectrometer according to various embodiments.

FIG. 18 again shows a cutaway perspective view of a mass spectrometer 100 according to various embodiments highlighting certain features. FIG. 18 shows the first ion guide 301, the second ion guide 302, the one or more transfer lenses 303, and the mass analyser 304, for example as discussed above.

The mass analyser 304 may again comprise a TOF mass analyser having a pusher electrode 305, a reflectron 306, and an ion detector 307, for example as discussed above.

FIG. 18 also shows the first vacuum interface PCB 1719 for the first ion guide 301 and the second vacuum interface PCB 1720 for the second ion guide 302 and one or more transfer lenses 303.

As is shown in FIG. 18, the first vacuum interface PCB 1719 may have one or more first connectors 1800 for directly physically and electrically connecting the first vacuum interface PCB 1719 to one or more corresponding connectors on the first local voltage supply module 1717 (not shown in FIG. 18). This direct connection between the first vacuum interface PCB 1719 and the first local voltage supply module 1717 can help to reduce the voltage propagation distance, and therefore help to reduce or avoid undesirable variability in the various AC or RF and/or DC voltages required by the first ion guide 301, which might otherwise be introduced by a long cable between the first ion guide 301 and the AC or RF and/or DC voltage sources within the first local voltage supply module 1717.

Similarly, the second vacuum interface PCB 1720 may have one or more second connectors 1801 for directly physically and electrically connecting the second vacuum interface PCB 1720 to one or more corresponding connectors on the second local voltage supply module 1718 (again not shown in FIG. 18). Again, this direct connection between the second vacuum interface PCB 1720 and the second local voltage supply module 1718 can help to reduce the voltage propagation distance, and therefore help to reduce or avoid undesirable variability in the various AC or RF and/or DC voltages required by the second ion guide 302 and one or more transfer lenses 303 which might otherwise be introduced by a long cable between the second ion guide 302 and one or more transfer lenses 303, on the one hand, and the AC or RF and/or DC voltage sources within the second local voltage supply module 1718, on the other hand.

Figure 19A:
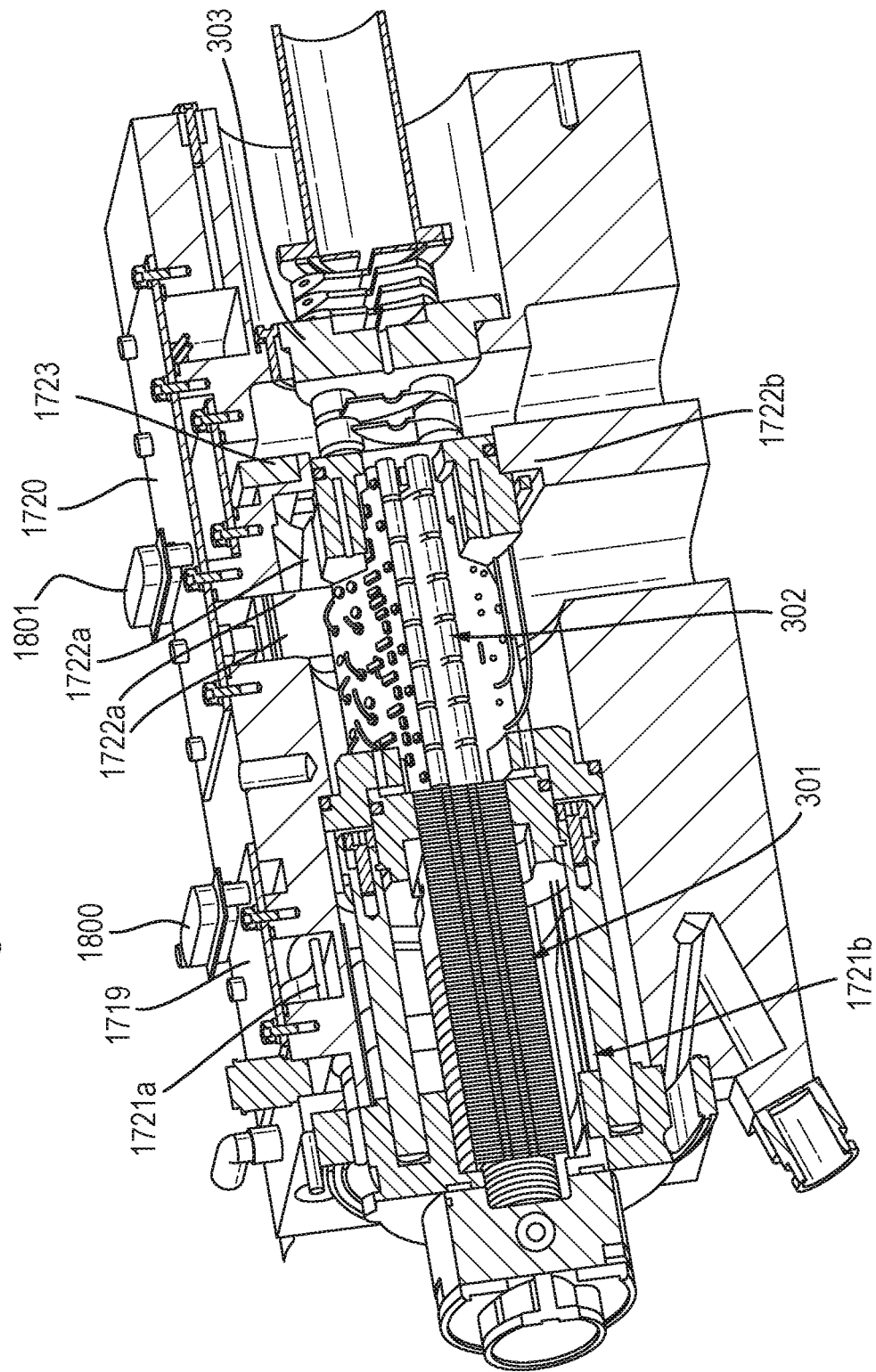
FIGS. 19A and 19B show closer cross-sectional views of a mass spectrometer according to various embodiments.
Figure 19B:
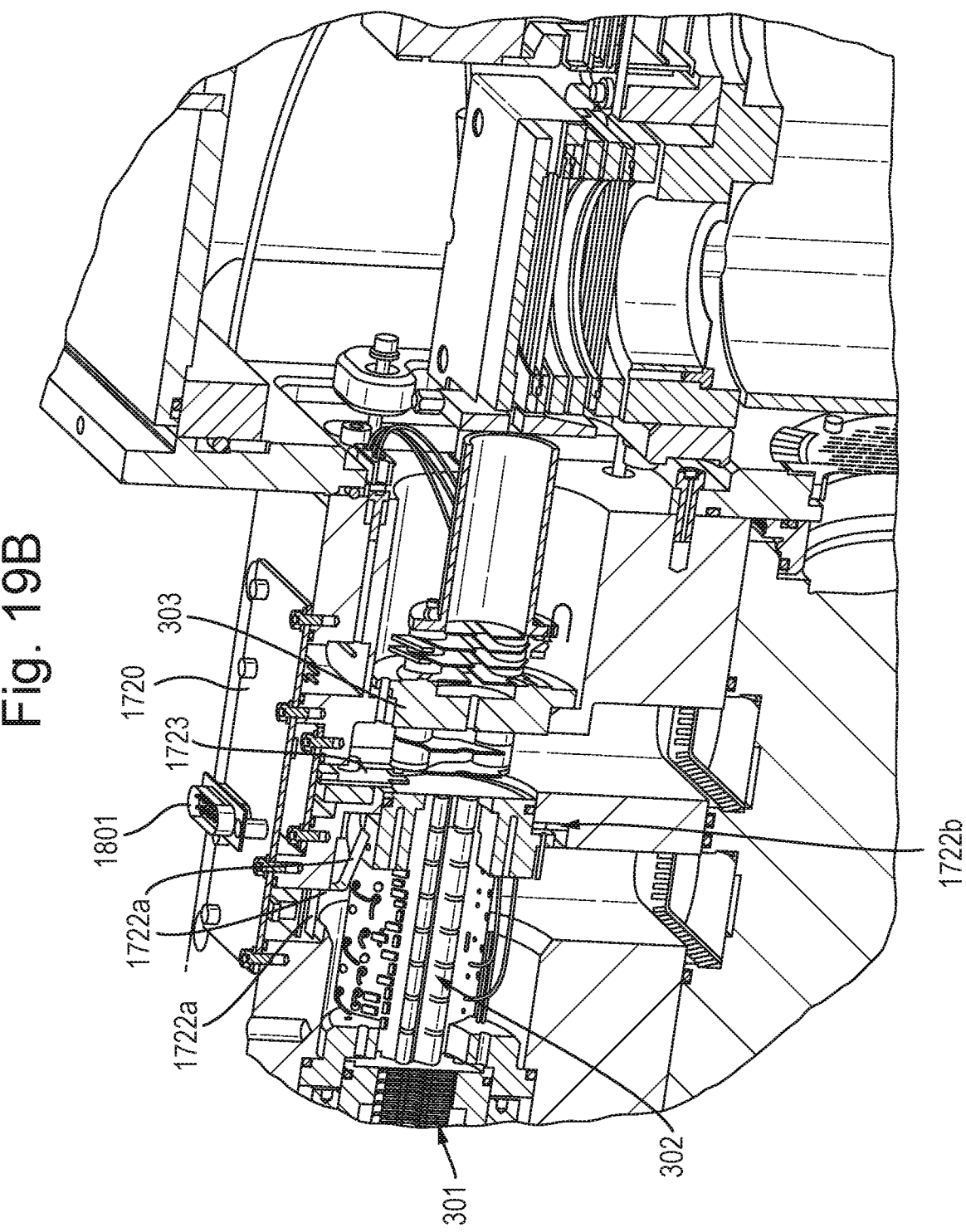

FIGS. 19A and 19B show closer cross-sectional views of a mass spectrometer 100 according to various embodiments. FIGS. 19A and 19B show the first ion guide 301, the second ion guide 302, and the one or more transfer lenses 303, for example as described above.

FIG. 19A also shows the first vacuum interface PCB 1719 having one or more first connectors 1800. FIG. 19A also shows the location of the flexible PCB portion 1721a and rigid PCB portion 1721b of the one or more first internal PCBs 1721 for the first ion guide 301. As discussed above, the flexible PCB portion 1721a can facilitate connection between the first vacuum interface PCB 1719 and the first ion guide 301 within the relatively confined space of the first vacuum chamber.

FIGS. 19A and 19B also show the second vacuum interface PCB 1720 having one or more second connectors 1801. FIGS. 19A and 19B also show the location of the flexible PCB portion 1722a and rigid PCB portion 1722b of the one or more second internal PCBs 1722 for the second ion guide 302. As discussed above, the flexible PCB portion 1722a can facilitate connection between the second vacuum interface PCB 1720 and the second ion guide 302 within the relatively confined space of the second vacuum chamber. Indeed, as is shown in FIGS. 19A and 19B, in this embodiment, the flexible PCB portion 1722a is flexed so as to have a stepped profile (the first "tread", the "riser", and the second "tread" of the stepped profile are shown with respective arrows).

FIGS. 19A and 19B also show the location of the third internal PCB 1722 for the one or more transfer lenses 303. As is shown, the one or more transfer lenses 303 span the third (e.g. ion transfer) vacuum chamber and a fourth (e.g. mass analyser) vacuum chamber. However, as is shown, the third internal PCB 1722 is provided in the third (e.g. ion transfer) vacuum chamber, rather than the fourth (e.g. mass analyser) vacuum chamber. This can help to reduce or avoid the need to run one or more wires back from the fourth vacuum chamber to one or more transfer lens in the third vacuum chamber. This in turn can help to reduce or avoid the one or more AC or RF and/or DC voltages provided to the one or more transfer lens in the third vacuum chamber interfering with the operation of the mass analyser.

Figure 20:
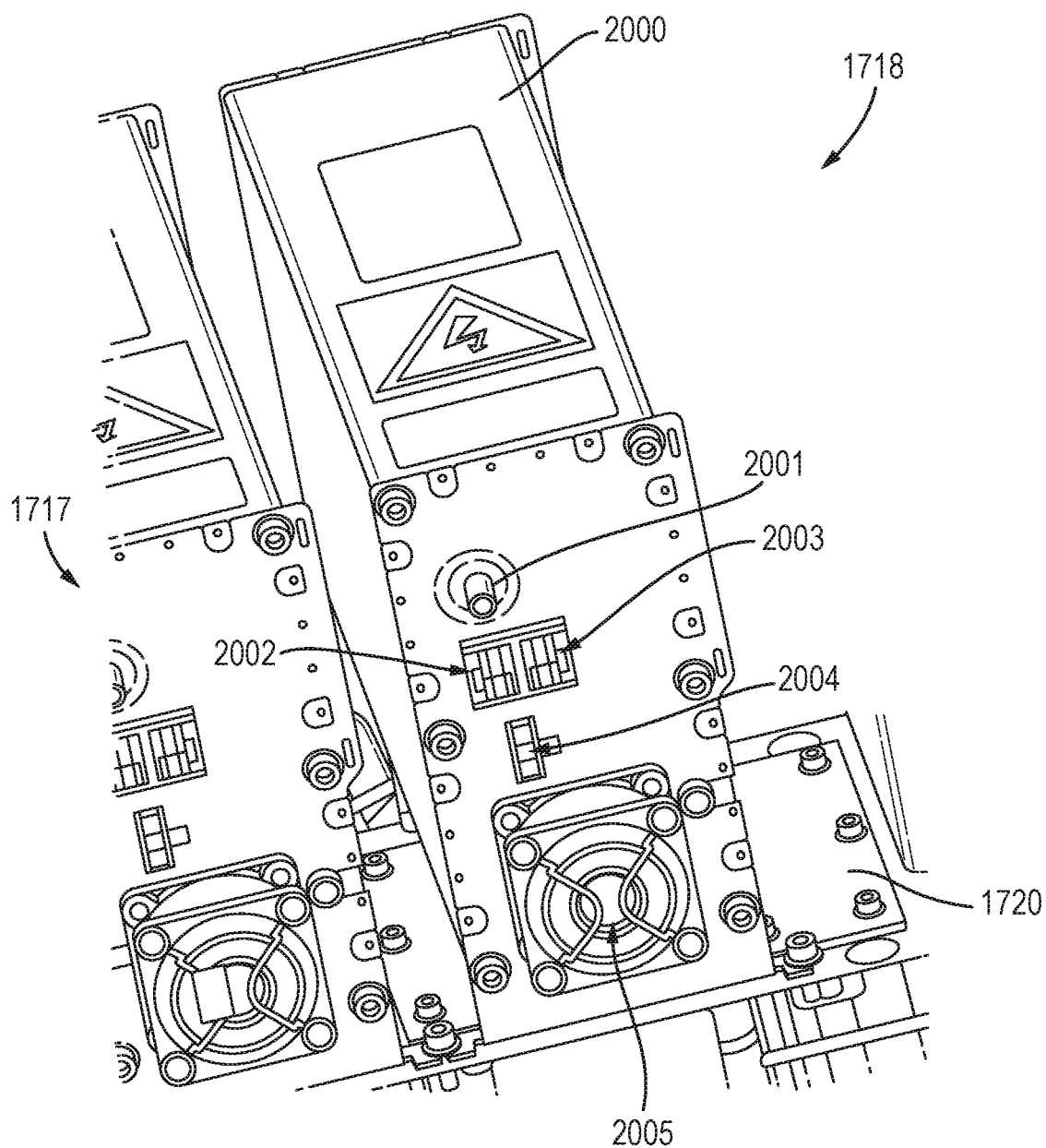
FIG. 20 shows a closer perspective view of a local voltage supply housing for an ion guide of a mass spectrometer according to various embodiments.

FIG. 20 shows a closer perspective view of the first local voltage supply module 1717 for the first ion guide 301 and the second local voltage supply module 1718 for the second ion guide 302.

In this embodiment, the second local voltage supply module 1718 comprises a housing 2000. The second local voltage supply module 1718 may further comprise a synchronisation connection 2001 for receiving a synchronisation signal from the system control module 1715. The second local voltage supply module 1718 may also comprise a first "TSL" connection 2002 for communication with the system control module 1715 and a second "TSL" connection 2003 for communication with one or more further functional modules, if desired for the particular mass spectrometer configuration. The second local voltage supply module 1718 may also comprise a power connection 2004 for providing power to the various AC or RF and/or DC voltage sources and/or processing circuitry of the module 1718 and a cooling fan 2005 for cooling the various AC or RF and/or DC voltage sources and/or processing circuitry of the module 1718.

As is also shown in FIG. 20, the second local voltage supply module 1718 may be directly physically and electrically mounted to the second vacuum interface PCB 1720. As discussed above, direct mounting of the second local voltage supply module 1718 on the second vacuum interface PCB 1720 can help to reduce the voltage propagation distance, and therefore help to reduce or avoid undesirable variability in the various AC or RF and/or DC voltages required by the second ion guide 302 and one or more transfer lenses 303 which might otherwise be introduced by a long cable between the AC or RF and/or DC voltage sources on the one hand and on the other hand the second ion guide 302 and one or more transfer lenses 303.

Although the features of the second local voltage supply module 1718 has been described above, it will be appreciated that similar features may be present in the first local voltage supply module 1717 and/or in other local (e.g. voltage) control modules of the mass spectrometer 100.

Figure 21A:
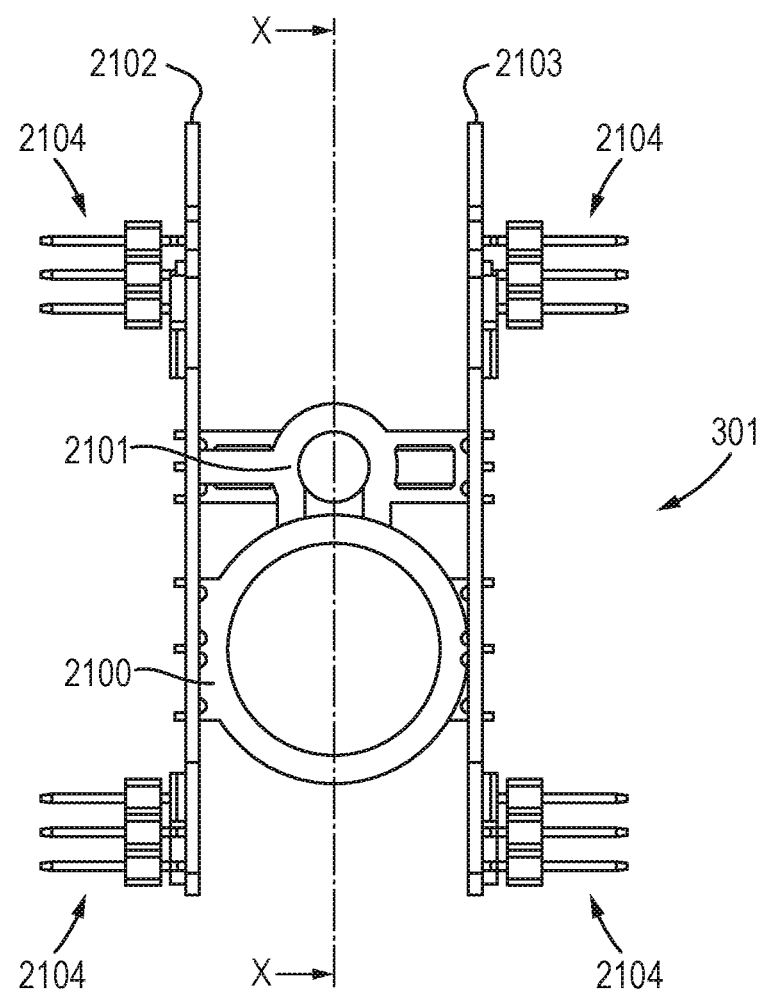
FIG. 21A shows an end view of an ion guide of a mass spectrometer according to various embodiments.
Figure 21B:
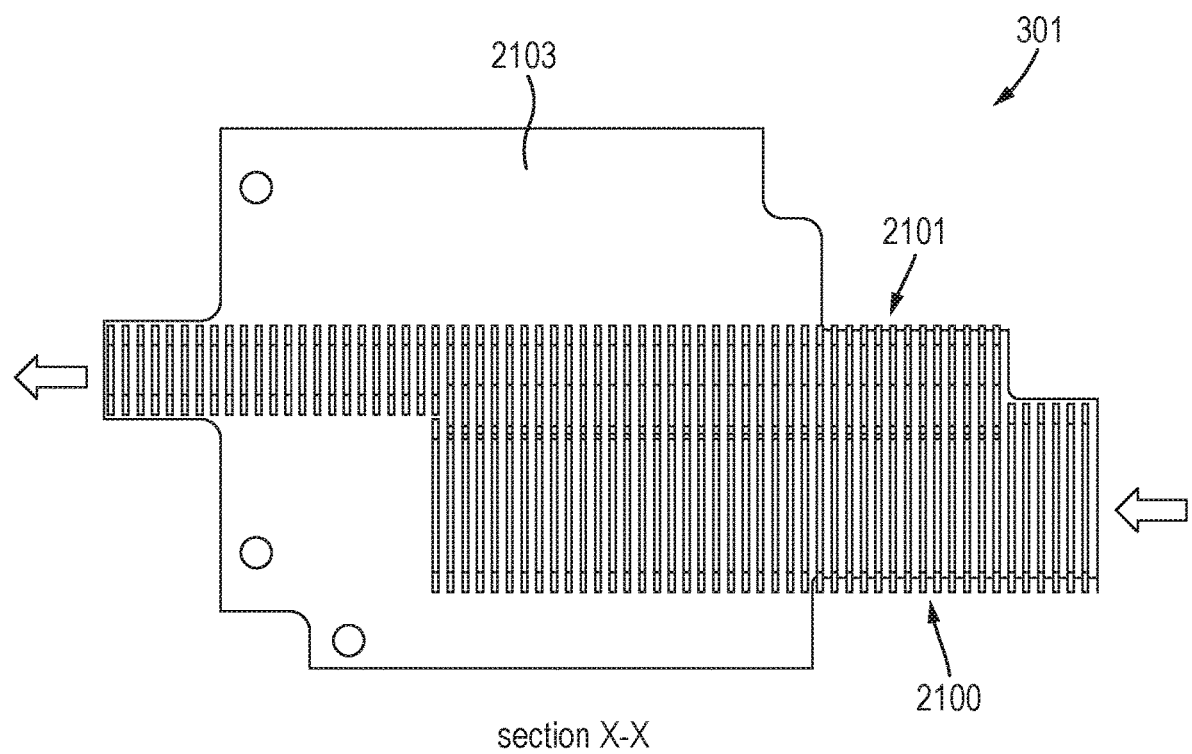
FIG. 21B shows a cross-sectional view of the ion guide taken along the line X-X as indicated in FIG. 21A, and FIGS. 21C and 21D show perspective views of the ion guide.
Figure 21C:
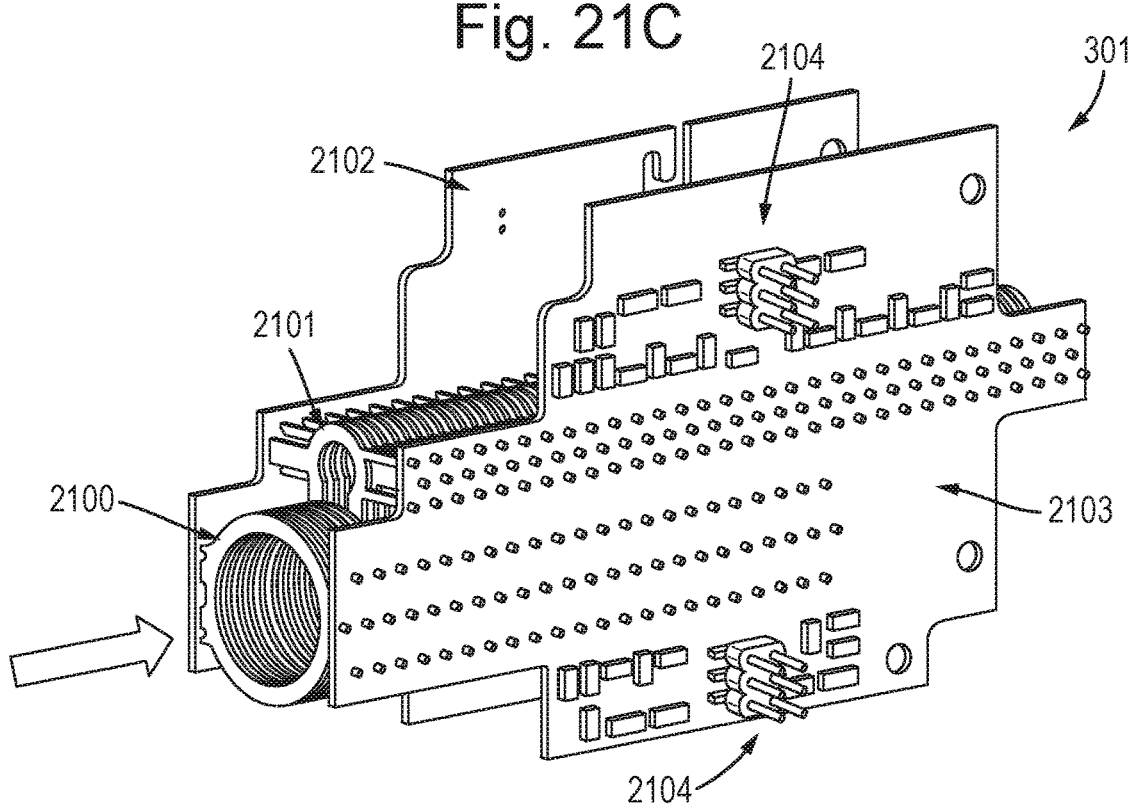
Figure 21D:
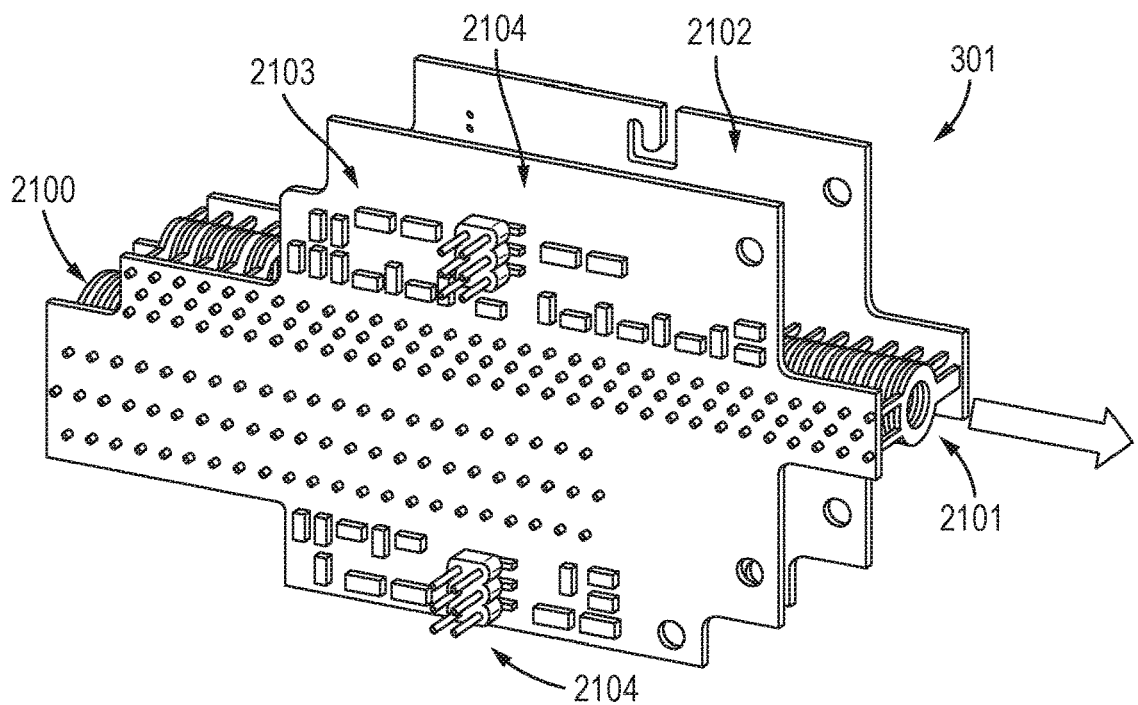

FIG. 21A shows an end view of a first ion guide 301 of a mass spectrometer 100 according to various embodiments. FIG. 21B then shows a cross-sectional view of the first ion guide 301 taken along the line X-X as indicated in FIG. 21A. FIGS. 21C and 21D then show perspective views of the first ion guide 301. The direction of ion travel through the first ion guide 301 is indicated with arrows.

As is shown in FIGS. 21A-D, the first ion guide 301 may comprise a first set of electrodes 2100 and a second set of electrodes 2101, with the apertures of the first set of electrodes 2100 being larger than the apertures of the second set of electrodes 2101, for example as discussed above. In some embodiments, as is shown here, the first set of electrodes 2100 may be vertically above the second set of electrodes 2101. However, in other embodiments, the first set of electrodes 2100 may be vertically below the second set of electrodes 2101.

As is shown in FIGS. 21A-D, the first ion guide 301 may also comprise a first substantially vertical ion optics PCB 2102 and/or a second substantially vertical ion optics PCB 2103. The plane of the first ion optics PCB 2102 may be substantially parallel to the plane of the second ion optics PCB 2103, and either or both of those planes may be substantially orthogonal to the plane of the first vacuum interface PCB 1719.

The first set of electrodes 2100 and second set of electrodes 2101 may be provided between the first ion optics PCB 2102 and the second ion optics PCB 2103 and may be directly mounted and soldered to the first ion optics PCB 2102 and the second ion optics PCB 2103.

The first ion optics PCB 2102 and the second ion optics PCB 2103 may further comprise electrical connections 2104 electrically connected to the first set of electrodes 2100 and second set of electrodes 2101. The electrical connections 2104 may be used to electrically connect the first set of electrodes 2100 and second set of electrodes 2101 to the first local voltage supply module 1717 via the first vacuum interface PCB 1719 and the one or more first internal PCBs 1721.

Providing the electrodes between the ion optics PCBs in this way can help to provide a compact and robust ion guide. Furthermore, providing ion optics PCBs that are substantially orthogonal to the first vacuum interface PCB 1719, e.g. rather than upper and lower substantially horizontal PCBs that are substantially parallel to the first vacuum interface PCB, can again help to reduce the voltage propagation distance between the AC or RF and/or DC voltage sources and the electrodes of the first ion guide 301.

Although the first ion guide 301 has been described above, it will be appreciated that the second ion guide 302 or other ion optics can have a similar PCB arrangement, albeit possibly with one or more differently configured electrodes, such as axially segmented rod electrodes coupled to the PCBs.

Figure 22:
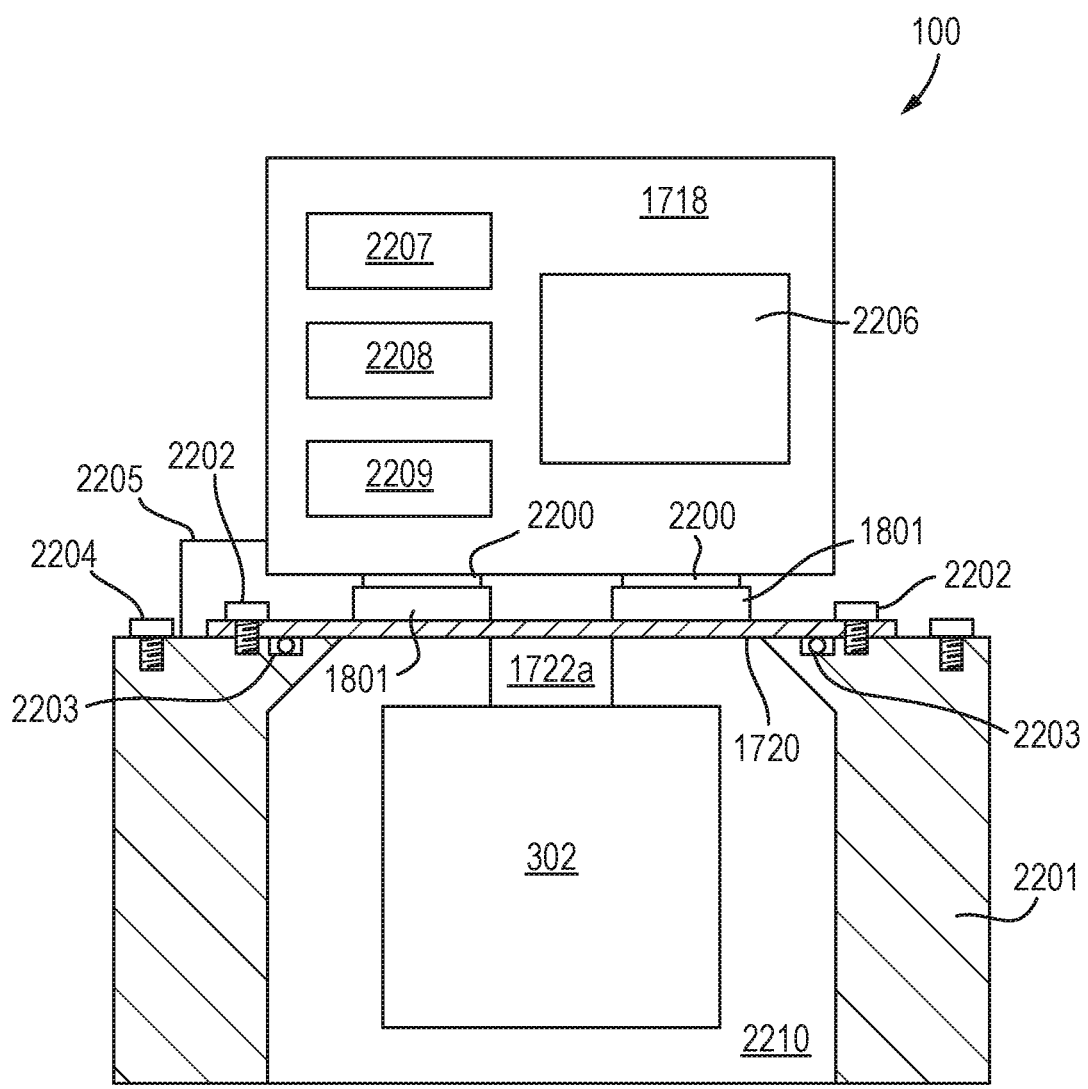
FIG. 22 shows a schematic cross-sectional view through a mass spectrometer in the region of an ion guide of the mass spectrometer according to various embodiments.

FIG. 22 shows a schematic cross-sectional view through the mass spectrometer 100 in the region of a second ion guide 302 of a mass spectrometer 100. FIG. 22 accordingly schematically shows the second ion guide 302 and the flexible PCB portion 1722a of the second internal PCB 1722 for connecting the second ion guide 302 to the second vacuum interface PCB 1720.

FIG. 22 also shows the one or more second connectors 1801 on the second vacuum interface PCB 1720, which directly physically and electrically connect to corresponding connectors 2200 on the second local voltage supply module 1718.

The second vacuum interface PCB 1720 may be fixed to a vacuum housing 2201 of the mass spectrometer via screw fixings 2202 and the vacuum chamber 2210 may be substantially sealed using peripheral seals 2203 provide within channels on the upper surface of the housing 2201. The housing of the second local voltage supply module 1718 may be held at the same ground potential as the mass spectrometer housing 2201 using a grounding screw fixing 2204 and/or grounding wire 2205.

FIG. 22 further shows various internal components of the second local voltage supply module 1718, such as local control module processing circuitry 2206 (e.g. comprising a router) for receiving and interpreting control instructions, e.g. received from the system control module 1715 and/or for transmitting data, control instructions, etc., to one or more further local control modules, AC or RF voltage supply circuitry 2207 and/or DC voltage supply circuitry 2208, and electronic storage (e.g. memory such as EEPROM) for storing an identifier for the second ion guide 302. Alternatively, the electronic storage (e.g. memory such as EEPROM) may be provided on the second vacuum interface PCB 1720, one or more second internal PCBs 1722, or the PCBs to which the ion guide electrodes are mounted. The identifier may be used to identify the second ion guide 302 to the system control module 1715. The identifier may be provided serially/digitally to the system control module 1715 using a single dedicated pin and/or wire of a connection having plural pins and/or wires. This single dedicated pine and/or wire may be referred to herein as a one-wire bus (OWB).

Although a schematic cross-sectional view through the mass spectrometer 100 in the region of the second ion guide 302 has been described above, it will be appreciated that a cross-sectional view through the mass spectrometer 100 in the region of the first ion guide 301 or other ion optics may show a similar arrangement.

Further details of the control system will now be described. As discussed above, the mass spectrometer according to various embodiments may comprise a plurality of functional modules, wherein each functional module is operable to perform a predetermined function of the mass spectrometer. Each functional module may comprise a component or plurality of components which together perform a predetermined specific function of the mass spectrometer. The functional modules may comprise electrical, mechanical, electromechanical, or software components; or a combination thereof. The components may be configured so as to carry out, on demand, the predetermined function.

For example, a functional module may comprise: one or more ion source components, such as the ion source 300, the high voltage supply module 1716 for the ion source 300, etc.; one or more ion guide components, such as the first ion guide 301, the first local voltage supply module 1717, the second ion guide 302, the second local voltage supply module 1718, etc.; one or more transfer lens components, such as the one or more transfer lenses 303, the second local voltage supply module 1718, etc.; one or more mass analyser components, such as the pusher electrode 305, the reflectron 306, the ion detector 307, the pre-amplifier 1710, the ADC 1710, etc.; one or more fluidics components; one or more front display panel components; one or more gauges; one or more sensors; one or more pumps; one or more valves; and/or one or more actuators; etc.

The functional modules therefore may be the functional blocks which together form some or all of the mass spectrometer 100 according to various embodiments. Two or more functional modules may be physically discrete from one another, each being embodied in a separate unit and/or housing and/or having separate components. Two or more functional modules may also or instead be provided within a single physical unit and/or housing and/or may share one or more components. A functional module may also or instead be contained within a single physical unit and/or housing. A functional module may also or instead be distributed across plural physical units and/or housings. Functional modules may also or instead be defined in software.

FIG. 23 shows further details of a "Typhoon" control system discussed herein that can be used in various embodiments to control the operation of the mass spectrometer 100.

As is shown in FIG. 23, the control system may comprise a plurality of local control modules 2300*a-g* and a system control module 1715, for example as discussed above.

Each local control module 2300*a-g* may comprise circuitry for an interface 2302 and a router 2301. The interface 2302 may connect the one or more operational parts (e.g. one or more electrodes, voltage supplies, detectors, ADCs, DACs, etc.) of the respective functional modules of the mass spectrometer to the router 2301. The operational parts of the functional module of the mass spectrometer may receive control signals from the local control module 2300*a-g* via the interface 2302. Any data signals sent from the operational parts of the functional module (e.g. indicating error data, acquired measurement data etc.) may also be communicated via the interface 2302. This is particularly of use when the mass spectrometer is operating in a data dependent acquisition (DDA) mode, wherein data generated or acquired by functional modules is used to determine the subsequent operation of the mass spectrometer.

The local control modules 2300*a-g* may be networked together via their respective routers 2301, via a suitable bus, so as to form a network. Each of the local control modules 2300*a-g* may be individually addressable on the network. The functional modules may be operable to identify themselves to the system control module 1715 using an identifier. The identifier may be provided serially/digitally to the system control module 1715 using a single dedicated pin and/or wire of a connection having plural wires. This single dedicated pin and/or wire may be referred to herein as a one-wire bus (OWB).

The network may be a packet switched digital network. The packet switched digital network may transmit data, regardless of its nature, size and content, in suitably sized 'blocks', or packets. For example, the network may be implemented using the SpaceWire protocol. The SpaceWire protocol is described, for example, in the European Cooperation for Space Standardization standard ECSS-E-ST-50-12C, the entire content of which is incorporated herein by reference.

In the SpaceWire protocol, for example, an 8-bit time code may be used that comprises 6 bits indicating system time and 2 flag bits. A time code is defined for conveying system time and generally has low latency and jitter. As will be appreciated, the 2 flag bits of the time code provide four possible combinations (i.e. 00, 01, 10, and 11). However, only one combination (00) of the 2 flag bits of the time code is defined in the SpaceWire protocol.

In various embodiments, the remaining three combinations of the 2 flag bits of such a time code may be used to indicate one of three particular types of signalling. For example, the remaining three combinations of the 2 flag bits may be used to indicate whether the signalling is "critical" (e.g. 01), "non-critical" (e.g. 10) or "control state" (e.g. 11) signalling. The 6 system time bits, which usually indicate system time, may be used to convey a payload of other, e.g. non-time, data. As discussed above, a time code generally has low latency and jitter. Thus, using a time code to indicate the type of signalling and/or other, e.g. non-time, data can allow the type of signalling and/or other, e.g. non-time, data to be provided to a functional module and/or local control module 2300*a-g* with low latency and jitter.

Communication between the local control modules 2300*a-g* in the network can be either "point-to-point" or "up/down" within a hierarchy of control modules. In point-to-point communication, there may be a direct and dedicated connection between the system control module 1715 and a or each given local control module 2300*a-g*. In this case, only information from or to that local control module 2300*a-g* passes along the connection. In an up/down implementation, there may be one or more additional nodes between the system control module 1715 and one or more local control modules 2300*a-g* and/or one or more local control modules 2300*a-g* may be between the system control module 1715 and one or more other nodes.

In the embodiment of FIG. 23, there exists a hierarchical arrangement of the modules, such that the higher tier(s) comprise(s) the more time-critical modules and the lower tier(s) comprise(s) functional modules which are less time-critical.

As an example, the system control module 1715 occupies Tier 1. A higher tier of functional modules (e.g. Tier 2) may then comprise functional modules including: the ion detector 307 controlled by local control module 2300*a*; the first ion guide 301 controlled by local control module 2300*b*; the second ion guide 302 and (via a further interface 2303) one or more transfer lenses 303 controlled by local control module 2300*c*; the pusher electrode 305 controlled by local control module 2300*d*; the reflectron 306 controlled by local control module 2300*e*; and the ADC 1710 controlled by local control module 2300*f*. A lower tier of functional modules (e.g. Tier 3) may then comprise functional modules including the high voltage supply 1716 for the ion source 300 controlled by local control module 2300*g*.

In this embodiment, the functional modules are separated into two tiers (Tier 2 and 3), but there may be a greater or lesser number of tiers. It should also be noted that the schematic illustration of the local control modules 2300*a-f* arranged in FIG. 23 may not necessarily be reflective of the physical arrangement of the functional modules and/or local control modules 2300*a-f*.

The system control module 1715 may further comprise a scheduler 2304 operable to introduce (discrete) packets of instructions to the network via a bank of one or more connectors 2305 to instruct one or more functional modules to perform a pre-determined operation. The scheduler 2304 may be operable to control the introduction of packets into the network. A given packet may be introduced by the scheduler 2304 at a predetermined time based on the information in the packet and/or an associated entry in a control state table associated with the packet. The scheduler 2304 may be implemented in a field-programmable gate array (FPGA) 2312. The local control modules 2300*a-g* may also be implemented in an FPGA.

Each functional module and/or control module 2300*a-g* may have a unique address and each of the packets sent by the scheduler 2306 may be addressable to a particular functional module and/or control module 2300*a-g*, or group of functional modules and/or control modules 2300*a-g*. Each packet may contain various information such as control parameters/settings/instructions, end device sensor data, error conditions, detector data, etc.

There may be one or more different modes of operations in which the mass spectrometer may be operated, for example as discussed above. The control parameters for the mass spectrometer to perform a particular operation may be determined by entries in a control states table. Each entry in the control states table may provide the relevant parameters/settings/instructions for each of the functional modules and/or control modules 2300*a-g* required, and the time at which those should be implemented.

For a given operation, the scheduler 2304 may interrogate the information held in the control states table for that operation. The scheduler 2304 may then introduced packets of instructions for the relevant functional modules and/or control modules 2300*a-g*, at predetermined times, to run a predetermined operation. Each packet may include the address of the or each functional module and/or control module 2300*a-g* associated with the functional module(s) to be controlled.

For example, a mode of operation may comprise a Power save mode of operation, for example as discussed above. This may include partially or fully powering down some or all of the functional modules, for example as discussed above, whilst still allowing the mass spectrometer to be (e.g. rapidly) returned to a normal operational state when desired without the need for a complete restart of the mass spectrometer. The Power save mode of operation may be selected manually, e.g. by an operator of the mass spectrometer pressing (e.g. tapping) a button. The standby mode of operation may also or instead be selected automatically For another example, a mode of operation may comprise a Standby mode of operation, for example as discussed above. This may again include partially or fully powering down some or all of the functional modules, for example as discussed above, whilst still allowing the mass spectrometer to be (e.g. rapidly) returned to an operational state when desired without the need for a complete restart of the mass spectrometer. The standby mode of operation may be selected manually, e.g. by an operator of the mass spectrometer pressing (e.g. and holding down) a button. The standby mode of operation may also or instead be selected automatically.

For another example, a mode of operation may comprise a (e.g. safer) maintenance mode of operation, for example as discussed above. Again, this may include partially or fully powering down some or all of the functional modules, for example as discussed above, into a substantially safe state so that those functional modules can be safely tested and/or repaired and/or removed. The maintenance mode of operation may be selected manually, e.g. by a service engineer. The maintenance mode of operation may also or instead be selected automatically.

For another example, a mode of operation may comprise a failure (e.g. Over pressure or Gas Fail) mode of operation, for example as discussed above. Again, this may again include partially or fully powering down some or all of the functional modules, for example as discussed above, into a substantially safe state. The failure mode of operation may be automatically entered upon detection of one or more failure conditions, such as higher pressure or vacuum failure. The one or more failure conditions may be indicated by one or more (e.g. peripheral) functional modules, such as one or more (pressure) gauges, one or more (pressure) sensors, etc.

For another example, a mode of operation may comprise lock mass mode of operation. The lock mass mode of operation may be performed post-acquisition and/or post-acquisition.

In this regard, Time-of-flight measurements allow for accurate mass measurements to be made based on the arrival time of ions that have been accelerated by the pusher electrode (see, e.g., pusher electrode 200 in FIGS. 10 and 13) of a time of flight analyser. As is known in the art, arrival times are converted to mass to charge ratio values using the known distance travelled and the known acceleration of the ions, in order to give an accurate value for mass. This provides data corresponding to the constituents of an analytic sample.

It is also known that small changes in temperature can shift the mass of the ions that has been determined by parts per million, and so a correction may be required in order to ensure accurate mass values are obtained. In order to achieve the correction, in various embodiments a compound of known mass may be introduced to the instrument at specific intervals during an analysis. This may be referred to as a "lock mass" compound.

The lock mass compound may be analysed and the mass of the compounds may be recorded. A correction factor may be created which corresponds to the difference between the recorded mass of the lock mass compound and the actual mass of the compound. This correction factor may then be applied to the data corresponding to the analytic sample, ensuring that any temperature changes are corrected for.

In various embodiments a "two-point" lock mass correction may be used, in which two different compounds of known mass may be introduced as lock mass compounds, and a correction factor may be created based on the difference between the recorded masses of the lock mass compounds and the actual mass of the compounds. This can be used for samples including very large mass ranges, since a correction factor based on a compound at a lower end of the mass range may not be applicable for compounds at the higher end of the mass range.

Conventional instruments have used a lock spray source having, for example, two different sprayers and a baffle. The standard sprayer may be used to introduce the analytical mixture via, for example, a liquid chromatography machine. An additional sprayer, which may be referred to as the reference sprayer, may be used to introduce a compound of known mass (i.e., the lock mass compound). The baffle may be configured to switch between the two sprayers so that only one may be used to introduce a substance into the mass spectrometer at a particular point in time.

The baffle may be switched at specific intervals throughout an analytical run and data may be collected in two channels, a first of the channels being for lock mass data and a second of the channels being for analytical data. After the analytical run the lock mass data may be utilised to produce a correction factor, in the same manner as described above, which may be applied to the analytical data.

Collecting lock mass data in this manner at set intervals throughout the analytical run can further ensure that temperature fluctuations have a reduced effect on the analytical data. However, use of a baffle as well as two different sprayers may be relatively expensive, and can further complicate the manufacture of the instrument.

Therefore, in various embodiments of the present disclosure the ion inlet assembly 102 (see FIG. 10) may comprise a device configured to introduce one or more analyte compounds as well as a lock mass compound using a single sprayer.

In various embodiments the lock mass compound may be introduced immediately before and immediately after an analytical run (and/or between analytical runs) during which the analyte compound(s) are introduced. Each analytical run may be restricted to a maximum time of about 20 minutes, which may refer to a total, continuous time. As such, lock mass compounds may be introduced roughly every 20-22 minutes.

Upon introduction of a lock mass compound as discussed above, a or the control system may be configured to analyse the lock mass compound using the mass spectrometer 100 and determine the mass(es) of the lock mass compound(s). The control system may then be configured to determine a correction factor, which may correspond to the difference(s) between the recorded mass(es) of the lock mass compound(s) and the actual mass(es) of the compound(s). The control system may then be configured to apply this correction factor to the data obtained during the analytical run.

In various embodiments a "two-point" lock mass correction may be applied, in which the control system is configured to obtain lock mass data immediately before and immediately after the analytical run. The control system may then be configured to determine a correction factor based on the differences between the recorded masses of the lock mass compounds and the actual masses of the compounds, in the separate lock mass corrections. The control system may then be configured to apply the correction factor to the data obtained during the analytical run, which is carried out in between the two lock mass corrections.

In various embodiments the lock mass data may be collected at between about 0.45 to 0.55 ions per push, for example about 0.5 ions per push ("IPP"), which has been found to provide optimum conditions for lock mass data collection. This may be achieved by suitable adjustment of ion optics, for example adjustment of a voltage applied to a cone electrode. The cone electrode may be positioned at any suitable location, for example within the ion inlet device 102 or at the entrance to the time of flight analyser 110.

For another example, a mode of operation may comprise an $MS^E$ or "pseudo" $MS^E$ mode of operation. This may include instructing one or more functional modules that are operable to perform ion collisions to alternate, e.g. rapidly, between a lower collision energy mode (for little or no fragmentation) and higher collision energy mode (for fragmentation). The instructions for switching between the lower and higher collision energy modes may be indicated using a (e.g. SpaceWire) time code as described above and may comprise indicating that the instructions are "critical".

The system control module 1715 (e.g. FPGA 2312) may further comprise a system timing unit 2306 (clock) that is used to determine and/or control when each packet should be introduced to the network. The system control module 1715 (e.g. FPGA 2312) may further comprise one or more memories 2307 operatively connected to the scheduler 2304. The one or more memories 2307 may be operable to store a plurality of control states and/or packets associated with a plurality of predetermined operations. The mass spectrometer may therefore be preconfigured to acquire data from a sample using more or more of a plurality of predefined methods.

The system control module 1715 (e.g. FPGA 2312) may further comprise its own interface 2308, which may be connected between one or more other (e.g. analogue) functional modules (e.g. one or more peripheral devices) of the mass spectrometer 100 and the scheduler 2304. The one or more other functional modules of the mass spectrometer may receive control data from the system control module 1715 via the interface 2308. Any data sent from the one or more other functional modules (e.g. error data, acquired measurement data etc.) may also be communicated via the interface 2308.

For example, the other (e.g. analogue) functional modules (e.g. peripheral devices) may comprise: one or more sensors and/or gauges such as one or more vacuum sensors and/or gauges, one or more bubble sensors, etc.; one or more valves such as one or more gas valves, waste valves, etc.; one or more pumps; one or more actuators; etc.

Rather than having a relatively more complex local control module, e.g. having a router and/or interface as discussed above, these other (e.g. analogue) functional modules may operate via a Universal Peripheral Analogue Interface (UPAI), which will be described in more detail below.

The system control module 1715 may further comprise a controller 2309 associated with the scheduler 2304. The controller 2309 may comprise circuitry operable to load the scheduler 2304 with all the necessary information to run one or more particular predetermined operations. The scheduler 2304 then, based on the entries in the control states table, introduces instructions to the network at the predetermined times.

The controller 2309 may be implemented in a separate field-programmable gate array (FPGA) and/or central processing unit (CPU) and may be configured and/or controlled by the EPC 1714. The controller 2309 may comprise an Ethernet connection 2310 for external data transfer. The system control module 1715 may further comprise an external connection 2311 to a debug unit (not shown) to allow the system control module 1715 to be debugged as desired.

As will be appreciated from the above, there may be no need for an external host computer to control various specific lower-level functions to be performed by the mass spectrometer in real-time. The control system can therefore reduce or avoid a processing load that might otherwise be placed on a central CPU. Instead, various functional modules may be controlled by the scheduler 2304 and/or locally, e.g. based on the information contained in the packets.

Packet instructions may also be sent to one of the functional modules and/or the control module 2300a-g ahead of the time at which the function of that functional module needs to be initiated. The packet instructions may then be stored in a local memory in the functional module and/or control module 2300a-g before being implemented. This can reduce or avoid the effect of any latency in the network.

The control system can also allow for discrete addressable functional modules to be used in a variety of mass spectrometer devices. The control system can also allow for a schedule of packets to be sent onto the network at specific times and intervals during an acquisition. This can reduce or alleviate the need for a host computer system with a real time operating system to control aspects of the data acquisition. The use of packets of information sent to individual functional modules reduces the processing requirements of a host computer.

The modular nature of the control system can also allow flexibility in the configuring of a mass spectrometer. The control system can also allow for at least some of the functional modules to be common across a range of mass spectrometers, and to be integrated into a mass spectrometer with minimal reconfiguration of other modules. Accordingly, when configuring a mass spectrometer, a bespoke control system may not be necessary. A mass spectrometer may instead be configured by connecting together a plurality of discrete functional modules in a network.

Furthermore, the modular nature of the control system allows for a defective functional module and/or local control module to be repaired and/or replaced easily. A repaired and/or replacement functional module and/or local control module may simply be connected to the interface. If the local control module is physically connected to or integral with the functional module, both may be replaced.

Figure 24A:
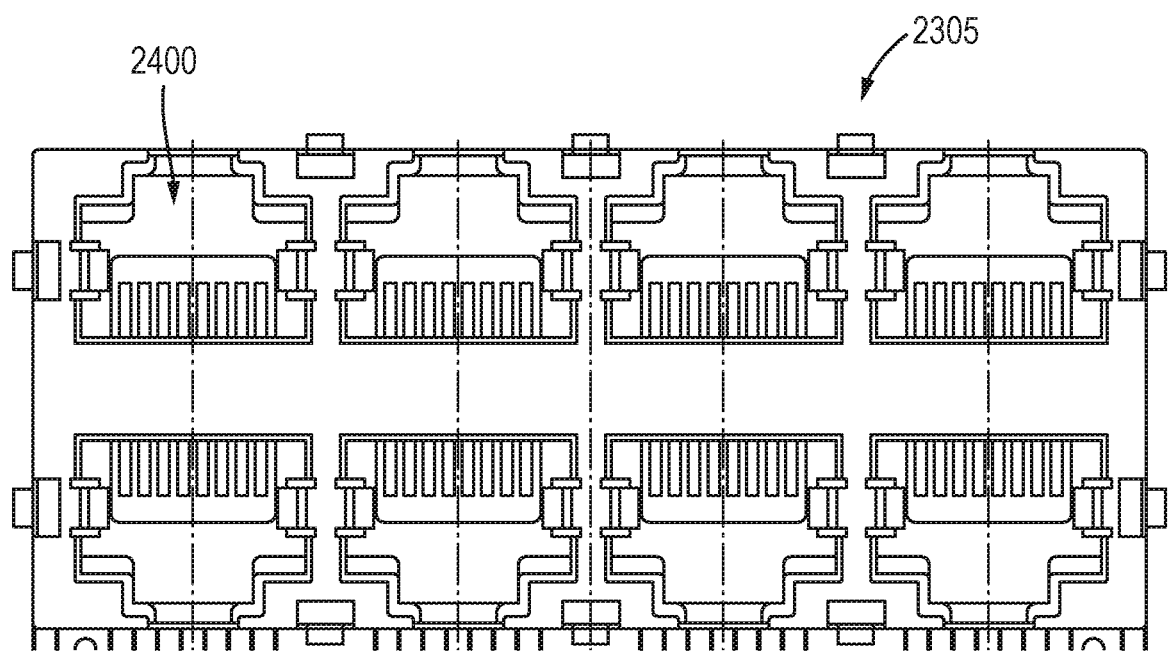
FIGS. 24A-B show the connectors for a system control module of a mass spectrometer according to various embodiments.
Figure 24B:
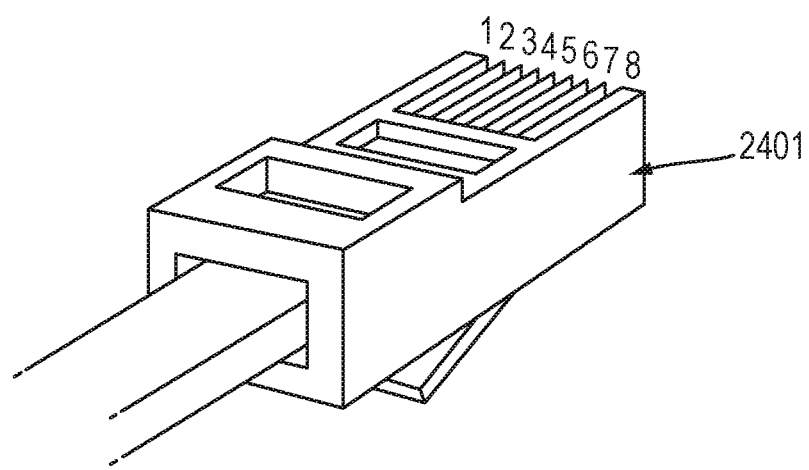

FIGS. 24A-B then show the one or more connectors for the system control module 1715 in more detail. As is shown in FIG. 24A, the bank of one or more connectors 2305 may comprises 8 sockets, such as 8 RJ45 sockets, for connecting the system control module 1715 to the various local control modules 2300a-g. As is shown in FIG. 24B, each local control module 2300a-g may be connected to the bank of connectors 2305 using a suitable plug, such as an RJ45 plug 2401. One of the pins and/or wires of the or each connector may be used as the one-wire bus described herein. Since the functional modules and/or local control modules 2300a-g are able to identify themselves to the system control module 1715, the functional modules and/or local control modules 2300a-g may be connected and reconnected using substantially any connection of the bank of connections 2305.

A similar bank of sockets and one or more plugs to those which are shown in FIGS. 24A-B may also be provided for connecting the system control module 1715 to one or more other functional modules via a Universal Peripheral Analogue Interface (UPAI) and the interface 2308. Again, one of the pins and/or wires of the or each connector may be used as the one-wire bus described herein. Again, since the functional modules are able to identify themselves to the system control module 1715, the functional modules may be connected and reconnected using substantially any connection of the bank of connections.

Figure 25:
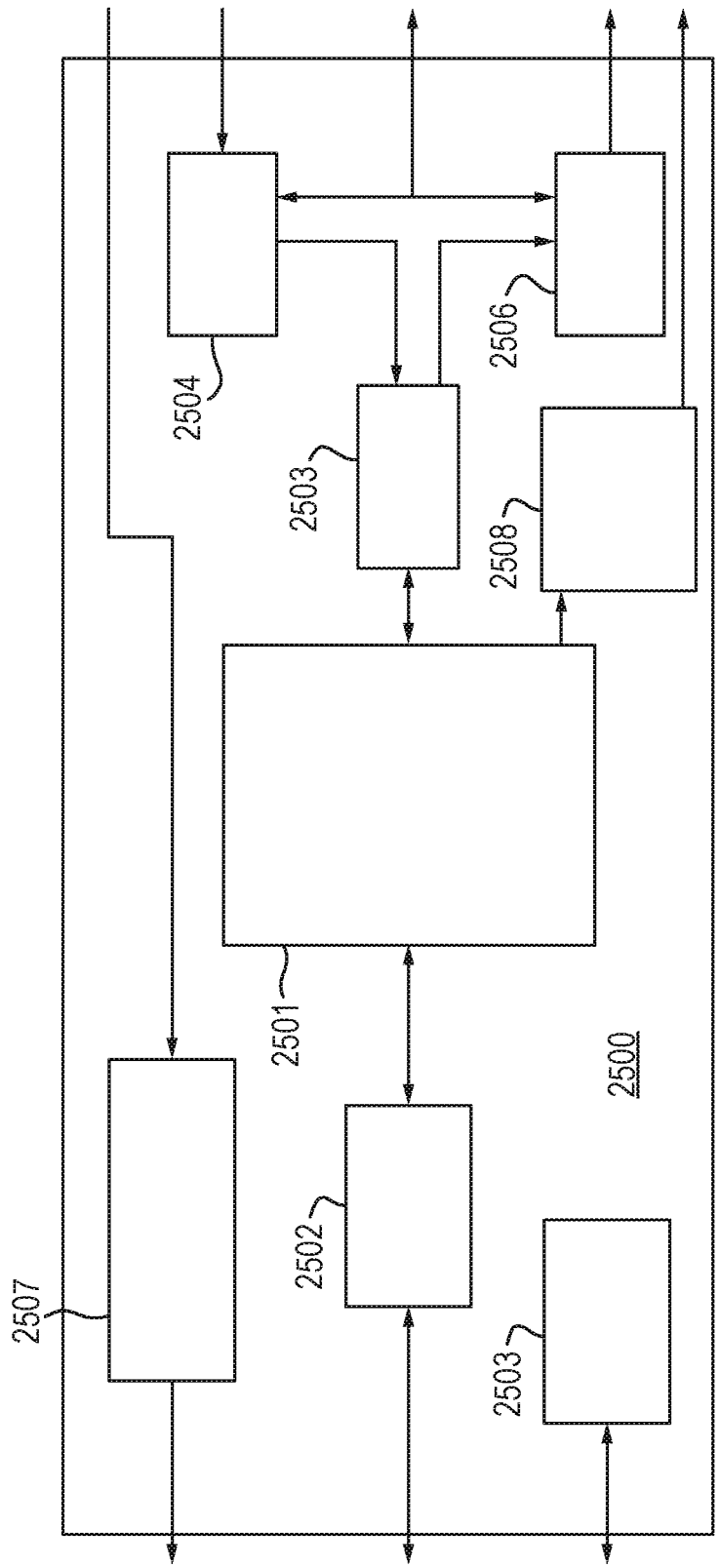
FIG. 25 shows a Universal Peripheral Analogue Interface (UPAI) for a mass spectrometer according to various embodiments.

FIG. 25 shows a Universal Peripheral Analogue Interface (UPAI) for a (e.g. analogue) functional module (e.g. peripheral device) of a mass spectrometer 100 according to various embodiments. The UPAI may comprise a PCB 2500. The PCB 2500 may either be incorporated into a cable that connects the functional module in question to the system control module 1715 or may be provided as part of control circuitry (e.g. a PCB) of the functional module.

The PCB 2500 may comprise a microcontroller 2501, a transceiver 2502 such as an RS485 transceiver, an ADC/DAC 2503, a first differential amplifier 2504 for amplifying incoming analogue signals, and a second differential amplifier 2505 for amplifying outgoing analogue signals.

The microcontroller 2501 may communicate with the system control module 1715 via the transceiver 2502. For example, under instruction from the system control module 1715, the microcontroller 2501 may receive digital signals generated by the ADC 2503 by sampling incoming analogue signals amplified by the first differential amplifier 2504. The microcontroller 2501 may use these digital signals internally to inform future operation and/or may communicate these digital signals to the system control module 1715 via the transceiver 2502. The microcontroller 2501 may also receive instructions to generate outgoing analogue signals from the system control module 1715 via the transceiver 2502 and may generate outgoing analogue signals using the DAC 2503 and second differential amplifier 2505.

The PCB 2500 may further comprise storage 2506 (e.g. memory such as EEPROM) for storing an identifier for the functional module in question. The identifier may be used to identify the functional module in question to the system control module 1715. The identifier may be provided serially/digitally to the system control module 1715 using a single dedicated pin and/or wire of a connection having plural wires. This single dedicated pin and/or wire connection may be referred to herein as a one-wire bus (OWB).

The PCB 2500 may further comprise an optocoupler 2507 for detecting open collector (FET) states on one or more end transducers/sensors that form part of the functional module in question, and an open collector (FET) 2508 for switching power to one or more end transducers/sensors that form part of the functional module in question.

As discussed above, an identifier for a functional module may be provided serially/digitally to the system control module 1715 using a single dedicated pin and/or wire connection, which may be referred to herein as a one-wire bus (OWB). The use of a single pin and/or wire for conveying the identifier has a number of benefits. For example, since only one pin and/or wire of the connection is required in order to transmit the identifier, one or more other pin and/or wires of the connection may be available for transmitting other data. Thus, the transmission of the identifier may be made without substantially interfering with other signals and/or at substantially any time. Furthermore, since only one pin and/or wire of the connection is required in order to transmit the identifier, the size of the sockets/plugs can be reduced. The identifier may, for example, indicate the type of functional module (e.g. fluidics (mass flow) controller, ion source, ion guide, transfer lens, pusher electrode, reflectron, ion detector, pre-amplifier, ADC, valve, gauge, pump, sensor, front panel, etc.) and/or variant of functional module (e.g. for ion guide: StepWave®, quadrupole, etc.) and/or intended use for the functional module (e.g. for ion guide: ion guiding, ion collision, ion trap, IMS, etc.).

Figure 26:
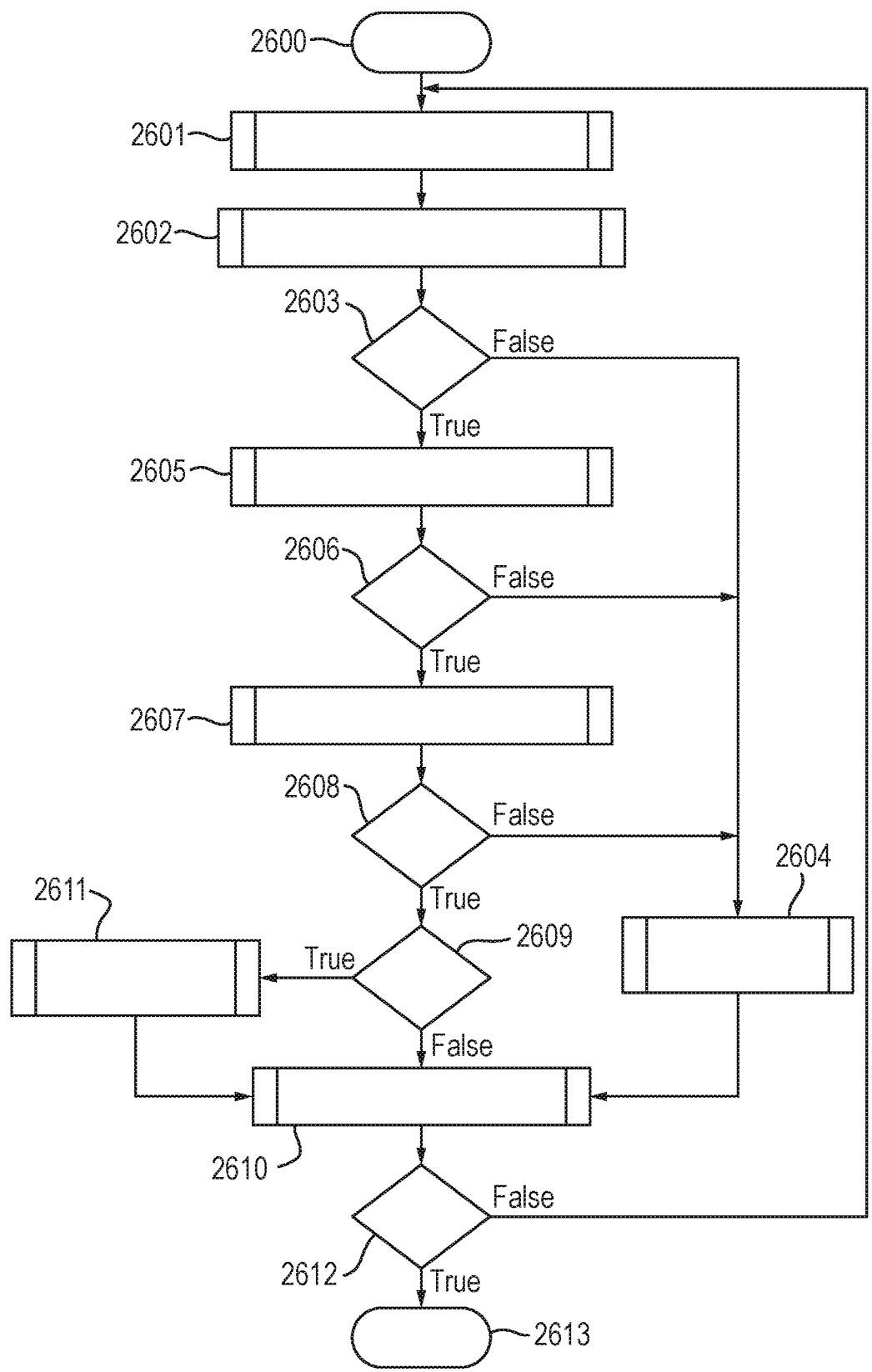
FIG. 26 shows a process of identifying the functional modules of a mass spectrometer based on an identifier for the functional modules of the mass spectrometer according to various embodiments.

FIG. 26 shows a process of identifying the various functional modules connected to the control system of the mass spectrometer based on the identifiers for the various functional modules.

The process starts at step 2600. Then, in step 2601, a port (connector) of the bank of connections 2305 is selected for scanning. Then, in step 2602, the one-wire bus (OWB) for the port is reset and detection is enabled in a control register of the system control module 1715.

Then, in step 2603, it is determined whether the OWB for the port is reset and whether detection is enabled. If the OWB for the port is not reset or detection is not enabled then, in step 2604, the port is marked as invalid. However, if the OWB for the port is reset and detection is enabled, then, in step 2605, an identifier for the port is read.

Then, in step 2606, it is determined whether a cyclic redundancy check (CRC) for the port identifier is passed. If the check for the port is not passed then, in step 2604, the port is marked as invalid. However, if the check for the port is passed, then, in step 2607, the identifier for the functional module is read.

Then, in step 2608, it is determined whether a CRC for the functional module identifier is passed. If the check for the functional module is not passed then, in step 2604, the port is marked as invalid. However, if the check for the functional module is passed, then, in step 2609, it is determined whether power to the functional module should be enabled by the system control module 1715.

If power to the functional module should not be enabled by the system control module 1715, but will be enabled externally, then, in step 2610, the process moves to the next port to be scanned. However, if power to the functional module should be enabled by the system control module 1715, then, in step 2611, a power enable status is set before proceeding to step 2610.

Then, in step 2612, it is determined whether the scan of the ports is complete. If the scan of the ports is not complete then the process returns to step 26012 scan the next port. However, if the scan of the ports is complete then, in step 2613, the process stops.

The process of FIG. 26 may start manually and/or automatically, for example at start-up, upon detecting that a connector has been removed from a port, upon detecting that a connector has been connected to a port, when recovering from or entering a power save, standby, maintenance and/or failure mode, periodically, etc.

The process of FIG. 26 can allow the mass spectrometer to be readily configured and/or re-configured for use based on the identifier for the various functional modules connected to the control system of the mass spectrometer.

Figure 27:
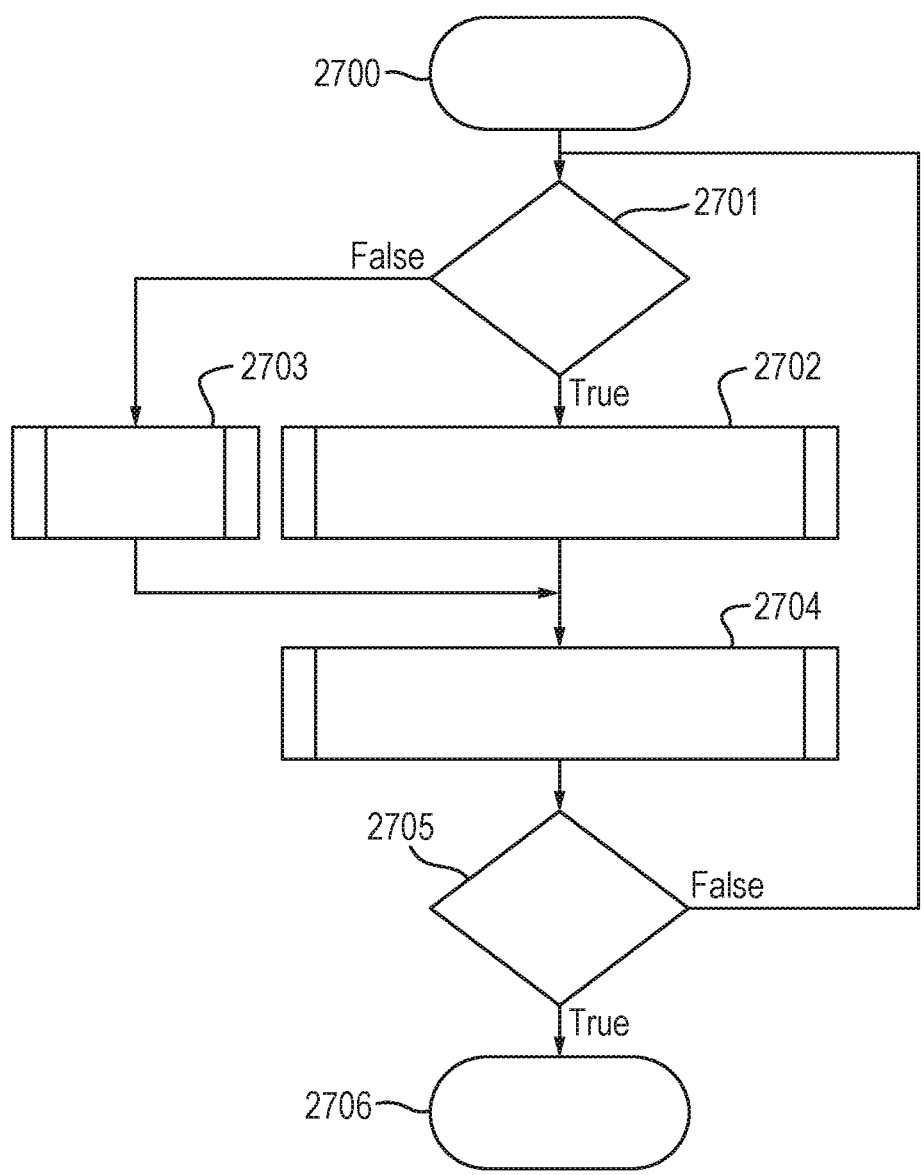
FIG. 27 shows a process of assigning operational parameters to ports of a system control module of a mass spectrometer based on the identifiers for the functional modules of the mass spectrometer according to various embodiments.

FIG. 27 shows a process of assigning operational parameters to the ports based on the identifier for the various functional modules connected to the control system of the mass spectrometer.

The process starts at step 2700. Then, in step 2701, it is determined whether the port in question is valid. If it is determined that the port in question is valid then, in step 2702, the parameters for that particular port are assigned based on the identifier for the functional module connected to that particular port. The parameters may be obtained for the identifier in question, e.g. obtained from electronic storage such as electronic storage of the system control module 1715, controller 2309, EPC 1714, a remote server, etc. However, if it is determined that the port is invalid then, in step 2703, the particular port is assigned as NULL.

In either case, in step 2704, the next port is selected. Then, in step 2705, it is determined whether all port assignments are complete. If there are still port assignments outstanding then the process returns to step 2701. However if it is determined that all port assignments are complete then, in step 2706, the process stops.

Again, the process of FIG. 27 may start automatically, for example at start-up, upon detecting that a connector has been removed from a port, upon detecting that a connector has been connected to a port, when recovering from or entering a power save, standby, maintenance and/or failure mode, periodically, etc.

Again, the process of FIG. 27 can allow the mass spectrometer to be readily configured and/or re-configured for use based on the identifier for the various functional modules connected to the control system of the mass spectrometer.

Although the present invention has been described with reference to various embodiments, it will be understood by those skilled in the art that various changes in form and detail may be made without departing from the scope of the invention as set forth in the accompanying claims.

The invention claimed is:

1. A mass spectrometer comprising:
a system control module for controlling the operation of the mass spectrometer; and
one or more functional modules, each functional module being operable to perform a predetermined function of the mass spectrometer;
wherein the system control module and/or one or more functional modules are operable to communicate non-time information with each other using a time code of a communications protocol.

2. A mass spectrometer as claimed in claim 1, wherein the communications protocol comprises a data packet based communications protocol.

3. A mass spectrometer as claimed in claim 1, wherein the communications protocol comprise a SpaceWire communications protocol.

4. A mass spectrometer as claimed in claim 1, wherein the time code comprises one or more flag bits.

5. A mass spectrometer as claimed in claim 4, wherein the one or more flag bits are used to indicate the type of information being communicated.

6. A mass spectrometer as claimed in claim 5, wherein the indicated type of information comprises critical, non-critical or control state information.

7. A mass spectrometer as claimed in claim 1, wherein the time code comprises one or more system time bits.

8. A mass spectrometer as claimed in claim 7, wherein the one or more system time bits convey the payload information being communicated.

9. A mass spectrometer as claimed in claim 8, wherein one or more flag bits are used to indicate the type of payload information being conveyed in the one or more system time bits.

10. A mass spectrometer as claimed in claim 8, wherein the payload information being conveyed comprises critical, non-critical or control state information.

11. A mass spectrometer as claimed in claim 1, wherein a functional module comprises electrical, mechanical, electro-mechanical, or software components; or a combination thereof.

12. A mass spectrometer as claimed in claim 1, wherein a functional module comprises: one or more ion source components; one or more ion guide components; one or more transfer lens components; one or more mass analyser components; one or more fluidics components; one or more front display panel components; one or more gauges; one or more sensors; one or more pumps; one or more valves; and/or one or more actuators.

13. A mass spectrometer as claimed in claim 1, wherein the system control module and/or one or more functional modules are operable to communicate non-time information with each other using the time code of the communications protocol in order to configure and/or reconfigure the mass spectrometer to operate in one or more modes of operation, wherein at least one mode of operation includes partially and/or fully powering down some or all of the one or more functional modules.

14. A mass spectrometer as claimed in claim 1, wherein the system control module and/or one or more functional modules are operable to communicate non-time information with each other using the time code of the communications protocol in order to configure and/or reconfigure the mass spectrometer to operate in an $MS^E$ mode of operation in which one or more functional modules are instructed to alternate between performing ion collisions in a lower collision energy mode and higher collision energy mode.

15. A method of mass spectrometry, the method comprising:
- providing a system control module for controlling the operation of a mass spectrometer;
- providing one or more functional modules, each functional module being operable to perform a predetermined function of the mass spectrometer; and
- operating the system control module and/or one or more functional modules to communicate non-time information with each other using a time code of a communications protocol.

16. A mass spectrometer comprising:
- a system control module for controlling the operation of the mass spectrometer; and
- one or more functional modules, each functional module being operable to perform a predetermined function of the mass spectrometer;
- wherein the system control module and/or one or more functional modules are operable to communicate information with each other in order to configure and/or reconfigure the mass spectrometer to operate in one or more modes of operation, wherein at least one mode of operation includes partially and/or fully powering down some or all of the one or more functional modules.

* * * * *